(12) United States Patent
Yin et al.

(10) Patent No.: US 12,271,828 B2
(45) Date of Patent: Apr. 8, 2025

(54) METHOD, APPARATUS, AND SYSTEM FOR REPRESENTING INTERNET OF VEHICLES KNOWLEDGE BASE

(71) Applicant: HUAWEI TECHNOLOGIES CO., LTD., Guangdong (CN)

(72) Inventors: Xiaotian Yin, Shenzhen (CN); Jian Li, Plano, TX (US); Yongxiang Tao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1110 days.

(21) Appl. No.: 17/158,969

(22) Filed: Jan. 26, 2021

(65) Prior Publication Data

US 2021/0150376 A1 May 20, 2021

Related U.S. Application Data

(63) Continuation of application No. PCT/CN2019/098716, filed on Jul. 31, 2019.

(30) Foreign Application Priority Data

Jul. 31, 2018 (CN) .......................... 201810857766.X

(51) Int. Cl.
  *G06N 5/022* (2023.01)
  *B60W 30/08* (2012.01)
  (Continued)

(52) U.S. Cl.
  CPC ............. *G06N 5/022* (2013.01); *B60W 30/08* (2013.01); *B62D 15/021* (2013.01); *G06N 5/025* (2013.01); *B60W 2552/30* (2020.02)

(58) Field of Classification Search
  CPC ....... G06N 5/022; G06N 5/025; B60W 30/08; B60W 2552/30; B62D 15/021
  See application file for complete search history.

(56) References Cited

U.S. PATENT DOCUMENTS

2003/0067461 A1* 4/2003 Fletcher ................. G06T 17/20
                                                   345/420
2010/0030531 A1* 2/2010 Merlhiot ................ B25J 9/1666
                                                   703/2
(Continued)

FOREIGN PATENT DOCUMENTS

CN    101093559 A    12/2007
CN    106446812 A    2/2017
(Continued)

OTHER PUBLICATIONS

Sergio Barbarossa et al., "Learning From Signals Defined Over Simplicial Complexes", 2018 IEEE Data Science Workshop (DSW), IEEE Xplore: Aug. 20, 2018, total:5pages.

(Continued)

*Primary Examiner* — Shahid K Khan
(74) *Attorney, Agent, or Firm* — WOMBLE BOND DICKINSON (US) LLP

(57) ABSTRACT

An embodiment of the application provides a method for representing internet of vehicles (IOV) knowledge based on a simplicial complex (SC). The method includes: representing k'-dimensional knowledge in a k-dimensional continuous space by using a k-dimensional SC with k'-dimensional function values; and representing a safe boundary of the IOV knowledge by using a boundary of the SC, where the IOV knowledge includes a steering wheel angle of an ego-vehicle, a road curvature, a speed of the ego-vehicle, and an inter-parameter relationship compliant with an objective law of vehicle dynamics, where the steering wheel angle of the ego-vehicle, the road curvature, and the speed of the ego-vehicle are obtained by using a sensor on the ego-vehicle.

18 Claims, 22 Drawing Sheets

(51) Int. Cl.
*B62D 15/02* (2006.01)
*G06N 5/025* (2023.01)

(56) References Cited

U.S. PATENT DOCUMENTS

| | | | |
|---|---|---|---|
| 2012/0323474 | A1 | 12/2012 | Breed et al. |
| 2013/0151107 | A1 | 6/2013 | Nikovski et al. |
| 2016/0267397 | A1* | 9/2016 | Carlsson ................. G06N 3/04 |
| 2018/0189663 | A1 | 7/2018 | Bagchi et al. |
| 2021/0209072 | A1* | 7/2021 | Trim ........................ G06F 40/30 |
| 2022/0198254 | A1* | 6/2022 | Dalli ....................... G06N 5/025 |

FOREIGN PATENT DOCUMENTS

| | | | | |
|---|---|---|---|---|
| CN | 106649983 | A | | 5/2017 |
| CN | 107251018 | A | | 10/2017 |
| CN | 107817791 | A | | 3/2018 |
| CN | 109189781 | A * | 1/2019 | ............ B60W 30/08 |
| KR | 102287065 | B1 * | 8/2021 | |
| WO | WO-2022101515 | A1 * | 5/2022 | ............ G06N 3/045 |

OTHER PUBLICATIONS

Matthew McNaughton et al.,"Parallel Algorithms for Real-time Motion Planning",Jul. 2011,total:233page.

Vincenzo Ferruci et al., Extrusion and boundary evaluation for multidimensional polyhedra. Computer-Aided Design, vol. 23, Issue 1, Jan. Feb. 1991, 2 Pages.

C. Bradford Barber et al., The quickhull algorithm for convex hulls. ACM Transactions on Mathematical Software, vol. 22, No. 4, Dec. 1996, 15 pages.

Zhou Mingdong, Topology Shape Optimization of Structures Based on Simple Complex and Its Application. China Mechanics Conference—2017, 2 pages.

Jonathan Richard Shewchuk, Sweep Algorithms for Constructing Higher-Dimensional Constrained Delaunay Triangulations. Proceedings of the sixteenth annual symposium on Computational geometry, May 2000, 10 pages.

Deng Nian-dong et al., Formal description and the 3-D modeling topological relationships. Journal of Xi an University of Architecture and Technology(Natural Science Edition), vol. 39, No. 6, Dec. 2007, 5 pages.

* cited by examiner

A. 2-dimensional knowledge space and safe region

B. Table-based solution and safe boundary

C. SC-based solution and safe boundary

METHOD, APPARATUS, AND SYSTEM FOR REPRESENTING INTERNET OF VEHICLES KNOWLEDGE BASE

CROSS-REFERENCE TO RELATED APPLICATIONS

This application is a continuation of International Application No. PCT/CN2019/098716, filed on Jul. 31, 2019, which claims priority to Chinese Patent Application No. 201810857766.X, filed on Jul. 31, 2018. The disclosures of the aforementioned applications are hereby incorporated by reference in their entireties.

TECHNICAL FIELD

Embodiments relate to the internet of vehicles field, and in particular, to a method, an apparatus, and a system for representing an internet of vehicles knowledge base.

BACKGROUND

Recently, an apparent development trend of the internet of vehicles is transition from a rule-based mode to a learning-based mode. Transition modes may be classified into two types: transition in split mode and transition in integrated mode. During transition in split mode, a new learning-based IOV system completely learns from scratch according to a learning method, and an old rule-based system is completely abandoned in terms of both form and content. In other words, plenty of rules and experience (or knowledge) previously summarized and deposited in a rule-based framework are also abandoned and wasted. During transition in integrated mode, knowledge in the rule-based system is utilized in a learning-based framework to the greatest extent. In other words, the learning-based system replaces the rule-based system, and abandons only the form of the rule-based system, but reserves the knowledge of the rule-based system.

Learning in the IOV field has its own characteristics. With respect to a learning mode, it is quite appropriate to use an artificial general intelligence (AGI) mode for learning. An objective of this learning mode is to enable a machine to think and learn like a human being. Its characteristics are: online learning and updating can be uninterruptedly performed based on existing basic knowledge, old knowledge is expanded, and new knowledge is deposited, to adapt to new situations.

Currently, a majority of learning-based IOV systems are products of transition in split mode. However, transition in integrated mode is relatively blank. Even if there are any attempts, most of the attempts focus on a particular problem. Due to lack of a general basic means applicable to the entire IOV field, there is still great difficulty in performing learning in AGI mode in the IOV field.

SUMMARY

Embodiments of the application provide a method, an apparatus, and a system for representing an internet of vehicles knowledge base, to provide a general basic means applicable to the entire IOV field.

According to one aspect, an embodiment of the application provides a method for representing internet of vehicles (IOV) knowledge based on a simplicial complex (SC), where the method includes:

representing k'-dimensional knowledge in a k-dimensional continuous space by using a k-dimensional SC with k'-dimensional function values, where a coordinate of a vertex of the SC is values $(x_1, \ldots, x_k)$ of k input variables, a function value of the vertex is k' output values $(y_1, \ldots, y_{k'})$ of a function, and a relationship between the coordinate and the function value is $(y_1, \ldots, y_{k'})=f(x_1, \ldots, x_k)$, where f is a mapping function based on IOV knowledge, and k and k' are natural numbers; and representing a safe boundary of the IOV knowledge by using a boundary of the SC, where the IOV knowledge includes a steering wheel angle of an ego-vehicle, a road curvature, a speed of the ego-vehicle, and an inter-parameter relationship compliant with an objective law of vehicle dynamics, where the steering wheel angle of the ego-vehicle, the road curvature, and the speed of the ego-vehicle are obtained by using a sensor on the ego-vehicle.

In one embodiment, a vertex array is used to record information of all vertices, where a length of the array is a quantity of the vertices of the SC, and each element in the array stores information of one vertex.

In one embodiment, the information of one vertex includes: a coordinate of the vertex and a function value of the vertex, where the function value of the vertex is a function value of the coordinate of the vertex in the mapping function based on the IOV knowledge.

In one embodiment, a cell array is used to record information of all cells of the SC. Information of one cell includes: a vertex index value of the cell and a corresponding face of each face in the cell.

In one embodiment, the boundary of the SC is formed by faces whose corresponding faces are empty in the SC.

According to one aspect, an embodiment of the application provides an apparatus for representing internet of vehicles (IOV) knowledge based on a simplicial complex (SC), where the apparatus includes:

a knowledge representation unit, configured to represent k'-dimensional knowledge in a k-dimensional continuous space by using a k-dimensional SC with k'-dimensional function values, where a coordinate of a vertex of the SC is values $(x_1, \ldots, x_k)$ of k input variables, a function value of the vertex is k' output values $(y_1, \ldots, y_{k'})$ of a function, and a relationship between the coordinate and the function value is $(y_1, \ldots, y_{k'})=f(x_1, \ldots, x_k)$, where f is a mapping function based on IOV knowledge, and k and k' are natural numbers; and a safe boundary representation unit, configured to represent a safe boundary of the IOV knowledge by using a boundary of the SC, where the IOV knowledge includes a steering wheel angle of an ego-vehicle, a road curvature, a speed of the ego-vehicle, and an inter-parameter relationship compliant with an objective law of vehicle dynamics, where the steering wheel angle of the ego-vehicle, the road curvature, and the speed of the ego-vehicle are obtained by using a sensor on the ego-vehicle.

In one embodiment, a vertex array is used to record information of all vertices, where a length of the array is a quantity of the vertices of the SC, and each element in the array stores information of one vertex.

In one embodiment, the information of one vertex includes: a coordinate of the vertex and a function value of the vertex, where the function value of the vertex is a function value of the coordinate of the vertex in the mapping function based on the IOV knowledge.

In one embodiment, a cell array is used to record information of all cells of the SC. Information of one cell includes: a vertex index value of the cell and a corresponding face of each face in the cell.

In one embodiment, the boundary of the SC is formed by faces whose corresponding faces are empty in the SC.

According to one aspect, an embodiment of the application provides a method for importing IOV knowledge based on an SC, where the method includes:

abstracting knowledge in various forms into a knowledge function F, where the knowledge function includes a mapping function f, a safety determining function g, and a knowledge domain D, where f is a mapping function based on IOV knowledge, the safety determining function g is used to determine, for any group of input values $(x_1, x_2, \ldots, x_k)$ in the knowledge domain D, whether the input values are a safe combination in the IOV knowledge, and the knowledge domain D is used to determine a minimum value and a maximum value that can be selected for each input variable $x_i$, where $i=1, 2, \ldots, k$;

performing discrete sampling on the knowledge function F, and creating a vertex set P; and creating a cell set C, and using each cell to fill in a blank space between vertices in the vertex set P, so that a final knowledge base SC is formed.

In one embodiment, the performing discrete sampling on the knowledge function F, and creating a vertex set P includes:

initializing the vertex set P to null; and for each knowledge function F, performing the following operations to perform discrete sampling on Fi:

determining a coordinate of a new candidate sampling point p in D based on the mapping function f and an existing vertex in the vertex set P;

determining, by using the safety determining function g, whether p is in a safe region; and if p is not in the safe region, ignoring the candidate sampling point p, and selecting a next candidate sampling point; or if p is in the safe region, calculating, by using the mapping function f, a function value corresponding to the candidate sampling point p; and adding the candidate sampling point p to the vertex set P as a new vertex.

In one embodiment, the creating a cell set C, and using each cell to fill in a blank space between vertices, so that a final knowledge base SC is formed includes:

splitting the vertex set P into two subsets: P− and P+, where P− includes all vertices on a boundary, and P+ includes all vertices off the boundary;

creating a (k−1)-dimensional cell set C− by using P− as a vertex set;

combining the vertex set P− with the cell set C− to form a (k−1)-dimensional closed simplicial complex S− used to indicate the boundary of the knowledge base SC;

creating a k-dimensional cell set C by using P as a vertex set and S− as a boundary constraint; and combining the vertex set P with the cell set C to form the final knowledge base SC.

According to one aspect, an embodiment of the application provides an apparatus for importing IOV knowledge based on an SC, where the apparatus includes:

an abstraction unit, configured to abstract knowledge in various forms into a knowledge function F, where the knowledge function F includes a mapping function f, a safety determining function g, and a knowledge domain D, where f is a mapping function based on IOV knowledge, the safety determining function g is used to determine, for any group of input values $(x_1, x_2, \ldots, x_k)$ in the knowledge domain D, whether the input values are a safe combination in the IOV knowledge, and the knowledge domain D is used to determine a minimum value and a maximum value that can be selected for each input variable $x_i$, where $i=1, 2, \ldots, k$;

a vertex set creation unit, configured to perform discrete sampling on the knowledge function F, and create a vertex set P; and a cell set creation unit, configured to create a cell set C, and use each cell to fill in a blank space between vertices in the vertex set P created by the vertex set creation unit, so that a final knowledge base SC is formed.

In one embodiment, the vertex set creation unit includes:

a candidate sampling point determining module, configured to determine a coordinate of a new candidate sampling point p in D based on the mapping function f and an existing vertex in the vertex set P;

a determining module, configured to determine, by using the safety determining function g, whether p determined by the candidate sampling point determining module is in a safe region; and if p is not in the safe region, ignore the candidate sampling point p, and select a next candidate sampling point; or if p is in the safe region, calculate, by using the mapping function f, a function value corresponding to the candidate sampling point p; and an updating module, configured to add the candidate sampling point p to the vertex set P as a new vertex.

In one embodiment, the cell set creation unit includes:

a splitting module, configured to split the vertex set P into two subsets: P− and P+, where P− includes all vertices on a boundary, and P+ includes all vertices off the boundary;

a first cell set creation module, configured to create a (k−1)-dimensional cell set C− by using P− as a vertex set;

a boundary representation module, configured to combine the vertex set P− with the cell set C− to form a (k−1)-dimensional closed simplicial complex S− used to indicate the boundary of the knowledge base SC;

a second cell set creation module, configured to create a k-dimensional cell set C by using P as a vertex set and S− as a boundary constraint; and a combining module, configured to combine the vertex set P with the cell set C to form the final knowledge base SC.

According to one aspect, an embodiment of the application provides a method for quickly locating an IOV knowledge point based on an SC, where the method includes:

obtaining a search start point and a start cell other than an input coordinate of a target point; and finding a next cell through an inter-cell corresponding face along a radial direction between the start point and the target point, starting from the start cell, until a cell including the target point is found.

In this case, the target point is within a boundary. The cell including the target point.

According to one aspect, an embodiment of the application provides a method for quickly locating an IOV knowledge point based on an SC, where the method includes:

obtaining a search start point and a start cell other than an input coordinate of a target point; and finding a next cell through an inter-cell corresponding face along a radial direction between the start point and the target point, starting from the start cell, until a last cell before boundary crossing is found.

In one embodiment, in the process of searching for and finding the next cell, checking whether a current search cell includes the target point q, where yes indicates that the current cell is a target cell; and if no, continuing to search for a next cell, and continuing to check whether the found next cell is empty, where if the next cell is empty, it indicates that the target point is out of a boundary and that the last cell before boundary crossing is the target cell, that is, the cell before the next cell is the target cell.

In one embodiment, in the foregoing operation, the obtaining a search start point and a start cell other than an input coordinate of a target point includes the following two implementations:

Approach 1: Using a previous query result. IOV knowledge is usually queried in real time, a time interval between two queries is quite short, and in many cases, there is good continuity between two consecutive queries, that is, a point in a previous query is usually quite close to a point in a current query. In this case, a target point and a target cell in the previous query may be directly used as a start point and a start cell in the current query.

Approach 2: Defining search regions+Specifying regional proxies. If a point in a previous query does not satisfy a condition, that is, continuity between queries is poor, an entire search space may be divided in advance into some small search regions, and a proxy cell is specified for each region and is recorded. During a query, all target points that fall within this region use the proxy cell of this region as a search start cell by default.

In one embodiment, optionally, the obtaining a search start point and a start cell other than an input coordinate of a target point in the foregoing operation includes:
operation 2.1: checking whether there is a previous search result, that is, a target point q' and a target cell $c_{q'}$ in previous locating;
if yes, going to operation 2.2;
if no, going to operation 2.3;
operation 2.2: checking whether the target point q' in the previous locating and the target point q in the current locating are in a same search region;
if yes, going to operation 2.4;
if no, going to operation 2.3;
operation 2.3: using a default regional proxy as an additional search clue, including:
operation 2.3.1: calculating a search region $U_q$ in which the target point q is located;
operation 2.3.2: setting a start cell $c_p$ to a proxy cell of the search region $U_q$; and
operation 2.3.3: setting a start point p to a central point of the start cell $c_p$, and setting a coordinate of the start point p to an average value of coordinates of all vertices in $c_p$; and
operation 2.4: using the previous search result as an additional search clue, including:
operation 2.4.1: setting a start cell $c_p$ to the target cell $c_{q'}$ in the previous locating; and
operation 2.4.2: setting a start point p to the target point q' in the previous locating.

According to one aspect, an embodiment of the application provides an apparatus for quickly locating an IOV knowledge point based on an SC, where the method includes:

an obtaining unit, configured to obtain a search start point and a start cell other than an input coordinate of a target point; and
a search unit, configured to find a next cell through an inter-cell corresponding face along a radial direction between the start point and the target point, starting from the start cell, until a cell including the target point is found.

In this case, the target point is within a boundary. The cell including the target point.

According to one aspect, an embodiment of the application provides a method for quickly locating an IOV knowledge point based on an SC, where the method includes:
an obtaining unit, configured to obtain a search start point and a start cell other than an input coordinate of a target point; and
a search unit, configured to find a next cell through an inter-cell corresponding face along a radial direction between the start point and the target point, starting from the start cell, until a last cell before boundary crossing is found.

In one embodiment, the search unit is configured to check whether a current found cell includes the target point q, where yes indicates that the current cell is a target cell; and if no, continue to search for a next cell, and continue to check whether the found next cell is empty, where if the next cell is empty, it indicates that the target point is out of a boundary and that the last cell before boundary crossing is the target cell, that is, the cell before the next cell is the target cell.

In one embodiment, the obtaining unit is configured to check whether there is a previous search result, that is, a target point q' and a target cell $c_{q'}$ in previous locating; and
if yes, check whether the target point q' in the previous locating and the target point q in the current locating are in a same search region, and if the target point q' and the target point q are in the same region, use the previous search result as an additional search clue, where optionally, this includes: setting a start cell $c_p$ to the target cell $c_{q'}$ in the previous locating; and setting a start point p to the target point q' in the previous locating; or
if no, use a default regional proxy as an additional search clue, where optionally, this includes: calculating a search region $U_q$ in which the target point q is located; setting a start cell $c_p$ to a proxy cell of the search region $U_q$; and setting a start point p to a central point of the start cell $c_p$, and setting a coordinate of the start point p to an average value of coordinates of all vertices in $c_p$.

According to one aspect, an embodiment of the application provides a method for deriving IOV knowledge based on an SC, where the method includes:
finding, based on a coordinate of any given point p, a target cell corresponding to the point p, where
optionally, if the point p is located within a boundary of an SC, a target cell c including the point p needs to be found, and c is used for subsequent derivation (internal derivation); or if the point c is located out of a boundary of an SC, a target cell c that is on the boundary and does not include p but is relatively close to p needs to be found, and c is used for subsequent derivation (external derivation); a method for finding the target cell corresponding to the point p is described in detail in the foregoing embodiment, and is not described again herein;
calculating a local coordinate of the point p in the corresponding target cell c; and combining the local coordinate of p with a function value of a vertex in c into a local function, and calculating a function value of the point p by using the local function.

According to one aspect, an embodiment of the application provides an apparatus for deriving IOV knowledge based on an SC, where the apparatus includes:

a target cell search unit, configured to find, based on a coordinate of any given point p, a target cell corresponding to the point p, where optionally, if the point p is located within a boundary of an SC, a target cell c including the point p needs to be found, and c is used for subsequent derivation (internal derivation); or if the point c is located out of a boundary of an SC, a target cell c that is on the boundary and does not include p but is relatively close to p needs to be found, and c is used for subsequent derivation (external derivation); a method for finding the target cell corresponding to the point p is described in detail in the foregoing embodiment, and is not described again herein;

a local coordinate calculation unit, configured to calculate a local coordinate of the point p in the corresponding target cell c; and a function value calculation unit, configured to combine the local coordinate of p with a function value of a vertex in c into a local function, and calculate a function value of the point by using the local function.

According to one aspect, an embodiment of the application provides a method for updating IOV knowledge based on an SC, where the method includes:

local fine adjustment of IOV knowledge, which may be concluded as modifying a function value of a vertex of an SC;

adjustment of a local sampling rate of the IOV knowledge, which may be concluded as adding or deleting an internal vertex of the SC; and expansion and shrinkage of an IOV knowledge boundary, which may be concluded as adding an external vertex of the SC or deleting a boundary vertex of the SC.

In one embodiment, modifying a function value of a vertex of the SC may be: for a given vertex, directly modifying a function value recorded on the vertex.

In one embodiment, shrinkage of a knowledge boundary and reduction of a local sampling rate in a knowledge space can be both implemented by deleting a vertex of the SC.

In one embodiment, assuming that a vertex to be deleted is $p_x$, a operation of deleting the vertex includes:

operation 1: finding all cells that use $p_x$ as a vertex, where it is assumed that a set of found cells is $C=\{c_1, c_2, \ldots, c_m\}$;

operation 2: determining whether $p_x$ is on a boundary of the SC; and if yes, which belongs to a case of deleting a boundary vertex, going to operation 3; or if no, which belongs to a case of deleting an internal vertex, going to operation 5;

operation 3: deleting all the cells that use $p_x$ as a vertex, that is, deleting all the cells in the set C from a cell array of the SC;

operation 4: deleting the vertex $p_x$, that is, deleting $p_x$ from a vertex array of the SC; and operation 5: combining $p_x$ to an adjacent vertex, and deleting a related cell, where this may be implemented in the following operations:

operation 5.1: selecting a vertex connected to $p_x$, for example, selecting, from a cell $c_1$, any vertex $p_{x'}$ different from $p_x$;

operation 5.2: splitting the cell set C that uses $p_x$ as a vertex into two parts: $C_x$ and $C_{x'}$, where a cell in $C_{x'}$ includes both vertices $p_x$ and $p_{x'}$, but a cell in $C_x$ includes only the vertex $p_x$ and does not include a vertex $p_{x'}$;

operation 5.3: for each cell $c_i$ in the cell set $C_x$, replacing the vertex $p_x$ in $c_i$ with the vertex $p_{x'}$; and operation 5.4: directly deleting each cell in the cell set $C_{x'}$.

In one embodiment, expansion of the knowledge boundary and increase of the local sampling rate in the knowledge space can be both implemented by adding a new vertex of the SC.

In one embodiment, a operation of adding a vertex p to a k-dimensional SC includes:

operation 1: calculating a target cell c corresponding to a point p, where it should be noted that, the point p herein is not a vertex of the SC yet, and only a coordinate of the point p is input herein;

optionally, the target cell c corresponding to the point p may be obtained by using the foregoing method for quickly locating an IOV knowledge point based on an SC;

operation 2: adding a new vertex $p_x=p$ to a vertex array of the SC, which means that a coordinate of the new vertex is equal to the coordinate of the point p;

operation 3: setting a function value of the new vertex $p_x$ to y, where optionally, y may be directly provided by an invoker, or may be automatically derived based on the foregoing embodiment of the method for deriving IOV knowledge based on an SC;

operation 4: determining whether the target cell includes the point p; and if yes, which belongs to a case of inserting a new vertex in the SC, going to operation 5; or if no, which belongs to a case of inserting a new vertex out of a boundary of the SC, going to operation 6;

operation 5: splitting the target cell c into k+1 new cells by using p as a center; and operation 6: adding a new cell c' outside the target cell c, which is equivalent to expanding the boundary from c to c'.

According to one aspect, an embodiment of the application provides an apparatus for updating IOV knowledge based on an SC, where the apparatus includes:

a modification unit, configured to modify a function value of a vertex of an SC, where optionally, the modification unit is configured to directly modify, for a given vertex, a function value recorded on the vertex;

a deletion unit, configured to delete an internal vertex of the SC or delete a boundary vertex of the SC; and an addition unit, configured to add an internal vertex of the SC or add an external vertex of the SC.

In one embodiment, assuming that a vertex to be deleted is $p_x$, the deletion unit includes:

a search module, configured to find all cells that use $p_x$ as a vertex, where it is assumed that a set of found cells is $C=\{c_1, c_2, \ldots, c_m\}$;

a boundary determining module, configured to determine whether $p_x$ is on a boundary of the SC; and if yes, which belongs to a case of deleting a boundary vertex, invoke a first deletion module; or if no, which belongs to a case of deleting an internal vertex, invoke a second deletion module;

the first deletion module, configured to delete all the cells that use $p_x$ as a vertex, that is, delete all the cells in the set C from a cell array of the SC; and delete the vertex $p_x$, that is, delete $p_x$ from a vertex array of the SC; and the second deletion module, configured to combine $p_x$ to an adjacent vertex, and delete a related cell. The second deletion module is configured to:

select a vertex connected to $p_x$, for example, select, from a cell $c_1$, any vertex $p_{x'}$ different from $p_x$;

split the cell set C that uses $p_x$ as a vertex into two parts: $C_x$ and $C_{x'}$, where a cell in $C_{x'}$ includes both vertices $p_x$ and $p_{x'}$, but a cell in $C_x$ includes only the vertex $p_x$ and does not include a vertex $p_{x'}$;

for each cell $c_1$ in the cell set $C_x$, replace the vertex $p_x$ in $c_i$ with the vertex $p_{x'}$; and delete each cell in the cell set $C_{x'}$.

In one embodiment, the addition unit includes:

a target cell calculation module, configured to calculate a target cell c corresponding to a point p, where it should be noted that, the point p herein is not a vertex of the SC yet, and only a coordinate of the point p is input herein;

optionally, the target cell calculation module may obtain, by using the foregoing method for quickly locating an IOV knowledge point based on an SC, the target cell c corresponding to the point p;

an addition module, configured to add a new vertex $p_x$=p to a vertex array of the SC, which means that a coordinate of the new vertex is equal to the coordinate of the point p, and set a function value of the new vertex $p_x$ to y, where optionally, y may be directly provided by an invoker, or may be automatically derived based on the foregoing embodiment of the method for deriving IOV knowledge based on an SC;

a determining module, configured to determine whether the target cell includes the point p; and if yes, which belongs to a case of inserting a new vertex in the SC, invoke a splitting module; or if no, which belongs to a case of inserting a new vertex out of the boundary of the SC, invoke an expansion module;

the splitting module, configured to split the target cell c into k+1 new cells; and the expansion module, configured to add a new cell c' outside the target cell c, which is equivalent to expanding the boundary from c to c'.

Another aspect of the application provides a computer system, including one or more processors, a memory, a communications interface, a receiver, a transmitter, and an input/output module. When the processor may be configured to invoke an implementation program stored in the memory, the following operations are performed:

representing k'-dimensional knowledge in a k-dimensional continuous space by using a k-dimensional SC with k'-dimensional function values, where a coordinate of a vertex of the SC is values $(x_1, \ldots, x_k)$ of k input variables, a function value of the vertex is k' output values $(y_1, \ldots, y_{k'})$ of a function, and a relationship between the coordinate and the function value is $(y_1, \ldots, y_{k'})=f(x_1, \ldots, x_k)$, where f is a mapping function based on IOV knowledge, and k and k' are natural numbers; and representing a safe boundary of the IOV knowledge by using a boundary of the SC, where the IOV knowledge includes a steering wheel angle of an ego-vehicle, a road curvature, a speed of the ego-vehicle, and an inter-parameter relationship compliant with an objective law of vehicle dynamics, where the steering wheel angle of the ego-vehicle, the road curvature, and the speed of the ego-vehicle are obtained by using a sensor on the ego-vehicle.

The computer system may be installed on a vehicle, and the vehicle on which the computer system is installed has a self-driving capability.

Another aspect of the application provides a computer system, including one or more processors, a memory, a communications interface, a receiver, a transmitter, and an input/output module. When the processor may be configured to invoke an implementation program stored in the memory, the following operations are performed:

abstracting knowledge in various forms into a knowledge function F, where the knowledge function includes a mapping function f, a safety determining function g, and a knowledge domain D, where f is a mapping function based on IOV knowledge, the safety determining function g is used to determine, for any group of input values $(x_1, x_2, \ldots, x_k)$ in the knowledge domain D, whether the input values are a safe combination in the IOV knowledge, and the knowledge domain D is used to determine a minimum value and a maximum value that can be selected for each input variable $x_i$, where i=1, 2, . . . , k;

performing discrete sampling on the knowledge function F, and creating a vertex set P; and creating a cell set C, and using each cell to fill in a blank space between vertices in the vertex set P, so that a final knowledge base SC is formed.

Another aspect of the application provides a computer system, including one or more processors, a memory, a communications interface, a receiver, a transmitter, and an input/output module. When the processor may be configured to invoke an implementation program stored in the memory, the following operations are performed:

obtaining a search start point and a start cell other than an input coordinate of a target point; and finding a next cell through an inter-cell corresponding face along a radial direction between the start point and the target point, starting from the start cell, until a cell including the target point is found.

Another aspect of the application provides a computer system, including one or more processors, a memory, a communications interface, a receiver, a transmitter, and an input/output module. When the processor may be configured to invoke an implementation program stored in the memory, the following operations are performed:

obtaining a search start point and a start cell other than an input coordinate of a target point; and finding a next cell through an inter-cell corresponding face along a radial direction between the start point and the target point, starting from the start cell, until a last cell before boundary crossing is found.

In one embodiment, in the process of searching for and finding the next cell, checking whether a current search cell includes the target point q, where yes indicates that the current cell is a target cell; and if no, continue to search for a next cell, and continue to check whether the found next cell is empty, where if the next cell is empty, it indicates that the target point is out of a boundary and that the last cell before boundary crossing is the target cell, Another aspect of the application provides a computer system, including one or more processors, a memory, a communications interface, a receiver, a transmitter, and an input/output module. When the processor may be configured to invoke an implementation program stored in the memory, the following operations are performed:

finding, based on a coordinate of any given point p, a target cell corresponding to the point p, where optionally, if the point p is located within a boundary of an SC, a target cell c including the point p needs to be found, and c is used for subsequent derivation (internal derivation); or if the point c is located out of a boundary of an SC, a target cell c that is on the boundary and does not include p but is relatively close to p needs to be found, and c is used for subsequent derivation (external derivation); a method for finding the target cell corresponding to the point p is described in detail in the foregoing embodiment, and is not described again herein;

calculating a local coordinate of the point p in the corresponding target cell c; and combining the local coordinate of p with a function value of a vertex in c into a local function, and calculating a function value of the point p by using the local function.

Another aspect of the application provides a computer system, including one or more processors, a memory, a communications interface, a receiver, a transmitter, and an input/output module. When the processor may be configured to invoke an implementation program stored in the memory, the following operations are performed:

local fine adjustment of IOV knowledge, which may be concluded as modifying a function value of a vertex of an SC;

adjustment of a local sampling rate of the IOV knowledge, which may be concluded as adding or deleting an internal vertex of the SC; and expansion and shrinkage of an IOV knowledge boundary, which may be concluded as adding an external vertex of the SC or deleting a boundary vertex of the SC.

In one embodiment, modifying a function value of a vertex of the SC may be: for a given vertex, directly modifying a function value recorded on the vertex.

In one embodiment, shrinkage of a knowledge boundary and reduction of a local sampling rate in a knowledge space can be both implemented by deleting a vertex of the SC.

In one embodiment, assuming that a vertex to be deleted is $p_x$, a operation of deleting the vertex includes:

operation 1: finding all cells that use $p_x$ as a vertex, where it is assumed that a set of found cells is $C=\{c_1, c_2, \ldots, c_m\}$;

operation 2: determining whether $p_x$ is on a boundary of the SC; and if yes, which belongs to a case of deleting a boundary vertex, going to operation 3; or if no, which belongs to a case of deleting an internal vertex, going to operation 5;

operation 3: deleting all the cells that use $p_x$ as a vertex, that is, deleting all the cells in the set C from a cell array of the SC;

operation 4: deleting the vertex $p_x$, that is, deleting $p_x$ from a vertex array of the SC; and operation 5: combining $p_x$ to an adjacent vertex, and deleting a related cell, where this may be implemented in the following operations:

operation 5.1: selecting a vertex connected to $p_x$, for example, selecting, from a cell $c_1$, any vertex $p_{x'}$ different from $p_x$;

operation 5.2: splitting the cell set C that uses $p_x$ as a vertex into two parts: $C_{x'}$ and $C_{x''}$, where a cell in $C_{x'}$ includes both vertices $p_x$ and $p_{x'}$, but a cell in $C_{x''}$ includes only the vertex $p_x$ and does not include a vertex $p_{x'}$;

operation 5.3: for each cell $c_i$ in the cell set $C_{x'}$, replacing the vertex $p_x$ in $c_i$ with the vertex $p_{x'}$; and operation 5.4: directly deleting each cell in the cell set $C_{x''}$.

In one embodiment, expansion of the knowledge boundary and increase of the local sampling rate in the knowledge space can be both implemented by adding a new vertex of the SC.

In one embodiment, a operation of adding a vertex p to a k-dimensional SC includes:

operation 1: calculating a target cell c corresponding to a point p, where it should be noted that, the point p herein is not a vertex of the SC yet, and only a coordinate of the point p is input herein;

optionally, the target cell c corresponding to the point p may be obtained by using the foregoing method for quickly locating an IOV knowledge point based on an SC;

operation 2: adding a new vertex $p_x=p$ to a vertex array of the SC, which means that a coordinate of the new vertex is equal to the coordinate of the point p;

operation 3: setting a function value of the new vertex $p_x$ to y, where optionally, y may be directly provided by an invoker, or may be automatically derived based on the foregoing embodiment of the method for deriving IOV knowledge based on an SC;

operation 4: determining whether the target cell includes the point p; and if yes, which belongs to a case of inserting a new vertex in the SC, going to operation 5; or if no, which belongs to a case of inserting a new vertex out of a boundary of the SC, going to operation 6;

operation 5: splitting the target cell c into k+1 new cells by using p as a center; and operation 6: adding a new cell c' outside the target cell c, which is equivalent to expanding the boundary from c to c'.

Another aspect of the application further provides knowledge base software, where program code of the knowledge base software may be stored in a readable storage medium, and when a computer mounted on an ego-vehicle or a control center on the internet of vehicles reads program code of protocol stack software stored in the readable storage medium, the following operations are implemented:

representing k'-dimensional knowledge in a k-dimensional continuous space by using a k-dimensional SC with k'-dimensional function values, where a coordinate of a vertex of the SC is values $(x_1, \ldots, x_k)$ of k input variables, a function value of the vertex is k' output values $(y_1, \ldots, y_{k'})$ of a function, and a relationship between the coordinate and the function value is $(y_1, \ldots, y_{k'})=f(x_1, \ldots, x_{k'})$, where f is a mapping function based on IOV knowledge, and k and k' are natural numbers; and representing a safe boundary of the IOV knowledge by using a boundary of the SC, where the IOV knowledge includes a steering wheel angle of an ego-vehicle, a road curvature, a speed of the ego-vehicle, and an inter-parameter relationship compliant with an objective law of vehicle dynamics, where the steering wheel angle of the ego-vehicle, the road curvature, and the speed of the ego-vehicle are obtained by using a sensor on the ego-vehicle.

Another aspect of the application further provides knowledge base software, where program code of the knowledge base software may be stored in a readable storage medium, and when a computer mounted on an ego-vehicle or a control center on the internet of vehicles reads program code of protocol stack software stored in the readable storage medium, the following operations are implemented:

abstracting knowledge in various forms into a knowledge function F, where the knowledge function includes a mapping function f, a safety determining function g, and a knowledge domain D, where f is a mapping function based on IOV knowledge, the safety determining function g is used to determine, for any group of input values $(x_1, x_2, \ldots, x_k)$ in the knowledge domain D, whether the input values are a safe combination in the IOV knowledge, and the knowledge domain D is used to determine a minimum value and a maximum value that can be selected for each input variable $x_i$, where i=1, 2, . . . , k;

performing discrete sampling on the knowledge function F, and creating a vertex set P; and creating a cell set C, and using each cell to fill in a blank space between vertices in the vertex set P, so that a final knowledge base SC is formed.

Another aspect of the application further provides knowledge base software, where program code of the knowledge base software may be stored in a readable storage medium, and when a computer mounted on an ego-vehicle or a control center on the internet of vehicles reads program code of protocol stack software stored in the readable storage medium, the following operations are implemented:

obtaining a search start point and a start cell other than an input coordinate of a target point; and finding a next cell through an inter-cell corresponding face along a radial direction between the start point and the target point, starting from the start cell, until a cell including the target point is found.

Another aspect of the application further provides knowledge base software, where program code of the knowledge base software may be stored in a readable storage medium, and when a computer mounted on an ego-vehicle or a control center on the internet of vehicles reads program code of protocol stack software stored in the readable storage medium, the following operations are implemented:

obtaining a search start point and a start cell other than an input coordinate of a target point; and finding a next cell through an inter-cell corresponding face along a radial direction between the start point and the target point, starting from the start cell, until a last cell before boundary crossing is found.

In one embodiment, in the process of searching for and finding the next cell, checking whether a current search cell includes the target point q, where yes indicates that the current cell is a target cell; and if no, continuing to search for a next cell, and continuing to check whether the found next cell is empty, where if the next cell is empty, it indicates that the target point is out of a boundary and that the last cell before boundary crossing is the target cell, Another aspect of the application further provides knowledge base software, where program code of the knowledge base software may be stored in a readable storage medium, and when a computer mounted on an ego-vehicle or a control center on the internet of vehicles reads program code of protocol stack software stored in the readable storage medium, the following operations are implemented:

finding, based on a coordinate of any given point p, a target cell corresponding to the point p, where optionally, if the point p is located within a boundary of an SC, a target cell c including the point p needs to be found, and c is used for subsequent derivation (internal derivation); or if the point c is located out of a boundary of an SC, a target cell c that is on the boundary and does not include p but is relatively close to p needs to be found, and c is used for subsequent derivation (external derivation); a method for finding the target cell corresponding to the point p is described in detail in the foregoing embodiment, and is not described again herein;

calculating a local coordinate of the point p in the corresponding target cell c; and combining the local coordinate of p with a function value of a vertex in c into a local function, and calculating a function value of the point p by using the local function.

Another aspect of the application further provides knowledge base software, where program code of the knowledge base software may be stored in a readable storage medium, and when a computer mounted on an ego-vehicle or a control center on the internet of vehicles reads program code of protocol stack software stored in the readable storage medium, the following operations are implemented:

local fine adjustment of IOV knowledge, which may be concluded as modifying a function value of a vertex of an SC;

adjustment of a local sampling rate of the IOV knowledge, which may be concluded as adding or deleting an internal vertex of the SC; and expansion and shrinkage of an IOV knowledge boundary, which may be concluded as adding an external vertex of the SC or deleting a boundary vertex of the SC.

In one embodiment, modifying a function value of a vertex of the SC may be: for a given vertex, directly modifying a function value recorded on the vertex.

In one embodiment, shrinkage of a knowledge boundary and reduction of a local sampling rate in a knowledge space can be both implemented by deleting a vertex of the SC.

In one embodiment, assuming that a vertex to be deleted is $p_x$, a operation of deleting the vertex includes:

operation 1: finding all cells that use $p_x$ as a vertex, where it is assumed that a set of found cells is $C = \{c_1, c_2, \ldots, c_m\}$;

operation 2: determining whether $p_x$ is on a boundary of the SC; and if yes, which belongs to a case of deleting a boundary vertex, going to operation 3; or if no, which belongs to a case of deleting an internal vertex, going to operation 5;

operation 3: deleting all the cells that use $p_x$ as a vertex, that is, deleting all the cells in the set C from a cell array of the SC;

operation 4: deleting the vertex $p_x$, that is, deleting $p_x$ from a vertex array of the SC; and operation 5: combining $p_x$ to an adjacent vertex, and deleting a related cell, where this may be implemented in the following operations:

operation 5.1: selecting a vertex connected to $p_x$, for example, selecting, from a cell $c_1$, any vertex $p_{x'}$ different from $p_x$;

operation 5.2: splitting the cell set C that uses $p_x$ as a vertex into two parts: $C_x$ and $C_{x'}$, where a cell in $C_{x'}$ includes both vertices $p_x$ and $p_{x'}$, but a cell in $C_x$ includes only the vertex $p_x$ and does not include a vertex $p_{x'}$;

operation 5.3: for each cell $c_i$ in the cell set $C_x$, replacing the vertex $p_x$ in $c_i$ with the vertex $p_{x'}$; and operation 5.4: directly deleting each cell in the cell set $C_{x'}$.

In one embodiment, expansion of the knowledge boundary and increase of the local sampling rate in the knowledge space can be both implemented by adding a new vertex of the SC.

In one embodiment, a operation of adding a vertex p to a k-dimensional SC includes:

operation 1: calculating a target cell c corresponding to a point p, where it should be noted that, the point p herein is not a vertex of the SC yet, and only a coordinate of the point p is input herein;

optionally, the target cell c corresponding to the point p may be obtained by using the foregoing method for quickly locating an IOV knowledge point based on an SC;

operation 2: adding a new vertex $p_x$=p to a vertex array of the SC, which means that a coordinate of the new vertex is equal to the coordinate of the point p;

operation 3: setting a function value of the new vertex $p_x$ to y, where optionally, y may be directly provided by an invoker, or may be automatically derived based on the foregoing embodiment of the method for deriving IOV knowledge based on an SC;

operation 4: determining whether the target cell includes the point p; and if yes, which belongs to a case of inserting a new vertex in the SC, going to operation 5; or if no, which belongs to a case of inserting a new vertex out of a boundary of the SC, going to operation 6;

operation 5: splitting the target cell c into k+1 new cells by using p as a center; and operation 6: adding a new cell c' outside the target cell c, which is equivalent to expanding the boundary from c to c'.

In the foregoing technical solutions of the embodiments of the application, an unstructured SC is used, and k'-dimensional knowledge in a k-dimensional continuous space is represented by using a k-dimensional SC with k'-dimensional function values. Therefore, flexible knowledge sampling is achieved, sampling points may be randomly distributed in any positions, very low spatial complexity is achieved, and fast memory operations are supported. An SC-based knowledge representation mode can conveniently and accurately specify a safe boundary, so that an upper-layer online learning algorithm can confine knowledge space exploration within a safe range.

DESCRIPTION OF EMBODIMENTS

To make the objectives, technical solutions, and advantages of the embodiments of the application clearer, the following further describes the implementations of the application in detail with reference to the accompanying drawings.

Figure 4A:
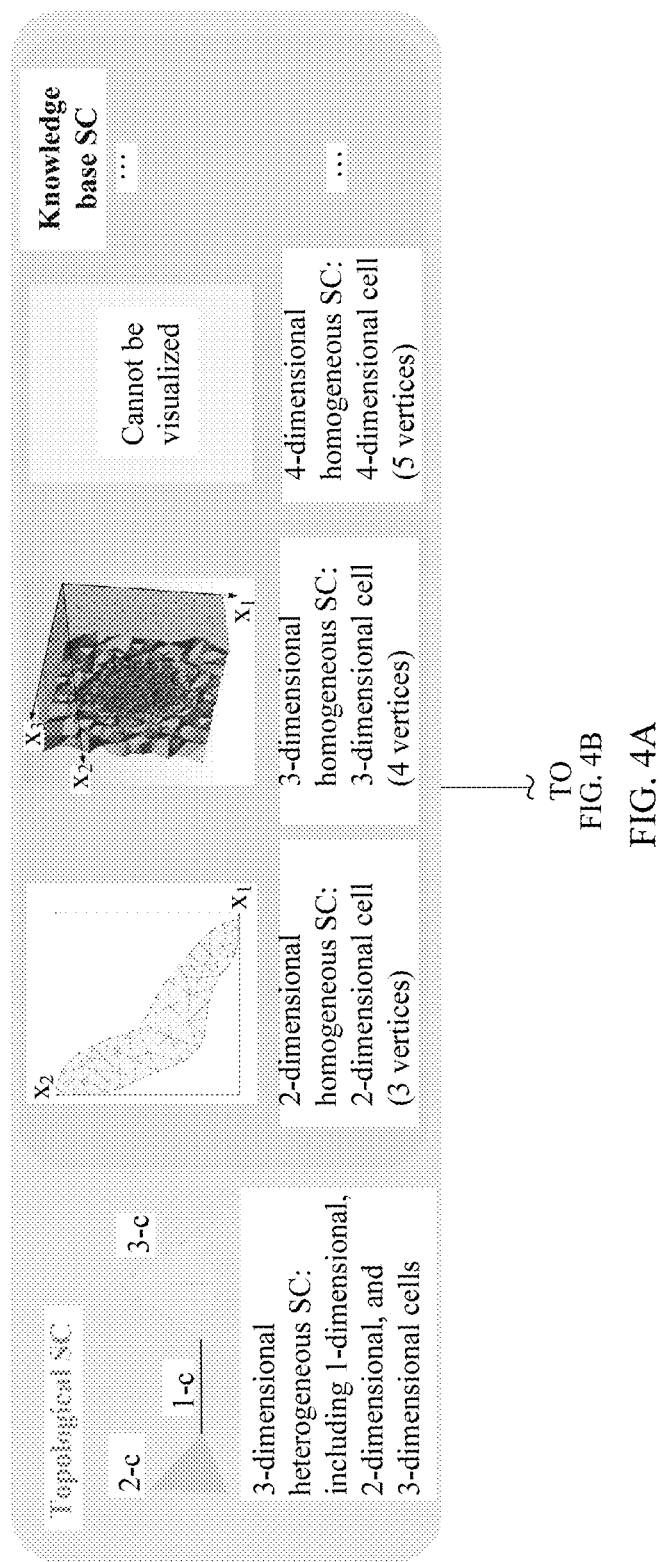
FIG. 4A and FIG. 4B are a schematic diagram of several SC representations according to an embodiment of the application.
Figure 4B:
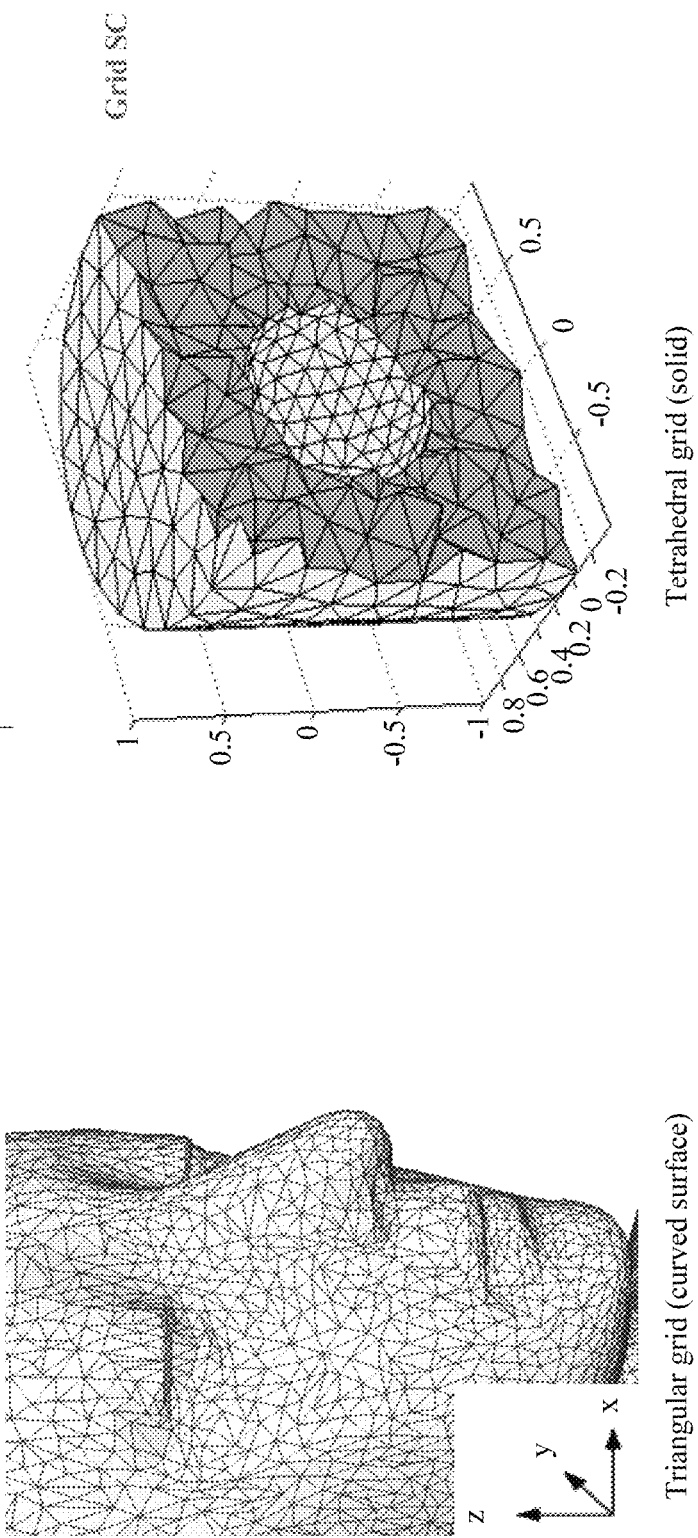

FIG. 4A and FIG. 4B are a schematic diagram of several SC representations according to an embodiment of the application. As shown in FIG. 4A and FIG. 4B:

Simplicial Complex:

The simplicial complex (SC) is a concept that originates from topology. The SC is a mode used to represent a multidimensional topological space. Simply, a complex topological space is formed by splicing several cells (Cell) in simple forms. A simplicial complex (SC) is a combination of several cells (Cell). Each cell may be a 0-dimensional cell (point), a 1-dimensional cell (line segment, with 2 vertices), a 2-dimensional cell (triangle, with 3 vertices), a 3-dimensional cell (tetrahedron, with 4 vertices), or a K-dimensional cell (K-dimensional super body enclosed by K+1 vertices) of higher dimensions. Each K-cell includes several faces (Face) of lower dimensions. For example, one 3-cell (tetrahedron) includes four 2-faces (triangular faces), six 1-faces (line segments and sides), and four 0-faces (points).

Dimensions of a simplicial complex are determined by a highest-dimensional cell included in the simplicial complex. If the highest-dimensional cell is K-dimensional, the simplicial complex is K-dimensional. For example, a 2-dimensional simplicial complex is a triangular grid. In other words, the simplicial complex may be expansion of the triangular grid in any dimension. Usually, one K-dimensional SC includes cells of all dimensions including K dimensions and those lower than K dimensions, that is, it is a heterogeneous SC. In a particular case, if one K-dimensional SC includes only K-dimensional cells but does not include cells of lower dimensions, this SC is a homogeneous SC, as shown in FIG. 4A and FIG. 4B. More particularly, one 2-dimensional homogeneous SC is a triangular grid, and one 3-dimensional homogeneous SC is a tetrahedral grid.

Proxy cell: It is a concept used to quickly locate a knowledge point. If a coordinate of a target point is given, a target cell in which the target point is located needs to be found. One method for increasing a search speed is to divide an entire search space (entire SC space) into several smaller search regions, and specify a proxy cell in each search region as a default search start point for searching in the search region.

Grid SC:

In a computer-aided design (CAD) or computer graphics (CG), two special homogeneous SCs are usually used.
 (1) Triangular grid: It is used to describe a plane or a curved surface (for example, a human face), and is essentially a 2-dimensional topological SC embedded in a 2-dimensional geometric space (plane) or a 3-dimensional geometric space (curved surface).
 (2) Tetrahedral grid: It is used to describe a solid (for example, a mechanical part), and is essentially a 3-dimensional topological SC embedded in a 3-dimensional geometric space.

Model Based on a Fitting Function:

This model is usually used in various regression (Regression) algorithms and classical statistical learning algorithms (for example, various Bayes models). First, a function (for example, a quadratic function, a cubic function, or a random process) in a form is selected, and a parameter (for example, a coefficient of each term, or a prior probability parameter) in the function is adjusted by using an optimization process, so that a final fitting function can approach a function value in known training data as far as possible. In addition, for an unknown input point, this fitting function may also be used to calculate a corresponding function value. If fitting of the function is appropriate, the calculated function value should approach an ideal function value as far as possible.

Model Based on a Neural Network (NN):

This model is usually used in a deep learning algorithm or the like. First, a network in a form (for example, a quantity of layers, a quantity of points per layer, and a connection relationship between the layers) is selected, and a parameter (that is, a weight on a side) in the network is adjusted by using a training process (that is, an optimization process), so that a final network can accurately reflect a function value in known training data as far as possible. In addition, an unknown input point may also be sent to this network, and a corresponding function value is calculated. If network training is appropriate, the calculated function value should approach an ideal function value as far as possible.

Table-Based Knowledge Representation Solution:
 (1) Uniform table (UL): A d-dimensional function is represented by using a d-dimensional orthogonal table, where each grid point (crosspoint) is a sampling point that records a function value of the point. In each dimension, various sampling points are equidistant (evenly distributed), that is, shapes and sizes of all small cells are completely the same, as shown in FIG. 2A.
 (2) Non-uniform table (NL): It is similar to the UL, and is still an orthogonal structure (referred to as "structured") on the whole, that is, every horizontal line is straight and passes through all vertical lines, and every vertical line is straight and passes through all horizontal lines. However, various sampling points may not be equidistant (that is, not evenly distributed), as shown in FIG. 2B.
 (3) K-D tree (KT): It is similar to the NL, but is no longer an orthogonal structure (referred to as semi-structured), that is, not every horizontal line necessarily passes through all vertical lines, and not every vertical line necessarily passes through all horizontal lines. In addition, a decision tree (DT) algorithm is also essentially based on the KT, as shown in FIG. 2C.

How should a system and a method be provided to implement IOV knowledge representations and provide management functions such as knowledge locating, derivation, and updating, to support transition of the IOV in integrated mode from a rule-based technical path to a learning-based technical path and adaptively support various learning algorithms in AGI mode and various IOV applications? The following problems may be encountered in implementation of the system and method.

Technical Problem 1: Reuse of an IOV Rule

In a process of transition between technical paths of the IOV, preferably, rules and experience accumulated in the rule-based technical path can be maximized in the learning-based technical path, instead of simply abandoning experience and learning from scratch. However, the accumulated rules and experience may be a formula (for example, a Kalman model describing a low-speed steering wheel angle) including an empirical parameter, or may be an optimization process (for example, a kinematic model describing a high-speed steering wheel angle), or is in another form. How should these different problems and different forms of rules be represented again in a unified manner and imported to a new learning system?

Technical Problem 2: Local Representation of IOV Knowledge

Plenty of IOV knowledge can be hardly described by using a single global formula or model. For example, it is appropriate to describe a relationship between a steering wheel angle and a vehicle speed and a road curvature by using the Kalman model in a case of a low speed, but it is more appropriate to describe the relationship by using the kinematic model in a case of a high speed. However, even if only one model (for example, the Kalman model) is considered, for different regions in the knowledge space (that is, different combinations of vehicle speeds and curvatures), a parameter (for example, a preview distance) in the model should also be set to different optimum values. How should such knowledge be represented by using a model that varies depending on a region, instead of mechanically using a single global model.

Technical Problem 3: Representation of a Safe Boundary of the IOV Knowledge

The IOV knowledge is usually directly related to safety. For example, it is safe to drive at 120 km/h on a straight road, or at 30 km/h on a bending road approximate to a right angle; however, it is unsafe for most vehicles to drive at 120 km/h on a bending road approximate to a right angle. In this knowledge relating to a combination of a vehicle speed and a curvature, and a lot of other IOV knowledge, usually a boundary needs to be defined to distinguish a safe combination from an unsafe combination. How should this safe boundary be described and represented accurately and conveniently? How is underlying support provided for updating the safe boundary?

Technical Problem 4: Drawing Inferences from the IOV Knowledge

The IOV learning system in AGI mode stresses a capability of inferring any knowledge point from only a few knowledge points. For example, what steering wheel angle is appropriate when only a vehicle speed of 0, 10, 20, 30, 40, 50, or 60 (km/h) and a curvature of 0, 0.02, 0.04, 0.06, 0.08, or 0.10 are known? A steering wheel angle value needs to be automatically inferred (internally inferred) for any combination of a vehicle speed of 0 to 60 and a curvature of 0 to 0.10), and even a steering wheel angle value needs to be automatically inferred (externally inferred) for any combination of a vehicle speed greater than 60 and a curvature greater than 0.10. How can the entire knowledge space be automatically derived based on only several known discrete knowledge points?

Technical Problem 5: Local Updating of the IOV Knowledge

The IOV learning system in AGI mode stresses a fine adjustment of knowledge, which may be confined within a determined local range, without global impact. For example, if a steering wheel angle value in proximity of a vehicle speed 30 and a curvature 0.06 is not ideal, an adjustment of the steering wheel angle value only in proximity of this combination should be allowed. In addition, there are other updating types, for example, increase or decrease of a local sampling rate, and local shrinkage or expansion of the safe boundary. How is underlying support provided for local updating of these different types of knowledge?

Technical Problem 6: Compensation for a Shortcoming of the SC Itself

Each knowledge representation mode has its own shortcoming, and the SC representation mode used in this embodiment of the present invention is not an exception. In IOV knowledge representations, a major disadvantage of the topological SC is that quick locating of a knowledge point is not supported. However, locating of a knowledge point is exactly an operation frequently used in IOV knowledge management, and must be completed quickly. For other disadvantages of the topological SC, refer to Section 1.4.2. How should the shortcoming of the topological SC itself be compensated for, so that the topological SC can better serve IOV knowledge representation and management?

To resolve the foregoing technical problems, the embodiments of the application provide a method and a system for representing and using an IOV knowledge base based on an SC. An SC concept and technology in topology are introduced in the IOV field, and a tool originally used to describe a topological space and perform topological analysis is changed into a general tool used for representing knowledge and managing knowledge in any dimension. An SC is used as a carrier to perform discrete sampling and continuous derivation on knowledge and implement fast knowledge locating and local knowledge updating.

The following briefly describes main embodiments of the application.

Embodiment 1: SC-Based IOV Knowledge Representation Mode

An SC is used as a carrier of knowledge in an IOV multidimensional continuous space to perform discrete sampling and continuous derivation.

A k-dimensional SC with k'-dimensional function values is used to represent a piece of IOV knowledge f: $R^k \to R^{k'}$ (that is, a function having k input variables and k' output values: $<x_1, \ldots, x_k> \to <y_1, \ldots, y_{k'}>$), where
  any point in the SC represents an input point of f;
  any point in the SC has a k-dimensional coordinate, that is, values of k input variables on the point; and
  any point in the SC has a k'-dimensional function value, that is, k' output values of f on the point.

Discrete Sampling and Continuous Derivation:

Discrete sampling: Vertices of the SC are used as sampling points. Coordinates and function values are recorded only on the points, but are not recorded on other points (non-sampling points).

Continuous derivation: A cell of the SC is used as a medium for deriving a function value. A function value on any non-sampling point in the SC is derived from a function value on a vertex (sampling point) of a corresponding cell.

A boundary of the SC is used to represent a boundary (a safe boundary, an effective boundary, or others) of the IOV knowledge.

A special data structure is designed to implement fast memory operations and commonality in any dimension.

Embodiment 2: Method for Importing Existing IOV Knowledge Based on an SC

A general method for importing knowledge into an SC is designed (that is, a knowledge base initialization method): first selecting an appropriate vertex (discrete sampling point) set of the SC, calculating a function value of each vertex, and then creating cells of the SC to connect each vertex seamlessly.

Particularly, the existing knowledge also includes knowledge from a rule-based IOV system, so that an existing rule is represented again and imported (technical problem 1).

Embodiment 3: Method for Quickly Locating an IOV Knowledge Point Based on an SC

A method for accelerating search by using an additional clue is designed to convert a problem of searching for a target cell in which a given target point is located, into an indirect search process: first determining a start cell and a start point for searching, and then linearly searching for a target cell along a radial from the start point to the target point, starting from the start cell. In this way, an original vast search space (the entire SC) can be reduced to a series of cells passed through by a radial, and a search speed is increased exponentially. This compensates for a shortcoming (technical problem 6) of a topological SC.

A method for obtaining an additional clue is designed: performing structured region division on an entire SC space, and based on continuity of a plurality of locating times, separately using a proxy cell of a region in which a target point is located (a default search start cell of the region) and a central point thereof or using a target cell and a target point previously queried as a start cell and a start point of the current search, so that an additional clue can be quickly obtained in any case.

Embodiment 4: Method for Deriving IOV Knowledge Based on an SC

A local function in a cell of an SC is used to implement local knowledge derivation: In each cell of the SC, a local function is used to represent local knowledge in the cell; and knowledge derivation on any point in the cell is equivalent to invoking a corresponding local function on the point. Each local function is determined by a function value (that is, a discrete sampled value) on a vertex of the cell, and local functions in different cells may be different.

A local coordinate is used to implement a local function: A local function in each cell is obtained through combination in a manner by using a function value of each vertex of each cell as a base and using a local coordinate of a target point in the cell as a coefficient. A manner of combination and a manner of calculating a local coordinate both support a plurality of solutions, as long as some particular requirements are satisfied (uniqueness of a function value, conformity of a sampling point, and applicability in any dimension).

A method for deriving knowledge based on the foregoing local function and local coordinate is designed, and both internal derivation (for a point in a cell of an SC or on a boundary) and external derivation (for a point out of the boundary of the SC) of knowledge are supported, so that inferences are drawn from the knowledge (technical problem 4).

Embodiment 5: Method for Updating IOV Knowledge Based on an SC

A method for modifying a function value of a vertex of an SC is designed to support a local fine adjustment of IOV knowledge (technical problem 5).

A method for adding or deleting an internal vertex of an SC is designed to support a change of a local sampling rate of IOV knowledge (technical problem 5).

A method for adding or deleting an external vertex of an SC is designed to support expansion and shrinkage of an IOV knowledge boundary (technical problem 2).

To enable a person of ordinary skill in the art to better understand content of this embodiment of the application, the following describes application scenarios of this embodiment of the application in detail.

This embodiment of the application may be applied to various scenarios and problems of the IOV, for example, four scenarios in self-driving: low-speed tailgating, high-speed cruising, narrow-road passing, and automatic parking. Certainly, this embodiment of the application is also applicable to other scenarios, in addition to the four scenarios. In each scenario, a lot of knowledge that may be represented and managed by this embodiment of the application may be used. Herein several examples are provided.

1. Steering wheel angle control in the low-speed tailgating scenario: This is a problem of vehicle control. Assuming that there is a planned driving track, but the track may be straight or may be bending, if an ego-vehicle wants to drive along the track as accurately as possible, what steering wheel angle $\delta$ is appropriate at each moment? The angle $\delta$ depends on the following factors: a current speed v of the ego-vehicle and a track curvature $\kappa$. In other words, knowledge used herein is a relationship between them: $\delta=f(v,\kappa)$.

2. Congestion determining in the high-speed cruising scenario: This is a behavior planning problem. When an ego-vehicle cruises on a highway, if another vehicle (front vehicle) in front obstructs the ego-vehicle, the ego-vehicle needs to estimate a congestion value $\phi$ and if the congestion value is greater than a given threshold, the ego-vehicle needs to perform lane change logic. The congestion value $\phi$ depends on the following factors: a speed $v_d$ expected by the ego-vehicle (such as a road speed limit), a speed v of the ego-vehicle, a speed $v_b$ of the front vehicle, and a distance l between the ego-vehicle and the front vehicle. In other words, knowledge used herein is $\phi=f(v,v_d, v_b,l)$ 3. Selection of a moving track in the narrow-road passing scenario: This is a problem of motion planning. Assuming that an upper-layer module provides several optional tracks (all parallel to a central track), an ego-vehicle needs to calculate a capacity (a real number) c of each track, and select a track having a highest capacity for driving. The capacity c depends on the following factors (assuming that an obstruction exists on the track): a distance d between the track and the central track, a distance l between the ego-vehicle and the front obstruction, a speed $v_b$ of the front obstruction, and a horizontal deviation h from a track selected at a previous moment. In other words, knowledge used herein is $c=f(d,l,v_b,h)$.

4. Steering wheel angle control in the automatic parking scenario: This is a problem of vehicle control. Assuming that an ego-vehicle needs to drive back to an empty parking space, generally this needs to be completed through an adjustment in a path of three segments (turning right for back driving, turning left for forwarding, and turning right for back driving) or more segments. In this case, for each phase, the ego-vehicle needs to determine a steering wheel angle $\delta$ at each moment. The angle depends on the following factors: coordinates x and y of the ego-vehicle, and an included angle $\theta$ between an orientation of the ego-vehicle and a central line of the parking space. In other words, knowledge used herein is $\delta=f(x,y, \theta)$.

This embodiment of the application is applicable to scenarios of all the foregoing types, and knowledge in all multidimensional (including 1-dimensional) continuous spaces, including but not limited to the foregoing examples.

Figure 5:
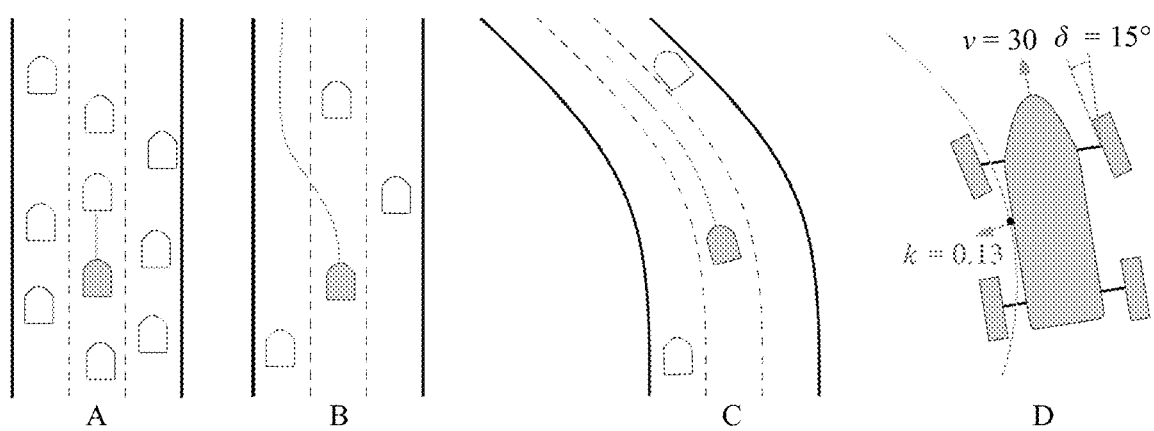
FIG. 5 is a schematic diagram of an application scenario according to an embodiment of the application.

In one embodiment, for ease of illustrating and explaining technical points in the application, in an embodiment of the application, an application scenario of a front wheel angle is selected as a special example: To enable a vehicle to drive along a planned track, what front wheel angle (equivalent to a steering wheel angle) is appropriate at each moment? As shown in FIG. 5, scenarios in A, B, C, and D respectively correspond to the foregoing four scenarios.

Based on a theory of vehicle control, a front wheel angle $\delta$ is determined by a current vehicle speed v and a track curvature $\kappa$.

The current vehicle speed v is a speed of a vehicle, and its value range is generally 0 to 180 (in units of km/h), where 0 represents that the vehicle is completely motionless, and 180 represents a maximum reachable speed of the vehicle.

The track curvature $\kappa$ is bending of a track in a current position. If the track is bending more severely, the curvature is higher. Its value range is generally 0 to 1.0. If the curvature is 0, it represents a straight road (without any bending). If the curvature is 1.0, it represents maximum bending. It should be noted that, for brief description, herein we consider only a left-bending track. A curvature of a right-bending track is a negative value (in a range of 0 to −1.0), and is completely symmetric to that in left-bending.

The front wheel angle δ is an included angle between an orientation of a front wheel and a middle axle of a vehicle body. Its value range is generally 0 to 45 (in units of degrees), where 0 represents that the wheel is straightened (driving straightly), and 45 represents that the wheel turns left to the utmost (a steering wheel turns left to the utmost). It should be noted that, for brief description, herein we consider only left turning of the front wheel. When the wheel turns right, its angle is a negative value (in a range of 0 to −45), and is completely symmetric to that in left-turning.

It should be noted that, the foregoing value is merely an example and should not be understood as a limitation on this embodiment of the application. In other embodiments, there may be a value range different from the foregoing value.

In FIG. 5, solid lines in A, B, and C are tracks that an ego-vehicle needs to pass through in different cases, and D is an example of a front wheel angle δ when a track curvature k and a vehicle speed v are given.

In an actual driving process of the vehicle, at different moments, there are different vehicle speeds v and different track curvatures κ, and correspondingly, different front wheel angles δ need to be used. Therefore, IOV knowledge used herein is: in face of different combinations of vehicle speeds v and curvatures κ, what front wheel angle δ should be used? In other words, a mapping relationship between them, that is, a function δ=f(v,κ), needs to be made clear.

Based on plenty of practical experience in the IOV field and with reference to theoretical research, it is appropriate to use different models to describe this relationship (knowledge) in different cases. For example:

If the speed is less than 30, it is appropriate to use a Kalman model. This model may be directly expressed as an explicit formula for δ about v and κ. This formula further includes several parameters (for example, a preview time), which may be generally set to constants derived from empirical values (for example, the preview time is fixed to two seconds).

If the speed is greater than 30, it is appropriate to use a kinematic model. This model cannot be directly expressed as an explicit formula for δ about v and κ. Therefore, δ can be reversely resolved from several formulas including δ, v, and κ, only by using an optimization method (for example, a least square method). Likewise, this also relates to several parameters that need to be assigned values.

In a rule-based IOV system, the two models are expressed by using "rules" in different forms.

If the speed is less than 30, the foregoing explicit formula is directly used to express the Kalman model, including assigning a fixed empirical value to a parameter in the model. For different vehicle speeds v and curvatures κ, this formula is directly invoked to calculate a corresponding front wheel angle δ.

If the speed is greater than 30, a code segment (for example, a function of a C language: double optimize_angle (double speed_v, double curvature_k)) dedicated to resolving the foregoing optimization problem is used to implement the foregoing kinematic model, including assigning a value to a parameter in the model. For different vehicle speeds v and curvatures κ, this code segment is directly invoked to calculate a corresponding front wheel angle δ.

In this embodiment of the application, in a learning-based IOV system, a unified knowledge representation mode may be used to represent front wheel angle knowledge in any case, without distinguishing between different low-speed and high-speed models.

Before learning is started, experience in the foregoing rule-based IOV system, including an explicit formula in a case of a low speed and an implicit formula in a case of a high speed, are all imported to this unified knowledge representation mode to form an initial knowledge base, and this is used as a start point for subsequent learning.

In a learning process, an elaborate fine adjustment of the initial knowledge base may be allowed, to compensate for differences between these theoretic models and actual situations.

The following describes the technical solution of this embodiment of the application in detail. This embodiment of the application is intended to push transition of the IOV from a rule-based mode to an integrated mode that is based on learning in AGI mode. In terms of a push mode, this embodiment of the application neither directly resolves a problem in the IOV field, nor provides an IOV learning algorithm. Instead, starting from the root, it provides a rule-to-learning link and an integrated platform for the entire IOV field, and directly supports learning in AGI mode.

On this basis, this embodiment of the application provides a general IOV knowledge base system. The system may implement the following:

General knowledge representation mode: All types of knowledge in the IOV can be represented in this mode. In addition, existing rules can be imported conveniently, and can be further fully used in subsequent learning.

General knowledge management method: It is directly defined in the foregoing representation mode, and can be commonly used by various upper-layer AGI learning algorithms and used to resolve IOV problems. This is equivalent to establishing a common interface between an underlying knowledge representation and an upper-layer learning algorithm.

For implementation of the foregoing general knowledge base system, essence of IOV knowledge needs to be understood, or in other words, mathematical abstraction needs to be performed on the knowledge. In this embodiment of the application, knowledge is a function. Actually, plenty of knowledge in the IOV may be abstracted into functions in a multidimensional continuous space:

$$f: R^d \to R^{d'},$$

where a point in a d-dimensional continuous space (that is, there are d input variables) is input, and a point in a d'-dimensional space (that is, there are d' output variables) is output.

For example, in the self-driving field, an entire self-driving task may be abstracted into a high-dimensional and high-complexity function. In the function, several variables are input and respectively used to indicate a status (location, speed, or the like) of an ego-vehicle, a status of another vehicle, environmental information, or the like. Several variables are also output by the function and used to indicate a command for controlling an accelerator, a brake, a steering wheel, or the like. What is to be learned is a mapping relationship or a function between the input variables and the output variables.

Certainly, in reality, this major problem is usually decomposed into several minor problems for learning. However, these minor problems may also be abstracted into functions, but such functions are low-dimensional and relatively simple functions. For example:

In an optional embodiment, in a simplified keep-lane scenario, a relationship between a steering wheel angle (y) and a current vehicle speed (x1) and a road curvature (x2) needs to be learned. This may be abstracted into a function: f: R2→R1, that is, y=f(x1, x2).

In an optional embodiment, in a simplified tailgating scenario, a relationship between a vertical control variable (y1) and a horizontal control variable (y2) and the following: a speed (x1) of an ego-vehicle at a current moment, a direction (x2) of the ego-vehicle, a speed (x3) of a front vehicle, a direction (x4) of the front vehicle, and a distance (x5) from the front vehicle needs to be learned. This may be abstracted into a function: f: R5→R2, that is, (y1, y2)=f(x1, x2, x3, x4, x5).

Based on this mathematical abstraction, in this embodiment of the application, a mathematical (e.g., topological) SC (simplicial complex) concept is introduced into the IOV learning field, a completely new knowledge representation mode is designed, and on this basis, a corresponding IOV knowledge management function is designed. Therefore, a complete IOV knowledge base system is formed.

This embodiment of the application may be implemented by using software program code in a computer memory, and has no special requirement on computer hardware, an operating system, or the like.

Figure 6:
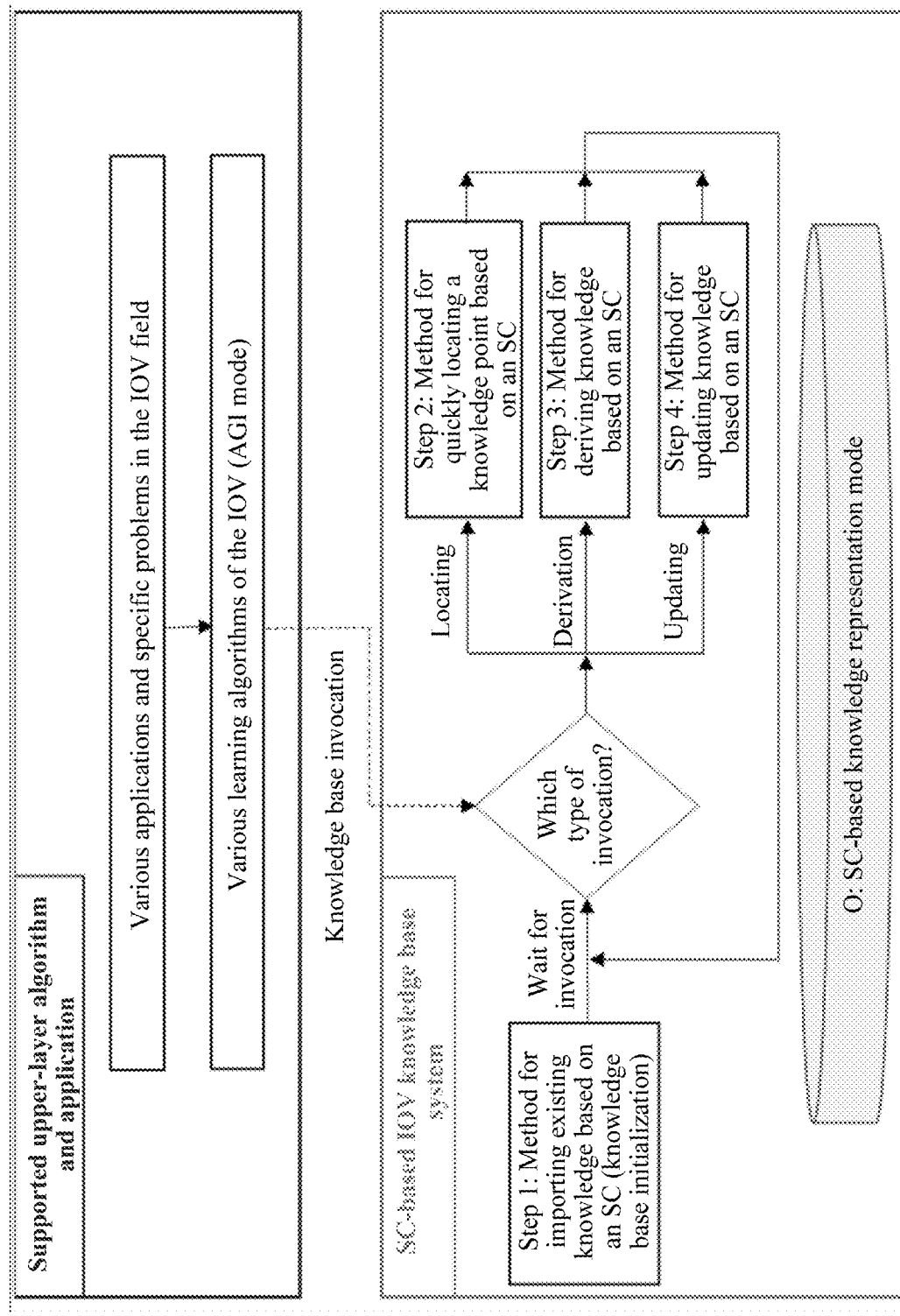
FIG. 6 is a flowchart of an SC-based IOV knowledge base system according to an embodiment of the application.

FIG. 6 is a flowchart of an SC-based IOV knowledge base system according to an embodiment of the application. With reference to the flowchart (FIG. 6) of the SC-based IOV knowledge base system, the following separately describes:
- a method for representing IOV knowledge based on an SC;
- a method for importing existing IOV knowledge based on an SC;
- a method for quickly locating an IOV knowledge point based on an SC;
- a method for deriving IOV knowledge based on an SC; and
- a method for updating IOV knowledge based on an SC.

Embodiment 1: Method for Representing IOV Knowledge Based on an SC

How is an SC used to represent IOV knowledge? This embodiment describes in detail:
- a method for representing IOV knowledge by using a knowledge base SC;
- a method for representing an array of a knowledge base SC; and
- a method for representing a safe boundary Method for Representing IOV Knowledge by Using a Knowledge Base SC:

A special SC is used. This SC is a knowledge base SC, and is a homogeneous SC with function values. The homogeneous SC is a k-dimensional SC in which all cells are k-dimensional cells (referred to as cells for short). In addition, we are concerned only about (k−1)-faces (referred to as faces for short) and 0-faces (referred to as vertices for short) of each k-dimensional cell.

An SC is used as a carrier of knowledge in an IOV multidimensional continuous space to perform discrete sampling and continuous derivation.

A k-dimensional SC with k'-dimensional function values is used to represent a piece of IOV knowledge f: $R^k \to R^{k'}$ (that is, a function having k input variables and k' output values: $\langle x_1, \ldots, x_k \rangle \to \langle y_1, \ldots, y_{k'} \rangle$), where
- any point in the SC represents an input point of f;
- any point in the SC has a k-dimensional coordinate, that is, values of k input variables on the point; and
- any point in the SC has a k'-dimensional function value, that is, k' output values of f on the point.

Discrete Sampling and Continuous Derivation:

Discrete sampling: Vertices of the SC are used as sampling points. Coordinates and function values are recorded only on the points, but are not recorded on other points (non-sampling points).

Continuous derivation: A cell of the SC is used as a medium for deriving a function value. A function value on any non-sampling point in the SC is derived from a function value on a vertex (sampling point) of a corresponding cell.

Figure 7:
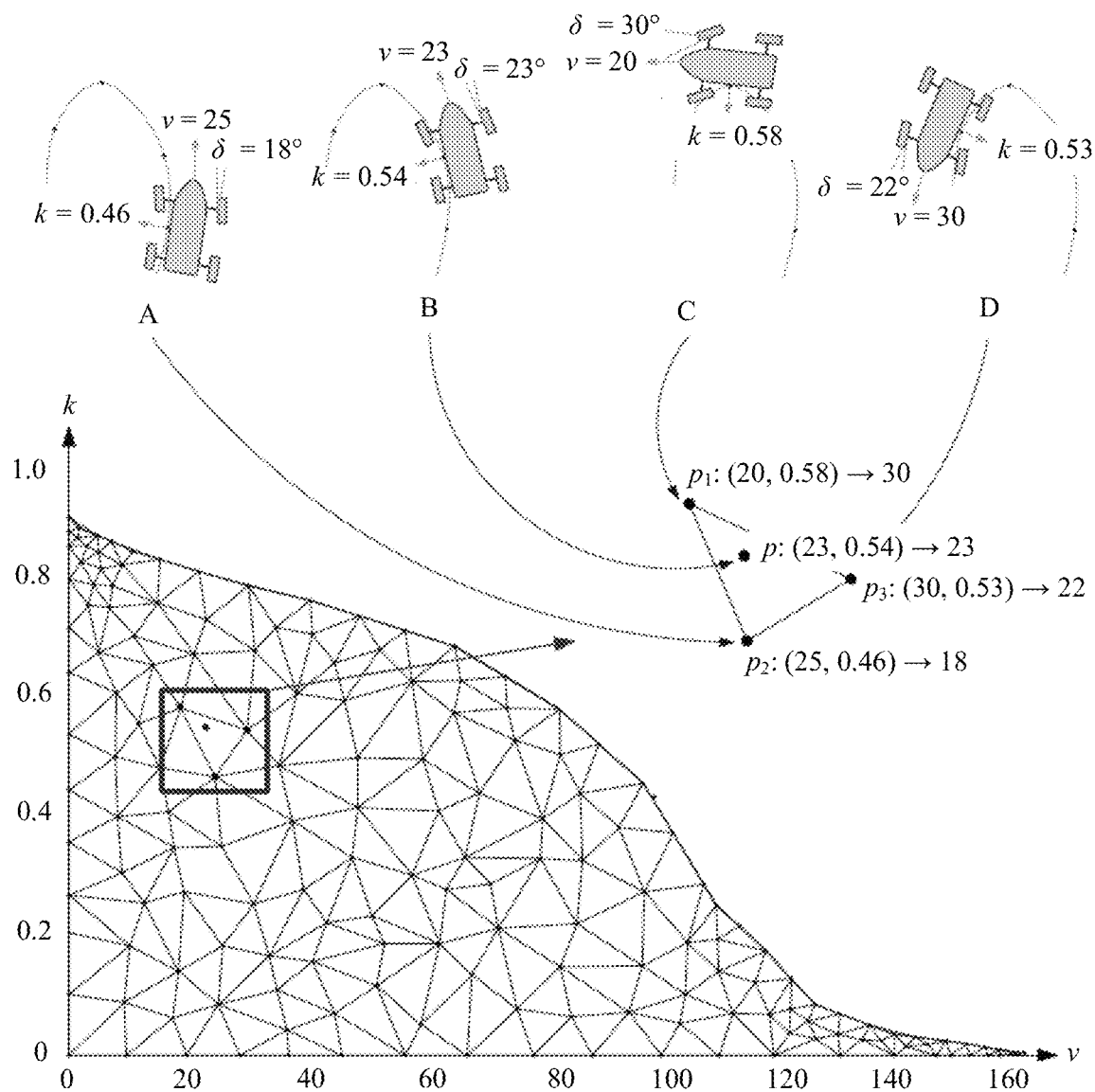
FIG. 7 is an example diagram of a scenario of a method for representing IOV knowledge based on a knowledge base SC according to an embodiment of the application.

Using a front wheel angle as an example, FIG. 7 provides a method for representing IOV knowledge by using a knowledge base SC. As shown in FIG. 7, using a relationship between a front wheel angle δ and a vehicle speed v and a curvature κ as an example, the relationship may be represented by using a 2-dimensional knowledge base SC. In FIGS. 7, A, B, C, and D represent running states of an ego-vehicle at different moments, that is, front wheel angle values respectively used by the ego-vehicle in face of different combinations of vehicle speeds and curvatures. In the knowledge base SC representation method, the four states are respectively indicated by four different points (or vertices) in the SC.

A state A is indicated by a vertex $p_2$. A coordinate (25, 0.46) of the vertex $p_2$ represents a combination of a vehicle speed v and a curvature κ in A, and a function value 18 on $p_2$ represents a steering wheel angle value δ used in A. In addition, the coordinate and the function value are directly recorded in a storage structure of the SC.

A state B is indicated by a point p. This is similar to A and $p_2$, except that neither a coordinate nor a function value needs to be recorded. Because there are an infinite quantity of such points, recording is impossible and unnecessary.

A state C is indicated by a vertex $p_1$, same as A and $p_2$.
A state D is indicated by a vertex $p_3$, same as A and $p_2$.

More complete description: IOV knowledge of the front wheel angle covers all possible combinations of vehicle speeds v and curvatures κ, and a front wheel angle value δ that should be used in each combination. Because both the vehicle speeds v and the curvatures κ are continuous variables, there are an infinite quantity of such combinations. However, in the knowledge base SC representation method, only several finite combinations and front wheel angle values corresponding to the combinations need to be recorded. These finite combinations are discrete sampling points of the IOV knowledge. The sampling points are represented by vertices (for example, p1, p2, and p3) in the SC. A combination of a vehicle speed v and a curvature κ corresponding to each sampling point, and a corresponding front wheel angle value are respectively a coordinate and a function value of the vertex. All these are directly recorded in the storage structure of the SC.

After these finite combinations are excluded, all remaining infinite combinations are non-sampling points, represented by other points (for example, p) than the vertices in the SC. A combination of a vehicle speed v and a curvature κ corresponding to each non-sampling point, and a corresponding front wheel angle value are respectively a coordinate and a function value of the point, but none of these needs to be recorded in the storage structure of the SC. Coordinates of the non-sampling points are usually provided by an upper-layer invoker of the knowledge base, but function values of the non-sampling points are automatically derived by using function values of nearby vertices, that is, continuously derived.

For implementation of the foregoing continuous derivation, sampling points near any non-sampling point need to be known. This is implemented by using cells in the knowledge base SC. Cells are used to seamlessly fill in a blank space between various vertices (sampling points), so that any non-sampling point is included in a cell, and then a vertex (sampling point) of the cell may be used to derive a value on the non-sampling point. Therefore, the cell in the SC is actually a medium for knowledge derivation.

Method for Representing an Array of a Knowledge Base SC:

The knowledge base SC uses an array-based data structure, and avoids using a pointer. This facilitates fast memory operations. Although the point can increase flexibility of the data structure, due to particularity of the SC used in this patent and a particular focus thereof, we actually do not require the flexibility provided by the pointer, and our objective can be achieved only by using an array. A k-dimensional SC with k'-dimensional function values may be represented by using the following two arrays.

Array 1: It is a vertex array (SC::Points) used to record information of all vertices.

A length of the array is a quantity of the vertices in the SC. Each element in the array stores information of one vertex.

Each vertex may be represented by an integer index (that is, a position in the vertex array).

Information of one vertex includes:
a coordinate of the vertex (POINT::Coord): a coordinate vector, where a length of the coordinate is a quantity of input variables of a function (that is, a quantity of geometric dimensions, which may be unequal to k); and a function value of the vertex (POINT::Value): a function value vector, where a length of the function value is a quantity of output variables of the function (that is, a quantity of dimensions of an output space).

Array 2: It is a cell array (SC::Cells) used to record information of all cells and information of faces.

A length of the array is a quantity of the cells in the SC. Each element in the array stores information of one cell.

Each cell may be represented by an integer index (that is, a position in the cell array).

Each face in a cell may be represented by an integer pair $<i, j>$, where i is an index of the cell, and j represents a sequence number of the face in the cell.

Information of each cell includes:
vertices of the cell (CELL::Points), where there are k+1 vertices in total, and an index of each vertex is recorded; and faces of the cell (CELL::Faces), where there are k+1 faces in total, and a corresponding face of each face is recorded (represented by an integer pair $<i, j>$); in particular, if a face does not have a corresponding face (that is, exposed on a boundary), $<-1, -1>$ is recorded.

Figure 8:
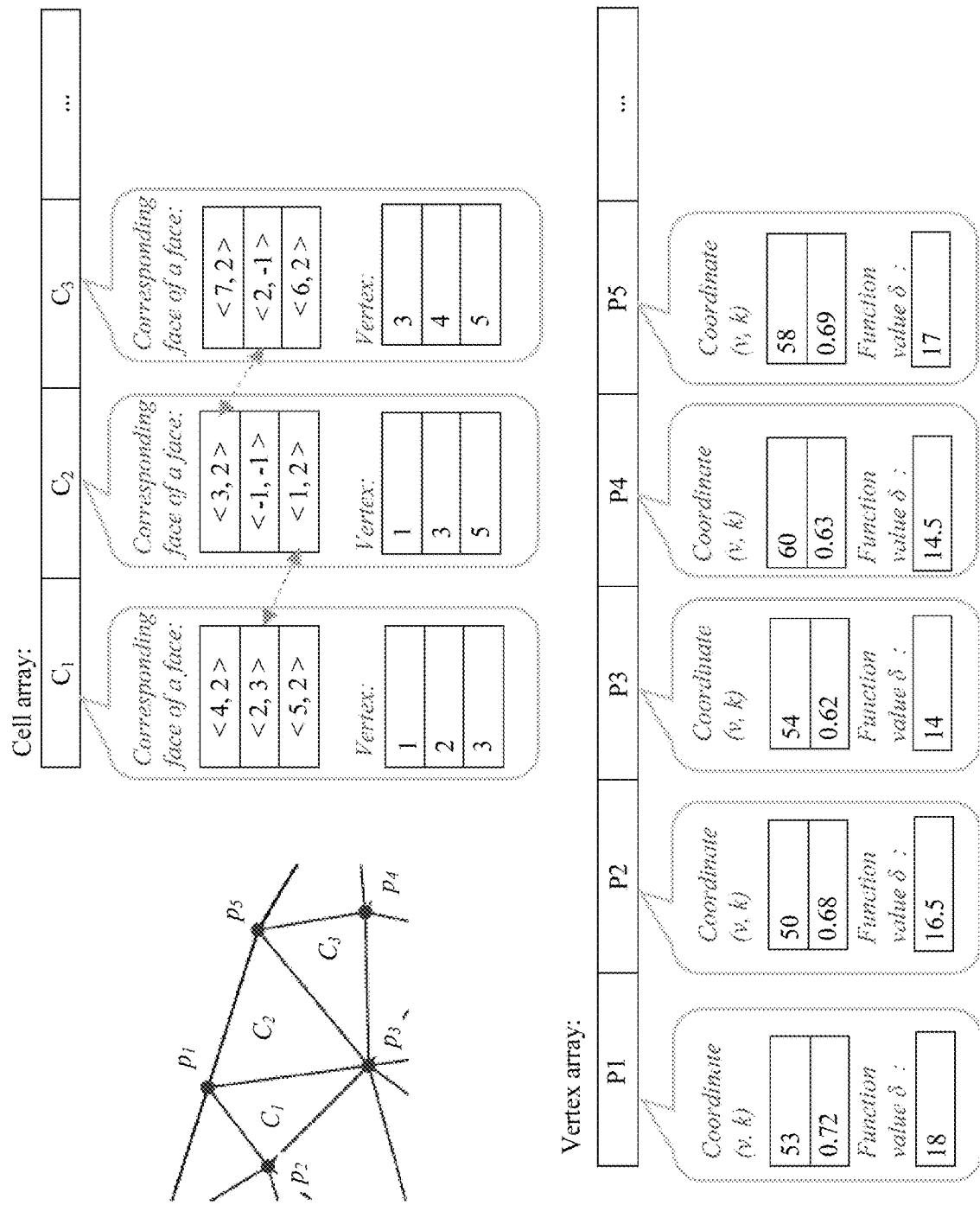
FIG. 8 is a schematic diagram of a method for representing an array of a knowledge base SC according to an embodiment of the application.

As shown in FIG. 8, using a relationship between a front wheel angle δ and a vehicle speed v and a curvature κ as an example, a knowledge base SC corresponding to the relationship may be represented by using the following arrays.

Vertex array: It records information of all vertices. A first vertex $P_1$ is used as an example.

A coordinate of the vertex is:
vehicle speed: v=53; and
curvature: κ=0.72.

A function value of the vertex is:
front wheel angle: δ=18.

Cell array: It records information of all cells. A second cell c2 is used as an example.

Vertices included in the cell include:
a first vertex 1 of c2, that is, p1, and in one embodiment, a first vertex in the vertex array;

a second vertex 3 of c2, that is, p3, and in one embodiment, a third vertex in the vertex array; and a third vertex 5 of c2, that is, p5, and in one embodiment, a fifth vertex in the vertex array.

Faces included in the cell and corresponding faces thereof are:
a first face of c2 (that is, a face opposite to the first vertex p1 of c2: $<3, 2>$, that is, a corresponding face is a second face of a cell c3 (and in one embodiment, a face opposite to a second vertex p4 of c3);

a second face of c2 (that is, a face opposite to the second vertex p3 of c2: $<-1, -1>$, that is, there is no corresponding face, which means that this is a boundary face; and a third face of $c_2$ (that is, a face opposite to the third vertex $p_5$ of $c_2$: $<1, 2>$, that is, a corresponding face is a second face of a cell $c_1$ (and in one embodiment, a face opposite to a second vertex $p_2$ of $c_1$);

In the foregoing representation mode, a loose coupling combination mode between geometric information and topological information is used, that is, the following two may be defined independently and may be unequal to each other:

a quantity of topological dimensions, that is, a quantity k of dimensions of the SC itself, which is also a quantity of dimensions of each cell; and a quantity of geometric dimensions, that is, a quantity of dimensions of the coordinate of the vertex, that is, a quantity of input variables, and is generally greater than or equal to the quantity of topological dimensions.

An advantage of this loose coupling is that commonality of a data structure is better, and that we can use a same data structure to represent a knowledge base SC and its safe boundary, except that different parameters are set. For example:

A 3-dimensional knowledge base SC is topologically 3-dimensional and geometrically 3-dimensional, and its safe boundary is topologically 2-dimensional and geometrically 3-dimensional (equivalent to a curved surface embedded in a 3-dimensional space).

A 2-dimensional knowledge base SC is topologically 2-dimensional and geometrically 2-dimensional, and its safe boundary is topologically 1-dimensional and geometrically 2-dimensional (equivalent to a curve embedded in a 2-dimensional plane).

Method for Representing a Safe Boundary:

A reason why the method for representing a safe boundary is introduced is that, first, safety is a top concern in a large quantity of problems in the IOV. In a process of running and learning, a definite method for representing a safe boundary is of greatest importance. In addition, the prior art (for example, a table-based solution) has an obvious disadvantage in representing a safe boundary, but a knowledge base SC has an obvious advantage in this aspect.

In this solution, we use a boundary of the SC to represent a safe boundary of knowledge. Correspondingly in the foregoing method for representing a knowledge base SC based on an array, the safe boundary is formed by faces (that is, boundary faces) whose corresponding faces are empty (recorded as $<-1, -1>$) in the SC. Apparently, the safe boundary divides an entire knowledge space into:

a safe region: a region on the boundary or within the boundary, that is, a region covered by cells and vertices; and an unsafe region: a region out of the boundary, that is, a region not covered by cells and vertices.

In comparison with a table, the safe boundary can be described more accurately, and there is no unsafe region.

Figure 9:
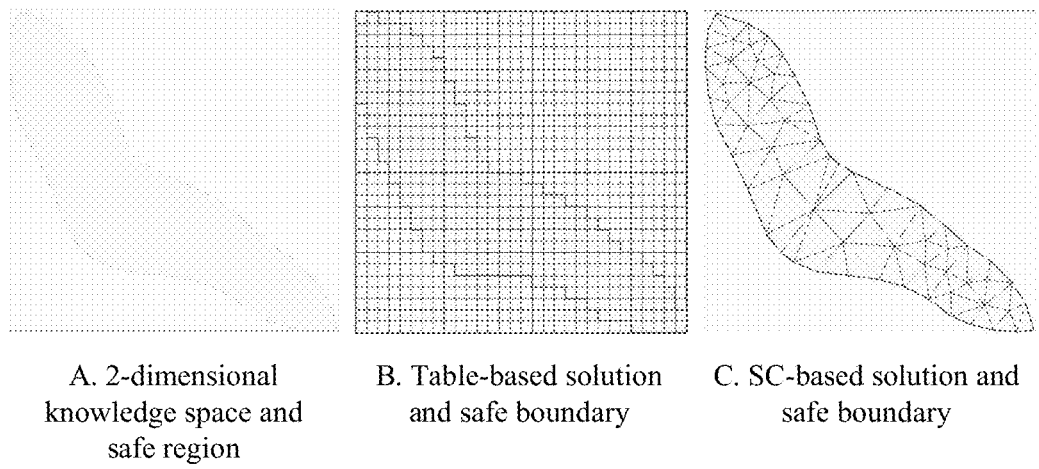
FIG. 9 is a schematic diagram for representing a safe boundary of a knowledge base SC according to an embodiment of the application.

The knowledge base SC needs to record only information of the safe region, but does not need to record information of the unsafe region. In comparison, in the table-based knowledge representation mode, the two regions both need to occupy memory space. Therefore, the knowledge base SC can save the space better. FIG. 9 is a schematic diagram for representing a safe boundary of a knowledge base SC by using a front wheel angle as an example. This point can be clearly seen from FIG. 9.

The knowledge base SC can accurately describe the boundary of the knowledge base. Because a boundary face may have any direction, but a real safe boundary may also have any direction, the boundary face may flexibly approach the real safe boundary. In comparison, in the table-based knowledge representation mode, the safe boundary is ladder-shaped, and can only follow a direction of a coordinate axis, and can hardly approach the real safe boundary of any direction. Therefore, the knowledge base SC can describe the safe boundary more accurately. This point can be clearly seen from FIG. 9.

Embodiment 2: Method for Importing Existing IOV Knowledge Based on an SC

A problem to be resolved in this operation is how to import existing IOV knowledge into a knowledge base SC representation mode to initialize a knowledge base.

The following describes in detail:
an overview of the method and procedure;
a technical solution to representing existing knowledge in a unified manner;
a method for creating a vertex set; and
a method for creating a cell set.

Overview of the Method and Procedure:

Existing knowledge may come from a lot of sources, and may all be used to initialize a knowledge base SC. For example:

The knowledge comes from a rule-based system, that is, the knowledge is various formulas, rules, or the like accumulated in a rule-based technical path; or the knowledge comes from another learning-based system, that is, the knowledge is a model (for example, a neural network or others) learned from a learning-based technical path in another mode.

Figure 10:
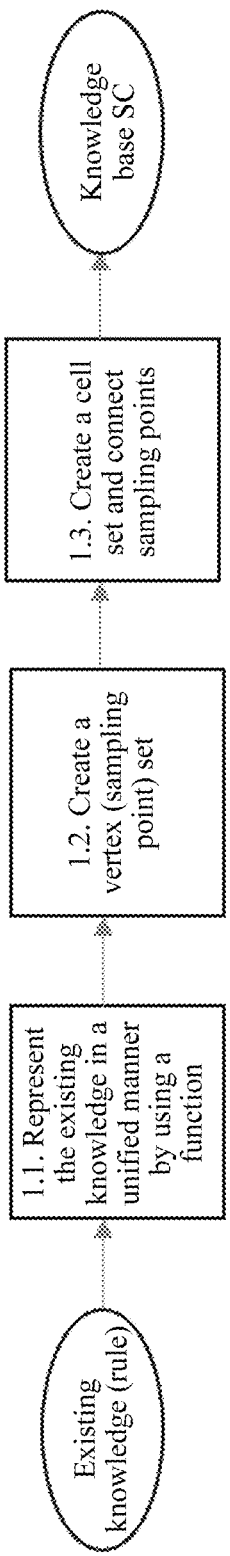
FIG. 10 is a schematic flowchart for importing knowledge according to an embodiment of the application.

Importing existing knowledge into a knowledge base SC is performing discrete sampling on rules in essence. A key is that the existing knowledge may be presented in different forms. How can the existing knowledge be normalized in the knowledge base SC representation mode? This needs to depend on abstraction of "knowledge as a function". Once different forms of knowledge are abstracted into a function, a unified procedure is used to convert the function into a knowledge base SC. A procedure for importing the existing knowledge is shown in FIG. 10, and this is expansion of operation 1 in the system procedure (FIG. 6).

The following describes the procedure in detail in three parts:
a technical solution to representing existing knowledge in a unified manner (operation 1.1):
a technical solution to creating a vertex set (operation 1.2); and
a technical solution to creating a cell set (operation 1.3).

Technical Solution to Representing Existing Knowledge in a Unified Manner:

Importing existing knowledge supports a plurality of knowledge representation forms. Common representation forms are as follows:

A formula is used for representation: y=Formula ($x_1$, $x_2$, ..., $x_k$), where the formula is a formula that can be written definitely. A unique group of output values ($y_1$, $y_2$, ..., $y_{k'}$) may be calculated by substituting any group of ($x_1$, $x_2$, ..., $x_k$) into the formula. Using a front wheel angle as an example (Section 2.3.1), a Kalman model belongs to this representation mode.

A procedure, for example, a procedure double[ ] Procedure (double x1, double x2, ... double xk) of a C language, is used for representation, where Procedure is a name of the procedure. For any input combination ($x_1$, $x_2$, ..., $x_k$), the procedure may calculate a unique group of return values ($y_1$, $y_2$, ..., $y_{k'}$). Using a front wheel angle as an example (Section 2.3.1), a kinematic model belongs to this representation mode.

A machine learning model is used for representation. For example, in a well-trained neural network model, assuming that a first layer (an input layer) of the neural network model has k input nodes, and that a last layer (an output layer) has k' output nodes, values of any group ($x_1$, $x_2$, ..., $x_k$) are sent to an input node of the model, and through forward derivation of the model, a unique group of output values ($y_1$, $y_2$, ..., $y_{k'}$) may be obtained on an output node of the model.

Regardless of the foregoing representation forms, a mapping function f may be generated through abstraction in essence: ($x_1$, $x_2$, ..., $x_k$)→□($y_1$, $y_2$, ..., $y_{k'}$), that is, values ($x_1$, $x_2$, ..., $x_k$) of any given group of independent variables may uniquely determine a group of output values ($y_1$, $y_2$, ..., $y_{k'}$) through f, but the determining relationship reflects a physical law coming from kinematics, dynamics, or the like and related to the IOV. In addition, considering safety requirements of the IOV, a safety determining function g further needs to be generated through abstraction and used to determine whether values ($x_1$, $x_2$, ..., $x_k$) of any given group of independent variables are safe or unsafe. In addition, a domain D of the two functions needs to be further provided.

In conclusion, for IOV knowledge Z with a given k-dimensional input space and k'-dimensional output space, a knowledge function F needs to be generated through abstraction in operation 1.1, that is, a 3-tuple (D, f, g), including:

a knowledge domain D: {$\min_i \leq x_i \leq \max_i | i=1, 2, ..., k$}, that is, a minimum value and a maximum value that can be selected for each input variable $x_i$;

a mapping function f: f($x_1$, $x_2$, ..., $x_k$)=($y_1$, $y_2$, ..., $y_{k'}$), that is, any group of input values ($x_1$, $x_2$, ..., $x_k$) in the knowledge domain D corresponds to a unique group of output values ($y_1$, $y_2$, ..., $y_{k'}$); and a safety determining function g: g ($x_1$, $x_2$, ..., $x_k$)=0 or 1, that is, for any group of input values ($x_1$, $x_2$, ..., $x_k$) in the knowledge domain D, whether the input values are a safe combination in the IOV knowledge is determined, where 1 indicates "safe", and 0 indicates "unsafe".

With the definition of the knowledge function F, operation 1.1 is actually to obtain the 3-tuple F=(D, f, g). A procedure may be described as follows:

Operation 1.1.1: Determine a domain D. This may be generally obtained from an applicable range of input knowledge.

Operation 1.1.2: Determine a mapping function f. This depends on a representation form of the input knowledge.

If Z is provided by using a formula, f is implemented by using a segment of program code for implementing the formula;

if Z is provided by a procedure, f is implemented by using program code of the procedure; or if Z is provided by using a model, f is implemented by using program code for implementing forward derivation of the model.

Operation 1.1.3: Determine a safety determining function g. This needs to be obtained from the input.

If the information is not input, the entire domain D is safe by default, that is, for all possible input values $(x_1, x_2, \ldots, x_k)$ in D, $g(x_1, x_2, \ldots, x_k)=1$.

If the information is input, same as the representation forms of the knowledge itself, there are also three cases; and this may be implemented by using a same method in operation 1.1.2.

Technical Solution to Creating a Vertex Set:

With abstraction of the knowledge function, discrete sampling may be performed on a knowledge function in operation 1.2. It should be noted that, for knowledge Z, different knowledge functions $\{F1, F2, \ldots\}$ may be used in different regions in the domain D of the knowledge Z.

Figure 11:
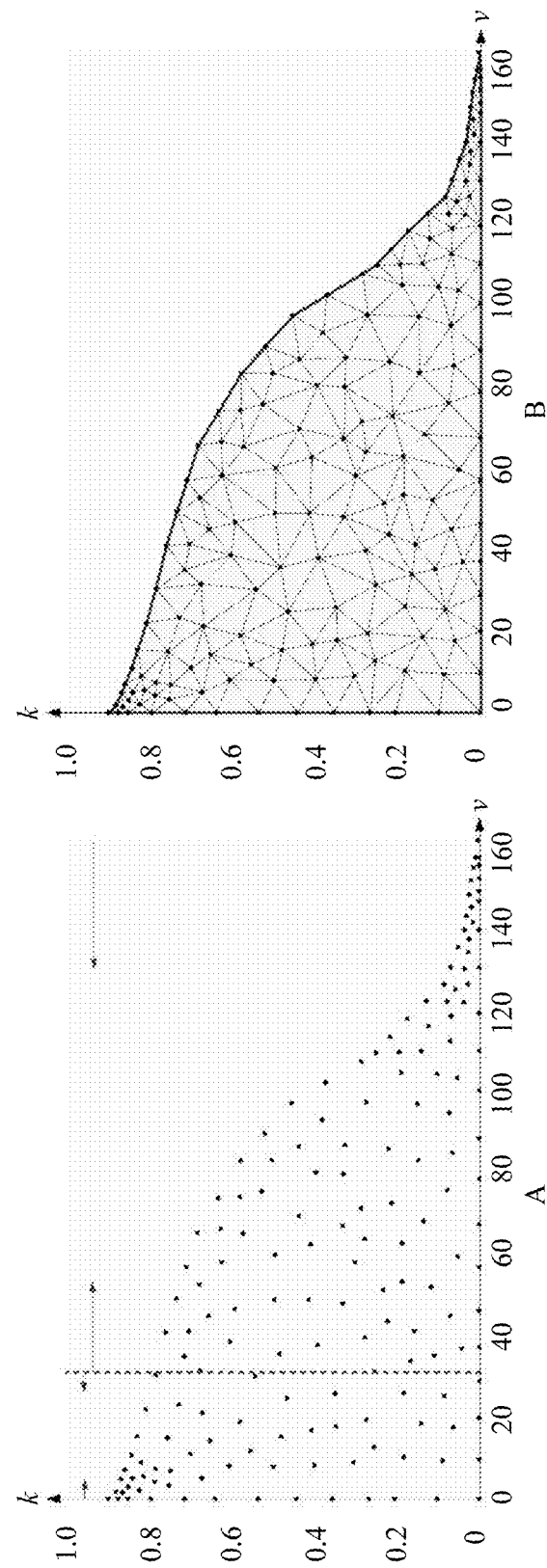
FIG. 11 is a schematic flowchart for importing knowledge according to an embodiment of the application.

FIG. 11 is a schematic diagram of a solution of operation 1 (importing existing knowledge) by using a front wheel angle as an example. A is creating a vertex set (operation 1.2), and B is creating a cell set (operation 1.3).

Using a relationship between a front wheel angle y and a vehicle speed $x_1$ and a curvature $x_2$ as an example, as shown in FIG. 11A, the Kalman model is used in a case of a low speed ($x_1 \leq 30$), and the kinematic model is used in a case of a high speed ($x_1 > 30$). Therefore, Z is abstracted into two knowledge functions $\{F_1, F_2\}$, where each knowledge function has its own independent domain, mapping function, and safety determining function.

$$F_1=(f_1,g_1,D_1): \text{ and}$$

$D1: 0 \leq x1 \leq 30, 0 \leq x2 \leq 1.0$, where $f_1$ is implemented by using program code for implementing the Kalman model; and $g_1$ is implemented by using a segment of safety determining program code related to the Kalman model.

$$F_2=(f_2,g_2,D_2): \text{ and}$$

$D2: 30 < x1 \leq 160, 0 \leq x2 \leq 1.0$, where $f_1$ is implemented by using program code for implementing the kinematic model; and $g_1$ is implemented by using a segment of safety determining program code related to the kinematic model;

Generally, assuming that the given knowledge Z includes m knowledge functions $\{F_1, F_2, \ldots, F_m\}$, discrete sampling may be performed on each knowledge function in operation 1.2 to create a vertex set P. A feasible procedure is as follows:

Operation 1.2.1: Initialize the vertex set P to null.

Operation 1.2.2: For each knowledge function $F_i=(D_i, f_i, g_i)$ (i=1, 2, ..., m), perform the following operations to perform discrete sampling on Fi.

Operation 1.2.2.1: Determine a coordinate $(x_1, x_2, \ldots, x_k)$ of a new candidate sampling point p in $D_i$ based on the mapping function $f_i$ and an existing vertex in the vertex set P. A determining method may be any existing method having the same function.

Operation 1.2.2.2: Determine, by using the safety determining function $g_i$, whether p is in a safe region. If yes, continue the following operation; or if no, ignore the candidate sampling point p, and go back to operation 1.2.2.1 to select a next candidate sampling point.

Operation 1.2.2.3: Calculate, by using the mapping function $f_i$, a function value $(y_1, y_2, \ldots, y_k)$ corresponding to the candidate sampling point p.

Operation 1.2.2.4: Add the candidate sampling point p (including its coordinate and function value) to the vertex set P as a new vertex. Go back to operation 1.2.2.1 to select a next candidate sampling point.

Using a front wheel angle as an example, as shown in FIG. 11A, its discrete sampling is performed in two parts.

A first part is located on a left side of a dashed line, and this is a low-speed part, where a black vertex is a result of sampling based on the Kalman model.

A second part is located on a right side of the dashed line, and this is a high-speed part, where a black vertex is a result of sampling based on the kinematic model.

Technical Solution to Creating a Cell Set:

After the vertex set P is created, a cell set C may be further created in operation 1.3 to seamlessly fill in a blank space between vertices, so that a final knowledge base SC is formed. This operation is neither related to representation forms of knowledge, nor related to knowledge functions into which a piece of knowledge is abstracted. A feasible procedure is as follows:

Operation 1.3.1: Split the vertex set P into two subsets: P− and P+, where

P− includes all vertices on a boundary, and

P+ includes all vertices off the boundary.

Operation 1.3.2: Create a (k−1)-dimensional cell set C− by using P− as a vertex set; and combine the vertex set P− with the cell set C− to form a (k−1)-dimensional closed simplicial complex S− used to indicate the boundary of the knowledge base SC. This operation may be implemented by using any existing higher-dimensional point cloud modeling method, for example, "The Quickhull algorithm for convex hulls", C. Bradford Barber, David P. Dobkin, and Hannu Huhdanpaa. ACM Transactions on Mathematical Software, 22(4):469-483, December 1996.

Operation 1.3.3: Create a k-dimensional cell set C by using P as a vertex set and the (k−1)-dimensional simplicial complex S⁻ as a boundary constraint; and combine the vertex set P with the cell set C to form the final knowledge base SC. This operation may be implemented by using any existing higher-dimensional point cloud modeling method with a boundary constraint, for example, "Sweep Algorithms for Constructing Higher-Dimensional Constrained Delaunay Triangulations", Jonathan Shewchuk, Proceedings of the Sixteenth Annual Symposium on Computational Geometry, 2000.

Using a front wheel angle as an example, as shown in FIG. 11B, first, a safe boundary of the knowledge base SC, that is, a curve (boundary) in FIG. 11B, which is a 1-dimensional SC, is created (operation 1.3.2). Then the 1-dimensional SC is used as a boundary constraint for creating a final 2-dimensional SC, that is, a region covered by cells in FIG. 11B, to form a final required 2-dimensional knowledge base SC.

2.3.4.3 Operation 2 of this Embodiment: Method for Quickly Locating an IOV Knowledge Point Based on an SC A problem to be resolved in this operation is: given any point in a knowledge space, how to find several known sampling points near the point for ease of subsequent operations (for example, knowledge derivation or updating), or correspondingly in an SC-based representation method, given a coordinate of any point (that is, a target point), how to find a corresponding cell (that is, a target cell). This includes two cases.

Locating an internal point: If a target point is located within a boundary of the SC, a target cell including the target point needs to be found (as shown in FIG. 14A).

Locating an external point: If a target point is located out of the boundary of the SC, a target cell that is on the boundary and excludes the target point but is relatively near to the target point needs to be found (as shown in FIG. 14B).

In an SC-based knowledge base system, a lot of other methods (for example, knowledge derivation and knowledge updating) depend on and frequently invoke knowledge point locating. Therefore, quick locating must be performed to satisfy a real-time response. However, a topological SC itself does not provide such a quick locating capability (because this is not required. In the knowledge base SC, how should a shortcoming be compensated for? The following describes in detail:

an overview of the method and procedure;
a method for obtaining an additional search clue; and
a method for quick locating based on a clue.

Overview of the Method and Procedure:

In a vast SC space, it is not easy to directly search for a target cell including a target point; and when there is no clue, almost all cells in the SC need to be traversed. The reason is that the SC itself is unstructured, and one-stop fast search cannot be provided as in a structured table.

To implement quick locating on the knowledge base SC, a solution of this method is: adding some additional clues for the search, that is, adding a start cell and a start point in the cell as a search start point; in addition, using a radial from the start point to a target point as a search direction. With the two additional clues, the search space is greatly reduced, and becomes a series of cells passed through by the radial.

Figure 12:
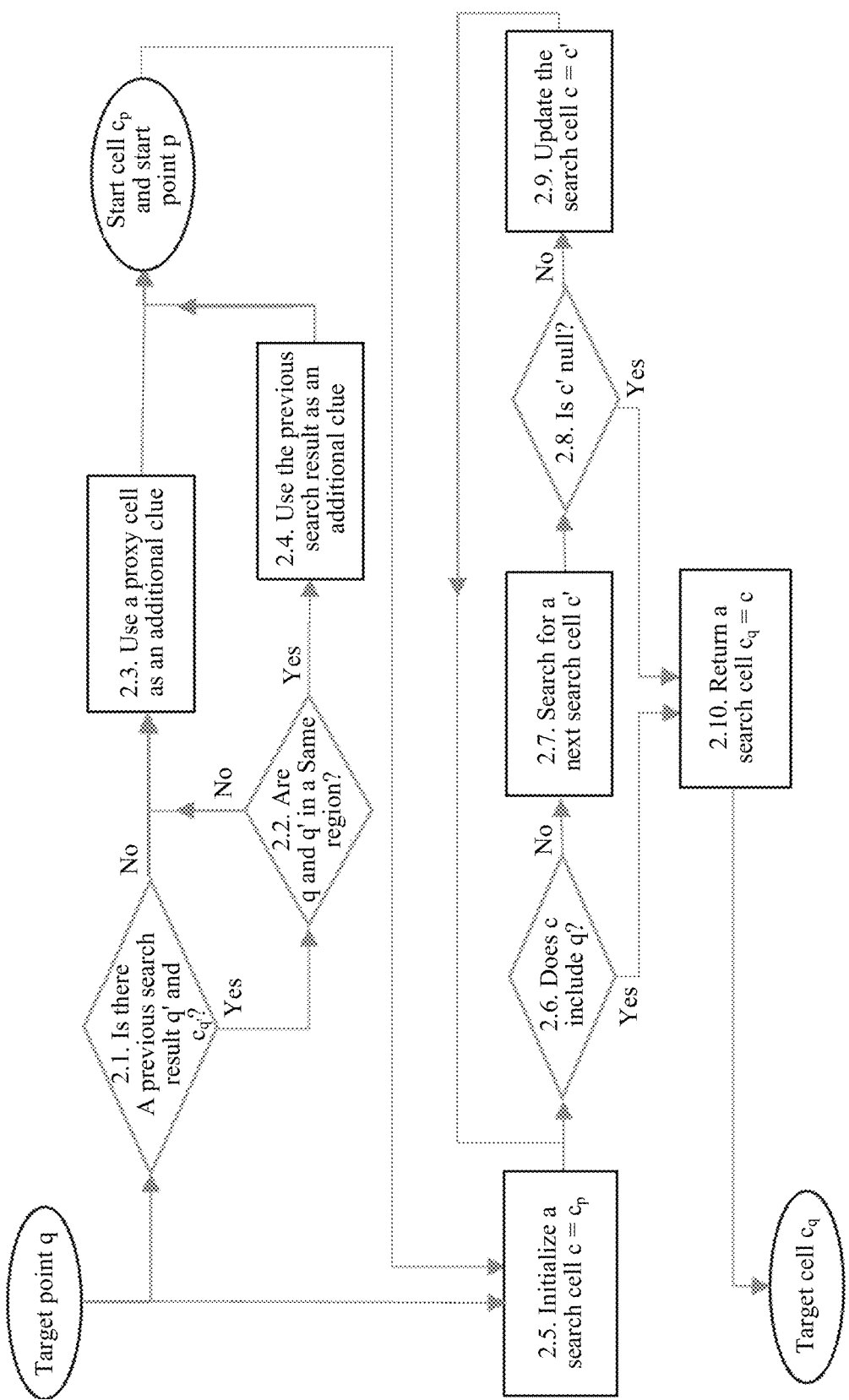
FIG. 12 is a flowchart for quickly locating a knowledge point based on an SC according to an embodiment of the application.

A procedure for quickly locating a knowledge point based on an SC is shown in FIG. 12. This is expansion of operation 2 in the system procedure (FIG. 6).

The following describes the procedure in two parts:
a technical solution to obtaining an additional search clue (operation 2.1 to 2.4); and
a technical solution to quick locating based on an SC (operation 2.5 to 2.10).

Technical Solution to Obtaining an Additional Search Clue:

In this technical solution, two different approaches are used to obtain an additional search clue (that is, a start cell and a start point), and the two approaches are organically combined, so that an appropriate start cell and start point can be quickly obtained in any case.

Approach 1: Using a previous query result. IOV knowledge is usually queried in real time, a time interval between two queries is quite short, and in many cases, there is good continuity between two consecutive queries, that is, a point in a previous query is usually quite close to a point in a current query. In this case, a target point and a target cell in the previous query may be directly used as a start point and a start cell in the current query.

Approach 2: Defining search regions+Specifying regional proxies. If a point in a previous query does not satisfy a condition, that is, continuity between queries is poor, we may further use a region-based management method: An entire search space may be divided in advance into some small search regions, and a proxy cell is specified for each region and is recorded. During a query, all target points that fall within this region use the proxy cell of this region as a search start cell by default.

For implementation of the approach 2, an additional index structure T needs to be created to implement region-based management. The index structure should have a quick indexing capability, that is, if a coordinate of any point is given, a region in which the point is located can be quickly found. A feasible implementation method is to use a multi-dimensional uniform table mentioned in the prior art 3 (Section 1.3) (Note: Herein the prior art 3 is only an auxiliary means of this solution, and is not a principal part of the solution). The dimensions of the table are the same as those of the SC. Each cell in the table corresponds to a region in the SC. The table may be relatively sparse. Therefore, each region of the SC may include a plurality of cells of the SC. Each cell in the table records a cell in a corresponding region of the SC, that is, a proxy cell of the region, as a default start cell for locating in the region. A proxy cell of each region may be selected randomly, as long as a part (for example, a central point) of the cell is in the region. If a region is completely out of a boundary of the SC, a proxy cell of the region is set to null, that is, a proxy cell in a corresponding cell in the index table is set to −1.

The technical solution to obtaining an additional clue corresponds to operations 2.1 to 2.4 in the procedure of operation 2 (in FIG. 12).

Operation 2.1: Check whether there is a previous search result, that is, a target point q' and a target cell $c_{q'}$ in previous locating;
if yes, go to operation 2.2;
if no, go to operation 2.3.

Operation 2.2: Check whether the target point q' in the previous locating and a target point q in current locating are in a same search region;
if yes, go to operation 2.4;
if no, go to operation 2.3.

Operation 2.3: Use a default regional proxy as an additional search clue. This operation includes:

Operation 2.3.1: Calculate a search region $U_q$ in which the target point q is located, where the search region $U_q$ may be calculated directly by using an additional index structure T.

Operation 2.3.2: Set a start cell $c_p$ to a proxy cell of the search region $U_q$, where the start cell $c_p$ may be read directly from the additional index structure T.

Operation 2.3.3: Set a start point p to a central point of the start cell $c_p$, and set a coordinate of the start point p to an average value of coordinates of all vertices in $c_p$.

Operation 2.4: Use the previous search result as an additional search clue. This operation includes:

Operation 2.4.1: Set a start cell $c_p$ to the target cell $c_{q'}$ in the previous locating.

Operation 2.4.2: Set a start point p to the target point q' in the previous locating.

Figure 13:
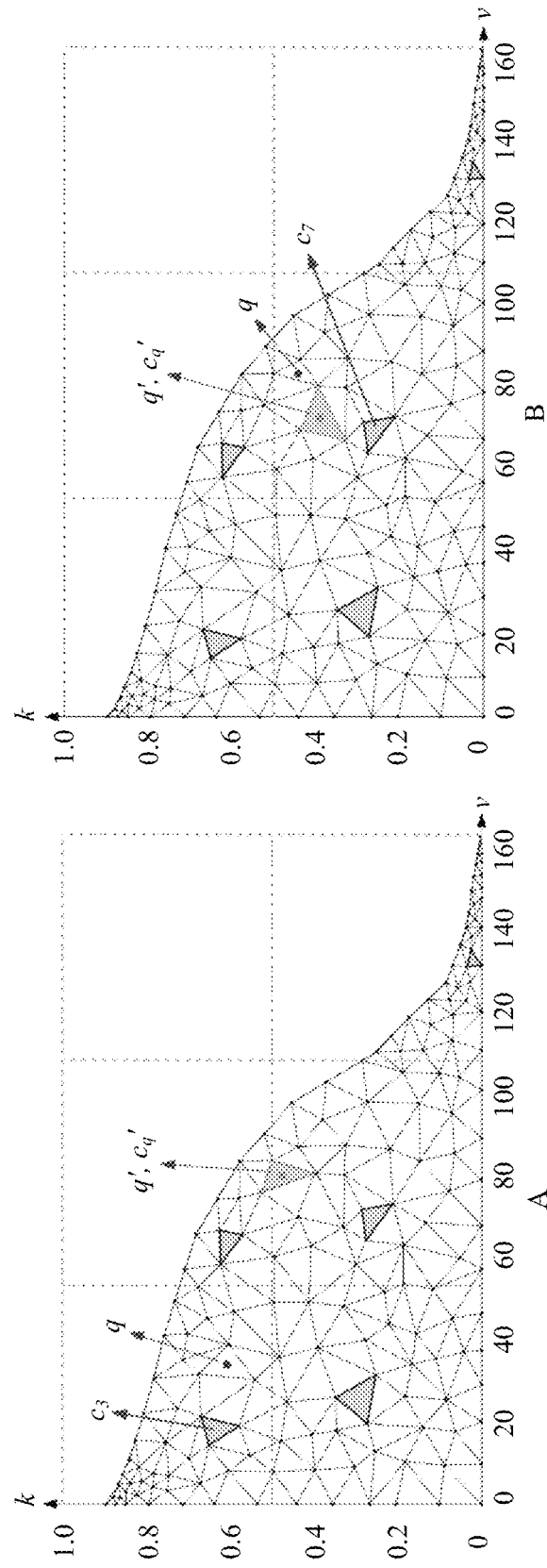
FIG. 13 is a schematic diagram for quickly locating a knowledge point based on an SC according to an embodiment of the application.

FIG. 13 is a schematic diagram of a solution to obtaining an additional search clue in operation 2 (quickly locating a knowledge point) by using a front wheel angle as an example. A point q is a target point in current locating, q' and $c_{q'}$ are a target point and a target cell in previous locating, an entire SC space is divided into six search regions (gray dashed line), and a cell is a proxy cell of each search region. In different inputs (A and B), selected clues (start cells) are different. A proxy cell $c_3$ is selected in A, and a previous locating result $c_{q'}$ is selected in B.

Using a front wheel angle as an example (as shown in FIG. 13), the foregoing technical solution may be described by using the following instances.

Instance A (as shown in FIG. 13A): The target point q in current locating is located in an upper left search region, but the target point in previous locating is located in a middle or low search region. The two target points are not in a same region. According to the determining in operations 2.1 and 2.2, the process should go to operation 2.3: selecting a regional proxy $c_3$ in an upper-left search region as a search start cell, and using a central point of the start cell as a start search point.

Instance B (as shown in FIG. 13B): The target point q in current locating is located in a middle or lower search region, and the target point in previous locating is also located in the middle or low search region. The two target points are in the same region. According to the determining in operations 2.1 and 2.2, the process should go to operation 2.4: selecting a target region $c_{q'}$ calculated in previous locating as a search start cell, and using a target point q' in previous locating as a start search point.

Technical Solution to Quick Locating Based on a Clue:

After the additional search clue (the start cell and the start point) is obtained, a search space for locating a knowledge point may be confined on a radial from the start point to the target point. The entire search process starts from the start cell, and a next cell and then another next cell are found along a radial direction by using an inter-cell adjacency relationship (corresponding face), until a cell including our target point is found, and this cell is a target cell that we want to find. If the target point is out of the boundary, the search process returns to a last cell before boundary crossing.

The technical solution to quick locating based on a clue corresponds to operations 2.5 to 2.10 in the procedure of operation 2 (in FIG. 12).

Operation 2.5: Initialize a search cell, that is, initialize a current search cell c to the start cell $c_p$ calculated in the foregoing operation. Subsequent operations (2.6 to 2.10) are a loop body intended to continuously search for a next search cell along a radial p→q until a target cell is found.

Operation 2.6: Check whether the current search cell c includes the target point q.

If yes, it means that the target cell (that is, c) has been found, and the process goes to operation 2.10; or
   if no, search needs to be performed cyclically, and the process goes to operation 2.6.

Operation 2.7: Search for a next search cell c' along the search radial p→q. This operation includes:

Operation 2.7.1: Calculate an outgoing face, that is, a face (assuming that it is an $i^{th}$ face) of the current search cell c from which the radial goes out, recorded as <c, i>. This may be obtained by calculating whether the radial p→q intersects each face of the cell c.

Operation 2.7.2: Calculate an incoming face, that is, a face (assuming that it is a $j^{th}$ face) of a cell from which the radial comes in again, recorded as <c', j>. This may be read directly by using a corresponding face relationship stored in the method (refer to Section 2.3.4.1) for representing an array of a knowledge base SC.

Operation 2.7.3: Use c' in the outgoing face <c', j> as a next search cell. It should be noted that, the c' may be equal to −1 (if the outgoing face is on the boundary and has no corresponding face), or may be unequal to −1 (if the outgoing face is not on the boundary and has a corresponding face).

Operation 2.8: Check whether the next search cell is null, that is, whether c' is −1.

If yes, the search radial p→q goes out of the boundary after passing through the current search cell c. In this case, the cycle is exited, and the process goes to operation 2.10.

If no, the search radial p→q still extends in the SC. In this case, search should be continued, and the process goes to operation 2.9.

Operation 2.9: Set the current search cell c to a next search cell c' along the radial, and go back to operation 2.6 for a next cycle.

Operation 2.10: When finding the target cell $c_q$, that is, the current search cell c, return the target cell $c_q$=c. This includes two cases:

If the process goes from operation 2.6 to this operation, the target cell c includes the target point q, that is, the target point q is within the boundary of the SC. This belongs to a case of locating an internal point.

If the process goes from operation 2.8 to this operation, the target cell c does not include the target point q, that is, the target point q is out of the boundary of the SC. This belongs to a case of locating an external point.

Figure 14:
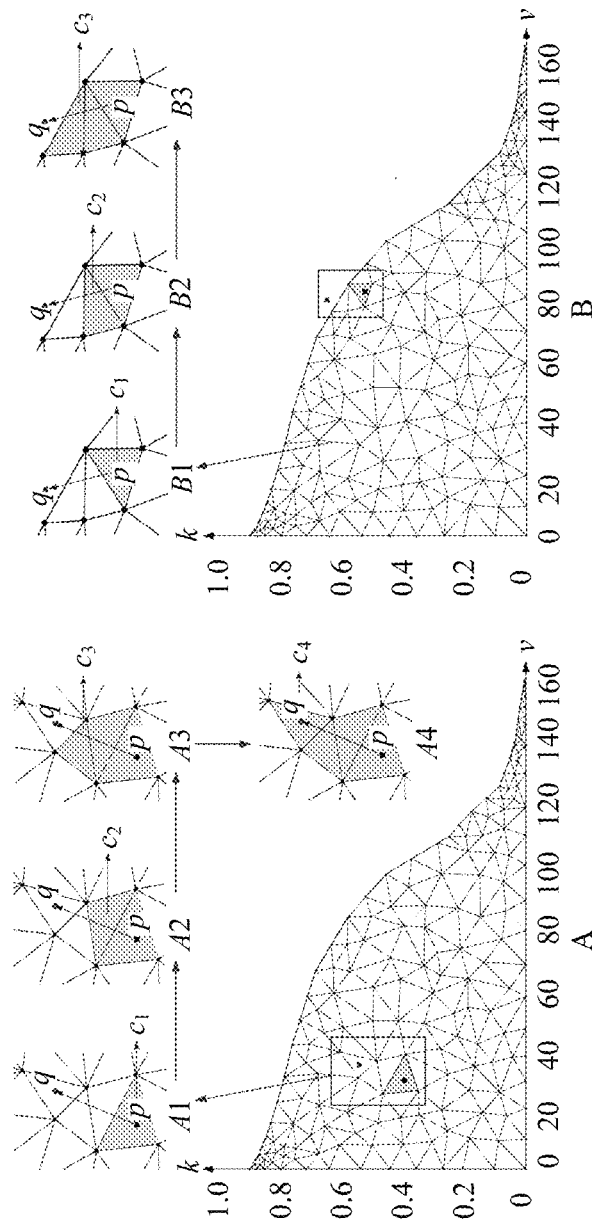
FIG. 14 is a schematic diagram for quickly locating a knowledge point based on an SC according to an embodiment of the application.

FIG. 14 is a schematic diagram of a solution to quick locating based on a clue in operation 2 (quickly locating a knowledge point) by using a front wheel angle as an example. A point q is a target point in current locating, a point p and a cell $c_1$ are a search start point and a search start cell (that is, a search clue) that are obtained in a previous operation, and a radial is a search radial. A is an instance of locating an internal point, and B is an instance of locating an external point.

Using the front wheel angle as an example (as shown in FIG. 14), the technical solution may be described by using the following instances, and include two cases: locating an internal point and locating an external point.

Instance of locating an internal point (as shown in FIG. 14A): A target point q in current locating is located within a boundary of an SC, a search start point is p and a start cell is $c_1$, which are obtained in previous operations 2.1 to 2.4, and a search radial is p→q. Starting from the current search cell $c_1$ (operation 2.5), the entire search goes through four cycles.

First cycle (FIG. 14A1): A current search cell is $c_1$; in operation 2.6, it is determined that the target point q is not included; in operation 2.7, a next search cell $c_2$ along p→q is calculated; in operation 2.8, it is determined that $c_2$ is not null; and in operation 2.9, the current search cell is updated to $c_2$, and the process goes to a next cycle.

Second cycle (FIG. 14A2): A current search cell is $c_2$; in operation 2.6, it is determined that the target point q is not included; in operation 2.7, a next search cell $c_3$ along p→q is calculated; in operation 2.8, it is determined that $c_3$ is not null; and in operation 2.9, the current search cell is updated to $c_3$, and the process goes to a next cycle.

Third cycle (FIG. 14A3): A current search cell is $c_3$; in operation 2.6, it is determined that the target point q is not included; in operation 2.7, a next search cell $c_4$ along p→q is calculated; in operation 2.8, it is determined that $c_4$ is not null; and in operation 2.9, the current search cell is updated to $c_4$, and the process goes to a next cycle.

Fourth cycle (FIG. 14A4): A current search cell is $c_4$; in operation 2.6, it is determined that the target point q is included; up to now, a target cell $c_4$ including the target point q has been found; therefore, the cycle is exited, $c_4$ is output in operation 2.10, and the search is ended.

Instance of locating an external point (as shown in FIG. 14B): A target point q in current locating is located out of a boundary of an SC, a search start point is p and a start cell is $c_1$, which are obtained in previous operations 2.1 to 2.4, and a search radial is p→q. Starting from the current search cell $c_1$ (operation 2.5), the entire search goes through three cycles.

First cycle (FIG. 14B1): A current search cell is $c_1$; in operation 2.6, it is determined that the target point q is not included; in operation 2.7, a next search cell $c_2$ along p→q is calculated; in operation 2.8, it is determined that $c_2$ is not null; and in operation 2.9, the current search cell is updated to $c_2$, and the process goes to a next cycle.

Second cycle (FIG. 14B2): A current search cell is $c_2$; in operation 2.6, it is determined that the target point q is not included; in operation 2.7, a next search cell $c_3$ along p→q is calculated; in operation 2.8, it is determined that $c_3$ is not null; and in operation 2.9, the current search cell is updated to $c_3$, and the process goes to a next cycle.

Third cycle (FIG. 14B3): A current search cell is $c_3$; in operation 2.6, it is determined that the target point q is not included; in operation 2.7, a next search cell −1 along p→q is calculated; in operation 2.8, it is determined that the next search cell is null, that is, after the radial passes through $c_3$ but does not reach the target point q, boundary crossing occurs, and it indicates that the target point is out of the boundary. Up to now, a target cell $c_3$ excluding the target point q and located on the boundary has been found; therefore, the cycle is exited, $c_3$ is output in operation 2.10, and the search is ended.

2.3.4.4 Operation 3 of this Embodiment: Method for Deriving IOV Knowledge Based on an SC A problem to be resolved in this operation is: what operation on a knowledge base SC should IOV knowledge derivation be converted into and how to implement this? For an IOV knowledge space, knowledge on any point needs to be inferred from knowledge on limited and discrete sampling points. Correspondingly in a knowledge base SC, for any given target point p, how should a function value on p be inferred from a function value on a nearby vertex? This includes two cases.

Deriving knowledge on an internal point (internal derivation): If the target point p is located within a boundary of the SC, how should the function value on p be inferred (as shown in FIG. 16A)?

Deriving knowledge on an external point (external derivation): If the target point p is located out of the boundary of the SC, how should the function value on p be inferred (as shown in FIG. 16B)?

The following describes in detail:
an overview of the method and procedure;
a technical solution to calculating a target cell;
a technical solution to calculating a local coordinate; and
a technical solution to calculating a local function.

Overview of the Method and Procedure:

Deriving IOV knowledge based on an SC is a solution to global discretization and local continuation in essence. In particular:

A local function is used to implement local knowledge derivation. In each cell of the SC, a local function is used to represent local knowledge in the cell; and local functions in different cells may be different. Each local function is determined by a function value on a vertex of the cell. Knowledge derivation on a point is equivalent to invoking a corresponding local function on the point.

A local coordinate is used to implement a local function. Any target point p has a local coordinate in a given target cell C: $\{a_1, a_2, \ldots, a_{k+1}\}$, where the local coordinate reflects a relative position of the point p in the cell, and also reflects impact of each vertex $\{p_1, p_2, \ldots, p_{k+1}\}$ in the cell on p; and the local function may be defined as a combination that uses a function value of each vertex as a base and uses a local coordinate as a coefficient. In particular, a function value of any point may be derived from a function value of each vertex of the target cell by using a local function.

The local coordinate and the local function are implemented in a plurality of manners. Any technical solution may be used for implementation, as long as the following requirements are satisfied:

Uniqueness of the function value (only for internal derivation): A function value internally derived from each point in the SC and on a boundary is unique, that is, if a point is located on a boundary between two or more cells (that is, a cell boundary), when a local function in any one of the cells is used for internal derivation, values obtained on the point should be the same (uniqueness in external derivation is not mandatory in the application).

Conformity of a sampling point: For each vertex in the SC, a function value derived by using a local function should be equal to a function value sampled on the vertex, that is, the derived value is equal to the sampled value.

Applicability in any dimension: All functions and methods need to be applicable to a knowledge space of any dimension.

Figure 15:
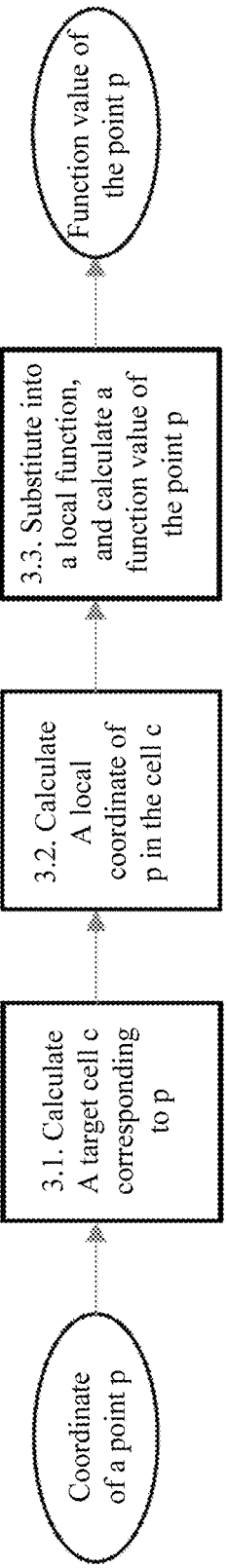
FIG. 15 is a flowchart for deriving IOV knowledge based on an SC according to an embodiment of the application.

A basic procedure for deriving IOV knowledge based on an SC is shown in FIG. 15. This is expansion of operation 3 in the system procedure (FIG. 6).

The following describes the procedure in detail in three parts:
a technical solution to calculating a target cell (operation 3.1);
a technical solution to calculating a local coordinate (operation 3.2); and
a technical solution to calculating a local function (operation 3.3).

Technical Solution to Calculating a Target Cell:

In operation 3.1, based on a coordinate of any given point p, a target cell corresponding to the point p needs to be found. This includes two cases.

If the point p is located within a boundary of an SC, a target cell c including the point p needs to be found, and c is used for subsequent derivation (internal derivation).

If the point c is located out of a boundary of an SC, a target cell c that is on the boundary and does not include p but is relatively close to p needs to be found, and c is used for subsequent derivation (external derivation).

This is a typical problem of locating a knowledge point based on an SC, and the method for quickly locating a knowledge point in operation 2 may be directly invoked. For related technical details, refer to Section 2.3.4.3.

Technical Solution to Calculating a Local Coordinate:

In operation 3.2, a local coordinate of the given point p in the corresponding target cell c (from operation 3.1) needs to be calculated. It is assumed that this is a k-dimensional SC;
a coordinate of p in the SC is $(x_{p,1}, x_{p,2}, \ldots, x_{p,k})$;
a vertex set of c is $\{p_1, p_2, \ldots, p_{k+1}\}$; and
a coordinate of each vertex $p_i$ is $(x_{i,1}, x_{i,2}, \ldots, x_{i,k})$.

In this case, the local coordinate of p in c may be calculated in the following suboperations:

Operation 3.2.1: Construct a k×k matrix $M=[(p_1-p_2)(p_1-p_3) \ldots (p_1-p_{k+1})]^T$, and calculate a determinant d of M.

Operation 3.2.2: For each of i=1, 2, . . . , k+1, construct a matrix $M_i=[(p-p_1)(p-p_2) \ldots (p-p_{k+1})]^T$ (not including $p-p_i$), calculate a determinant $d_i$ of each $M_i$, and therefore obtain $\{d_1, d_2, \ldots, d_{k+1}\}$.

Operation 3.2.3: Calculate a local coordinate $(a_1, a_2, \ldots a_{k+1})$ of p, where $a_i=d_i/d$.

It can be easily verified that, a combination of the local coordinate calculated in the foregoing operation and a local function calculated in the following operation (3.3) satisfies the three conditions mentioned in the overview of the method and procedure. Therefore, this is an appropriate calculation method. In addition, the local coordinate may be further implemented by using another method, as long as the foregoing three conditions are satisfied.

Technical Solution to Calculating a Local Function:

In operation 3.3, the local coordinate of p needs to be combined with a function value of a vertex in c into a local function, where the local function is used to calculate (derive) a function value of the point p. In one embodiment, this may be implemented in the following suboperations:

Operation 3.3.1: Construct a local function in a cell c, where this function is a combination that uses a function value $\{f(p_1), f(p_2), \ldots, f(p_{k+1})\}$ of a vertex of c as a base and uses a local coordinate $(a_1, a_2, \ldots, a_{k+1})$ as a coefficient. Any one of the following may be used:

a local linear function: $f(p):=a_1 f(p_1)+a_2 f(p_2)+ \ldots +a_{k+1} f(p_{k+1})$;

a local constant function: $f(p):=f(p_t)$, where $p_t$ is a vertex corresponding to $a_t$ that has a smallest absolute value in the local coordinate $\{a_1, a_2, \ldots, a_{k+1}\}$, and if more than one $a_t$ has a smallest absolute value, a vertex $p_t$ whose coordinate is the smallest is selected; and a local nonlinear and non-constant function, for example, $f(p):=\sqrt{a_1 f^2(p_1)+a_2 f^2(p_2)+\ldots+a_{k+1}^2(p_{k+1})}$.

Operation 3.3.2: Calculate a function value f(p) of the point by using the local function. In one embodiment, the following values may be substituted into the formula of the foregoing local function for calculation:

the local coordinate $\{a_1, a_2, \ldots, a_{k+1}\}$ of the point p (obtained through calculation in operation 3.2); and function values $\{f(p_1), f(p_2), \ldots, f(p_{k+1})\}$ of the vertices of c (c is obtained in operation 3.1, and then function values of various vertices are directly read from a data structure of the SC).

It can be easily verified that, a combination of the local function calculated in the foregoing operation and the local coordinate calculated in the foregoing operation 3.2 satisfies the three conditions mentioned in the overview of the method and procedure. Therefore, this is an appropriate calculation method. In addition, the local function may be further implemented by using another method, as long as the foregoing three conditions are satisfied.

Figure 16:
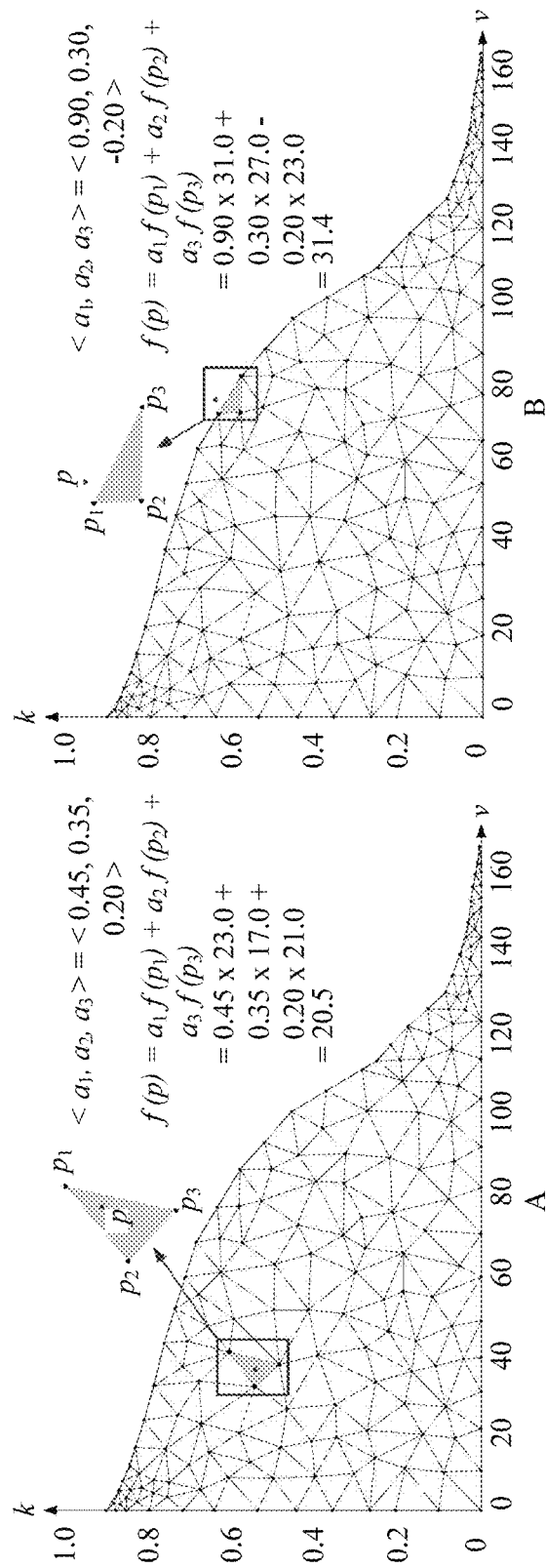
FIG. 16 is a schematic diagram for deriving IOV knowledge based on an SC according to an embodiment of the application.

FIG. 16 is a schematic diagram of a solution of operation 3 (knowledge derivation) by using a front wheel angle as an example. A is an example of internal derivation performed by using a linear local function. B is an example of external derivation performed by using a linear local function. A point p is a target point to be derived. A cell $(p_1, p_2, p_3)$ is a target cell corresponding to p. $<a_1, a_2, a_3>$ is a local coordinate of p relative to $(p_1, p_2, p_3)$.

Using a front wheel angle as an example (as shown in FIG. 16), the technical solutions of operations 3.1 to 3.3 may be described by using the following instances, including two cases: internal derivation of knowledge and external derivation of knowledge.

Instance of internal derivation of knowledge (as shown in FIG. 16A): It is assumed that we want to know what front wheel angle is appropriate when a vehicle speed is v=38 and a curvature is k=0.48. In one embodiment, a function value of a point p(38, 0.48) in an SC is derived.

In operation 3.1, locating is performed on the point p to obtain a target cell $c(p_1, p_2, p_3)$ corresponding to the point p, where p is included in c. In addition, it is known that function values of $p_1$, $p_2$, and $p_3$ are respectively 23.0, 17.0, and 21.0.

In operation 3.2, a local coordinate (0.45, 0.35, 0.20) of the point p in the cell c is calculated.

In operation 3.3, assuming that a linear local function is used, a function value of the point p is calculated, where the function value is f(p)=0.45*23.0+0.35*17.0+0.20*21.0=20.5. In other words, the front wheel angle should be 20.5.

Instance of external derivation of knowledge (as shown in FIG. 16B): It is assumed that we want to know what front wheel angle is appropriate when a vehicle speed is v=80 and a curvature is k=0.65. In one embodiment, a function value of a point p(80, 0.65) in an SC is derived.

In operation 3.1, locating is performed on the point p to obtain a target cell $c(p_1, p_2, p_3)$ corresponding to the point p, where p is not included in c, that is, the point p is out of an existing boundary of the SC. In addition, it is known that function values of $p_1$, $p_2$, and $p_3$ are respectively 31.0, 27.0, and 23.0.

In operation 3.2, a local coordinate (0.9, 0.3, −0.2) of the point p in the cell c is calculated.

In operation 3.3, assuming that a linear local function is used, a function value of the point p is calculated, where the function value is f(p)=0.9*31.0+0.3*27.0−0.20*23.0=31.4. In other words, the front wheel angle should be 31.4.

2.3.4.5 Operation 4 of this Embodiment: Method for Updating IOV Knowledge Based on an SC A problem to be resolved in this operation is: what operation on a knowledge base SC should IOV knowledge updating be converted into, and how to implement this operation? The following describes in detail:

an overview of the method and procedure;

a knowledge updating solution based on modifying a function value of a vertex of an SC;

a knowledge updating solution based on deleting a vertex of an SC; and a knowledge updating solution based on adding a vertex of an SC.

Figure 17:
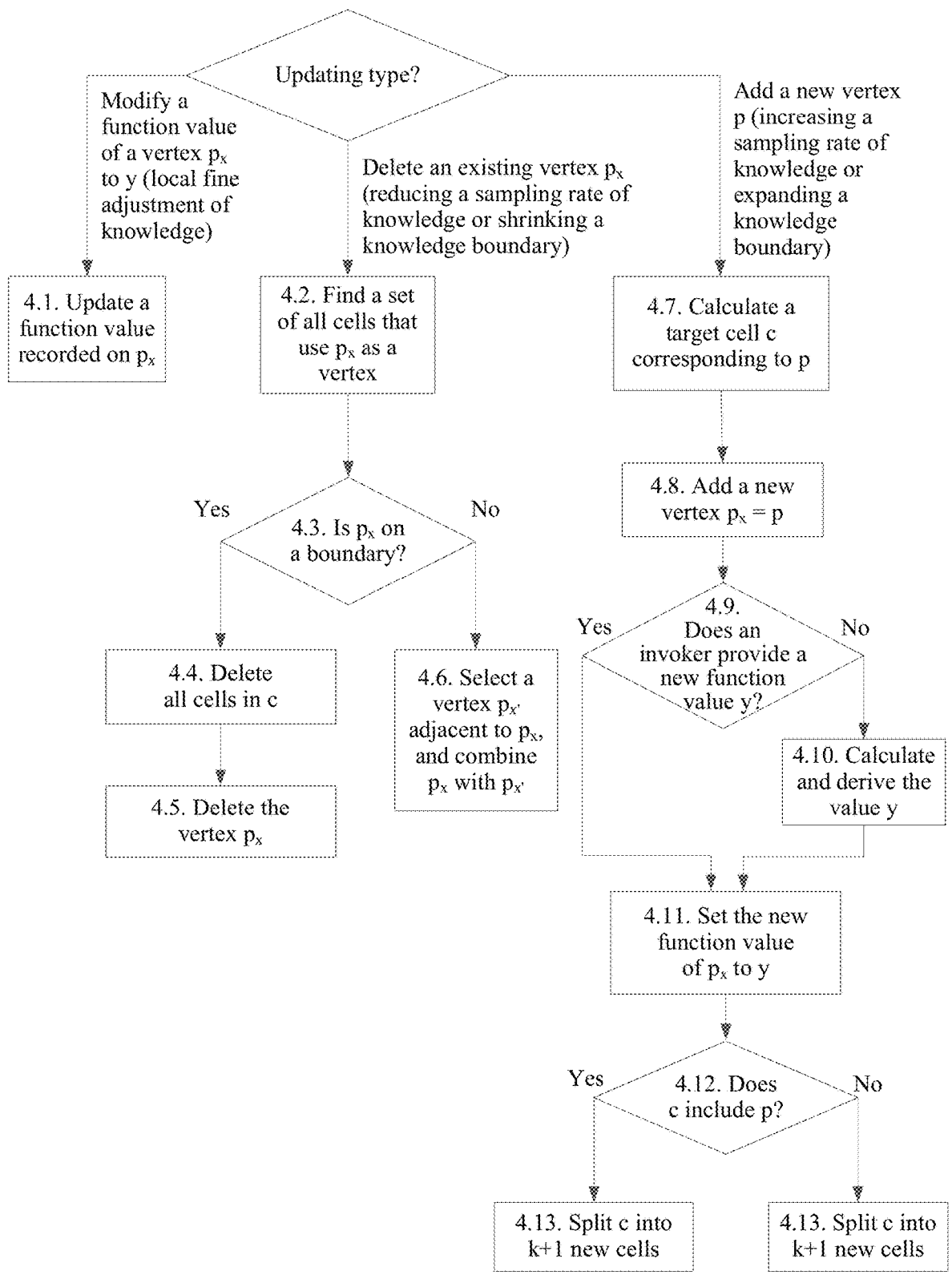
FIG. 17 is a flowchart for updating knowledge according to an embodiment of the application.

FIG. 17 is a flowchart for updating knowledge according to an embodiment of the application. Overview of the method and procedure:

There are different IOV knowledge updating types, which may all correspond to some basic operations on an SC. In this solution, we select some common IOV knowledge updating types, which correspond to the following basic operations on the SC:

local fine adjustment of IOV knowledge, which may be concluded as modifying a function value of a vertex of the SC;

adjustment of a local sampling rate of the IOV knowledge, which may be concluded as adding or deleting an internal vertex of the SC; and expansion and shrinkage of an IOV knowledge boundary, which may be concluded as adding an external vertex of the SC or deleting a boundary vertex of the SC.

For a procedure for updating knowledge based on an SC, refer to 17. This is expansion of operation 4 in the system procedure (FIG. 6).

The following describes the procedure in detail in three parts:

an updating solution based on modifying a function value of a vertex of an SC (operation 4.1);

an updating solution based on deleting a vertex of an SC (operations 4.2 to 4.6); and an updating solution based on adding a vertex of an SC (operations 4.7 to 4.14).

Updating Solution Based on Modifying a Function Value of a Vertex of an SC:

A fine adjustment is made to knowledge on a point in a knowledge space, and this may be implemented by modifying a function value of a vertex of an SC. The technical solution to modifying a function value of a vertex corresponds to operation 4.1 in the procedure of operation 4 (FIG. 17).

Operation 4.1: For a given vertex $p_x$, directly modify a function value recorded on the vertex.

Figure 18:
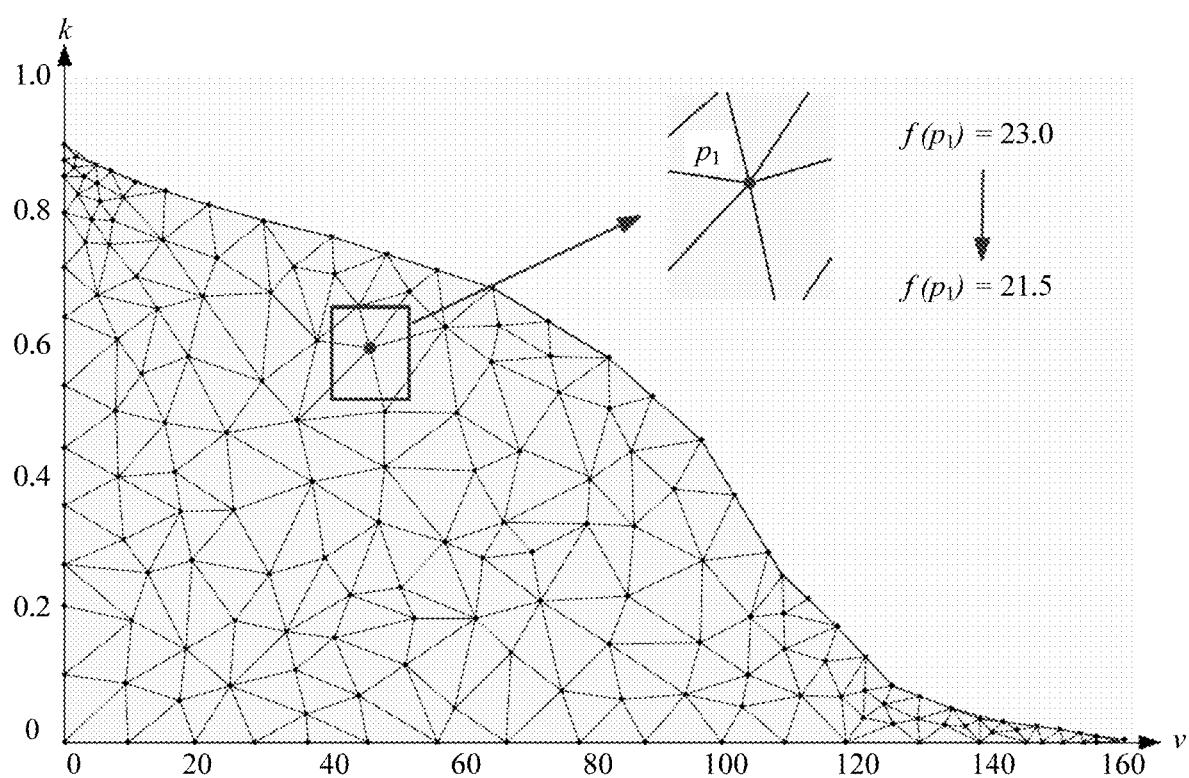
FIG. 18 is a schematic diagram for updating knowledge according to an embodiment of the application.

FIG. 18 is a schematic diagram of a solution to modifying a function value of a vertex in an SC in operation 4 (knowledge updating) by using a front wheel angle as an example according to an embodiment of the application. A vertex $p_1$ in a rectangular block is a vertex to be modified. Using a front wheel angle as an example (as shown in FIG. 18), the foregoing technical solution may be described by using the following instances.

Instance of a local fine adjustment of knowledge, which is implemented by modifying a function value of a vertex of the SC.

For example, a front wheel angle value recorded in a knowledge base when a vehicle speed is 48 and a curvature is 0.6 is 23.0. However, a feedback during actual running is not ideal, and a steering wheel is turned excessively. A possible cause of this non-ideal case is that the front wheel angle value is an initial value obtained from another vehicle through knowledge migration and should be finely adjusted on a current vehicle. However, an upper-layer algorithm determines that it is relatively appropriate to reduce the front wheel angle value in this case to 21.5.

Correspondingly, in the SC, a function value of a vertex $p_1(48, 0.6)$ needs to be updated. In operation 4.1, the function value recorded on the vertex $p_1$ is directly modified to 21.5.

Updating Solution Based on Deleting a Vertex of an SC:

Shrinkage of a knowledge boundary and reduction of a local sampling rate in a knowledge space can be both implemented by deleting a vertex of the SC (including adjusting a nearby cell). The technical solution to deleting a vertex of an SC corresponds to operations 4.2 to 4.5 in the procedure of operation 4 (FIG. 17).

Operation 4.2: Find all cells that use $p_x$ as a vertex, where it is assumed that a set of found cells is $C=\{c_1, c_2, \ldots, c_m\}$.

Operation 4.3: Determine whether $p_x$ is on a boundary of the SC; and if yes, which belongs to a case of deleting a boundary vertex, go to operation 4.4; or if no, which belongs to a case of deleting an internal vertex, go to operation 4.6.

Operation 4.4: Delete all the cells that use $p_x$ as a vertex, that is, delete all the cells in the set C from a cell array of the SC.

Operation 4.5: Delete the vertex $p_x$, that is, delete $p_x$ from a vertex array of the SC.

Operation 4.6: Combine $p_x$ to an adjacent vertex, and delete a related cell. This may be implemented in the following operations:

Operation 4.6.1: Select a vertex connected to $p_x$, for example, select, from a cell $c_1$, any vertex $p_{x'}$ different from $p_x$ (refer to operation 4.2).

Operation 4.6.2: Split the cell set C that uses $p_x$ as a vertex into two parts: $C_x$ and $C_{x'}$, where a cell in $C_{x'}$ includes both vertices $p_x$ and $p_{x'}$, but a cell in $C_x$ includes only the vertex $p_x$ and does not include a vertex $p_{x'}$.

Operation 4.6.3: For each cell $c_i$ in the cell set $C_x$, replace the vertex $p_x$ in $c_i$ with the vertex $p_{x'}$.

Operation 4.6.4: Directly delete each cell in the cell set $C_{x'}$.

Figure 19:
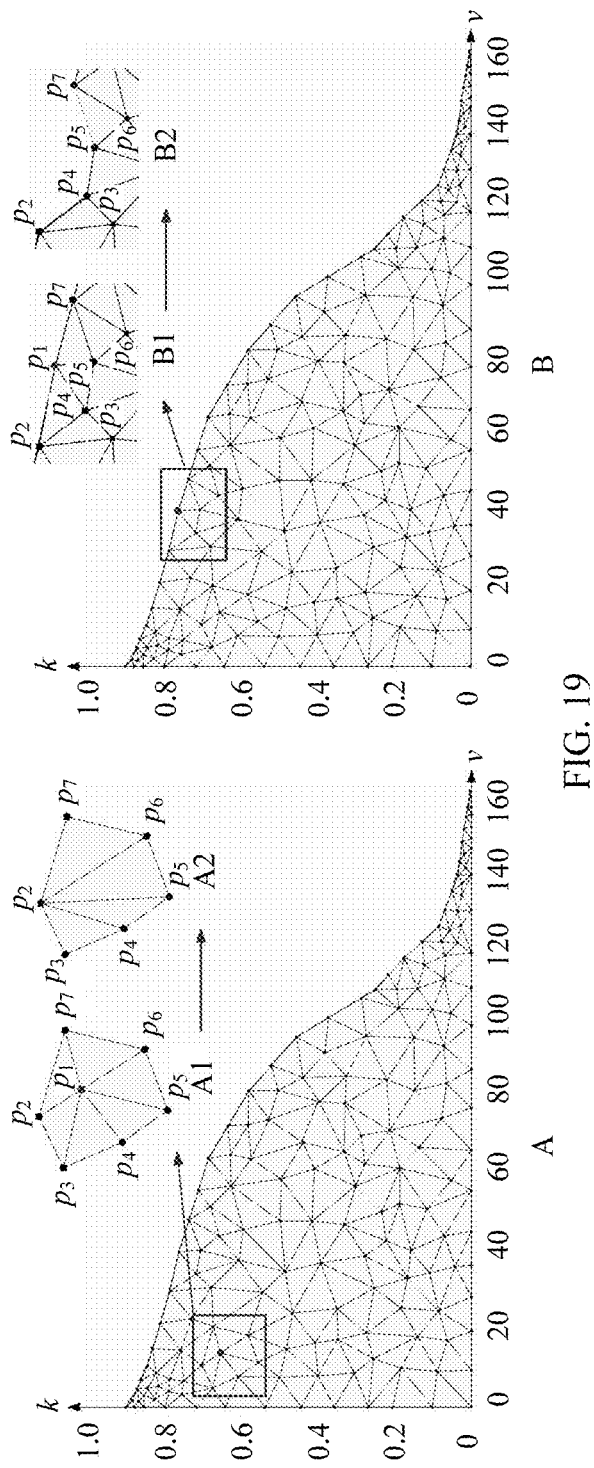
FIG. 19 is a schematic diagram for updating knowledge according to an embodiment of the application.

FIG. 19 is a schematic diagram of a solution to deleting a vertex of an SC in operation 4 (knowledge updating) by using a front wheel angle as an example according to an embodiment of the application. A is an example of deleting an internal vertex (thereby reducing a sampling rate). B is an example of deleting a boundary vertex (thereby shrinking a knowledge boundary). A vertex $p_1$ in a rectangular block is a point to be deleted. Using a front wheel angle as an example (as shown in FIG. 19), the foregoing technical solution may be described by using the following instances.

Instance of reducing a local sampling rate of knowledge (as shown in FIG. 19A), which is implemented by deleting an internal vertex of an SC:

For example, during offline (or online) knowledge base optimization, it is found that a sampling density near a sampling point with a vehicle speed of 15 and a curvature of 0.65 is relatively high; however, during actual running, it is found that this sampling rate is redundant, and that its value is quite close to a value derived from another nearby sampling point. This indicates that the sampling rate near this point may be reduced.

Correspondingly in the SC, as shown in FIG. 19A, an internal vertex $p_1$ needs to be deleted.

In operation 4.2, all cells near the vertex $p_1$ are found, and there are a total of six such cells (FIG. 19A1), denoted as a set C.

In operation 4.3, it is determined that $p_1$ is not on a boundary, and the process goes to operation 4.6.

In operation 4.6, a vertex $p_2$ is selected (operation 4.6.1), and the cell set C is split into two parts (operation 4.6.2): two cells $(p_1, p_2, p_3)$ and $(p_1, p_7, p_2)$ both including $p_1$ and $p_2$, and other four cells including only $p_1$. The first two cells are deleted (operation 4.6.4), and $p_1$ in the last four cells is replaced with $p_2$ (operation 4.6.3). Visually, this is equivalent to shorting the $p_1p_2$ side, and recombining the original six cells (FIG. 19A1) into four cells (FIG. 19A2), thereby achieving an objective of deleting $p_1$.

Instance of implementing knowledge boundary shrinkage by deleting a vertex on a boundary of an SC (as shown in FIG. 19B):

For example, during online running, it is found that a previous sampling point (vehicle speed 80 and curvature 0.8) is no longer safe, for example, with wearing of wheels, the current vehicle can no longer run through such a bending road at such a high speed as before. In this case, it indicates that with degradation of mechanical performance, the existing safe boundary needs to be shrunk.

Correspondingly in the SC, as shown in FIG. 19B, a boundary vertex $p_1$ needs to be deleted.

In operation 4.2, all cells near the vertex $p_1$ are found, and there are a total of three such cells (FIG. 19B1), denoted as a set C.

In operation 4.3, it is determined that $p_1$ is on a boundary, and the process goes to operation 4.4.

Figure 2:
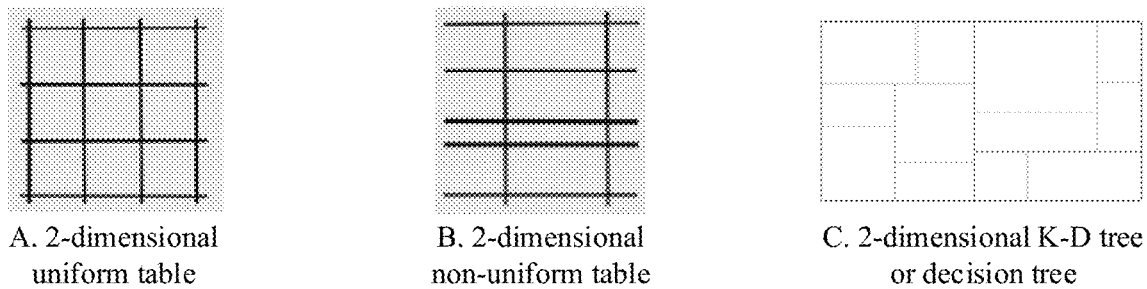
FIG. 2 is a schematic diagram of a table-based knowledge representation solution according to an embodiment of the application.

In operation 4.4, the three cells in C are all deleted (FIG. 19B2).

In operation 4.5, the vertex $p_1$ is directly deleted.

Updating Solution Based on Adding a Vertex of an SC:

Expansion of a knowledge boundary and increase of a local sampling rate in a knowledge space can be both implemented by adding a new vertex (including adjusting a nearby cell) of the SC. The technical solution to adding a vertex of an SC corresponds to operations 4.7 to 4.14 in the procedure of operation 4 (in FIG. 17).

Operation 4.7: Calculate a target cell c corresponding to a point p. It should be noted that, the point p herein is not a vertex of the SC yet, and only a coordinate of the point p is input herein. This is a typical knowledge point locating problem, and the method for quickly locating a knowledge point in operation 2 may be directly invoked.

Operation 4.8: Add a new vertex $p_x=p$ to a vertex array of the SC, which means that a coordinate of the new vertex is equal to the coordinate of the point p.

Operation 4.9: Determine whether an invoker provides a function value y of the new vertex; and if yes, directly go to operation 4.11; or if no, first go to operation 4.10 to calculate the y value.

Operation 4.10: Calculate the y value. The knowledge derivation method in operation 3 may be directly invoked, and the target cell in which p is located is used to derive the function value y as an initial function value of the new vertex $p_x$.

Operation 4.11: Set the function value of the new vertex $p_x$ to y. It should be noted that, the y may be directly provided by the invoker, or may be automatically derived.

Operation 4.12: Determine whether the target cell includes the point p; and if yes, which belongs to a case of inserting a new vertex in the SC, go to operation 4.13; or if no, which belongs to a case of inserting a new vertex out of a boundary of the SC, go to operation 4.14.

Operation 4.13: Split the target cell c into k+1 new cells by using p as a center.

Operation 4.14: Add a new cell c' outside the target cell c, which is equivalent to expanding the boundary from c to c'.

Figure 20:
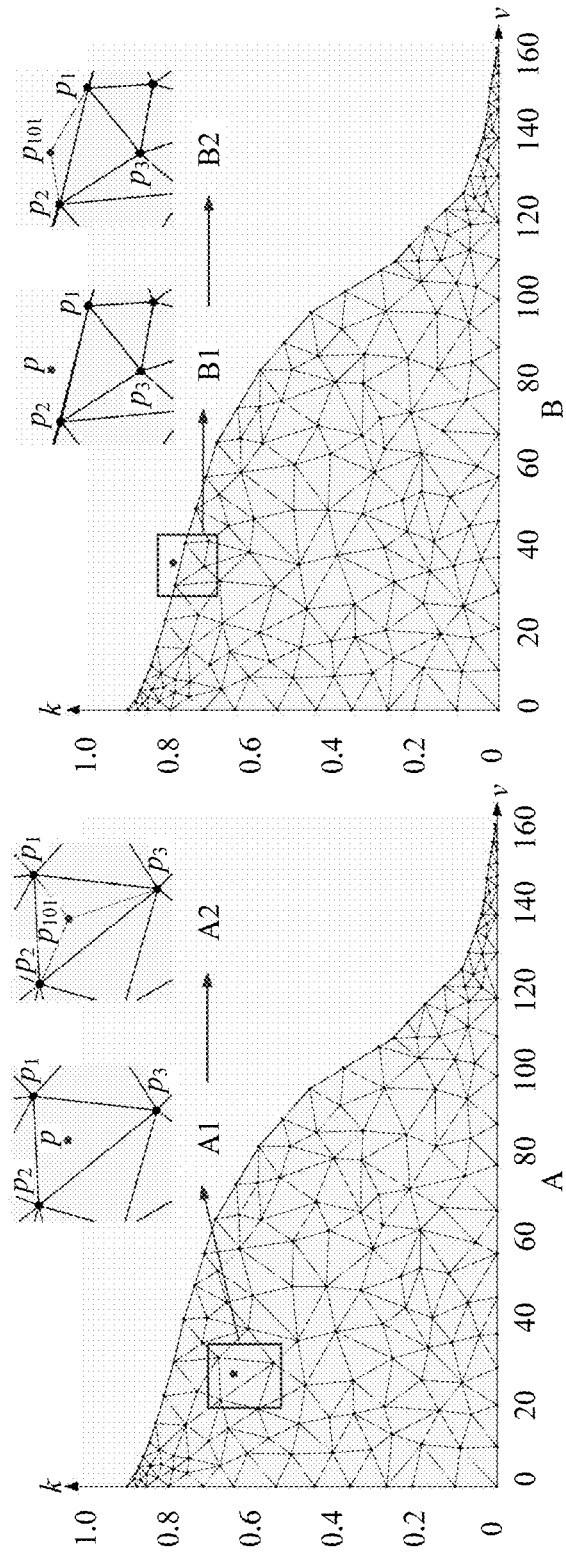
FIG. 20 is a schematic diagram for updating knowledge according to an embodiment of the application.

FIG. 20 is a schematic diagram of a solution to adding a vertex of an SC in operation 4 (knowledge updating) by using a front wheel angle as an example according to an embodiment of the application. A is a schematic diagram for adding a new vertex in the SC (to increase a sampling rate). B is a schematic diagram for adding a new vertex out of the SC (to expand a knowledge boundary). A point p in a rectangular block is a point to be inserted, and becomes a new vertex $p_{101}$ after insertion. Using a front wheel angle as an example (as shown in FIG. 20), the technical solution may be described by using the following instances.

Instance of Adding a Vertex in the SC to Increase a Local Sampling Rate of Knowledge (as Shown in FIG. 20A):

For example, during online running, a feedback about a value of a steering wheel angle derived from a point in a cell $c(p_1, p_2, p_3)$ is poor, but a feedback about a value of a steering wheel angle on each of vertices $p_1, p_2$, and $p_3$ in the cell is good. This indicates that a sampling density in the cell is excessively low and not sufficient for drawing an actual shape of a nearby function.

Figure 1:
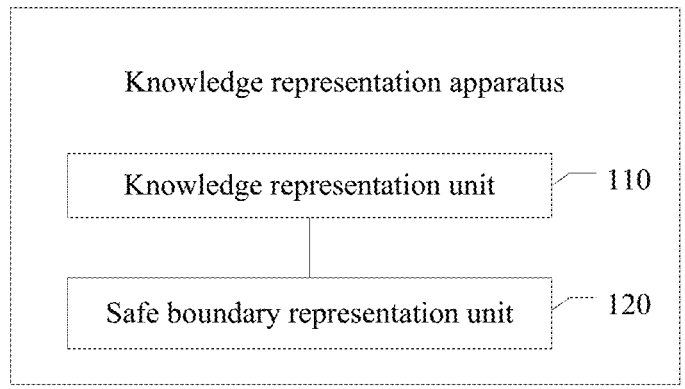
FIG. 1 is a schematic diagram of an apparatus for representing internet of vehicles (IOV) knowledge based on a simplicial complex (SC) according to an embodiment of the application.

Correspondingly in the SC, a new point p(30,0.6) needs to be added (provided by an upper-layer invoker):

In operation 4.7, a target cell $c(p_1, p_2, p_3)$ corresponding to the point p is calculated (FIG. 20A1).

In operation 4.8, a new vertex $p_{101}$ is added to an array of vertices of the SC, and a coordinate of the new vertex is set to a coordinate (30, 0.6) of p.

In operation 4.9, it is determined that the invoker does not provide a function value of the new vertex (assuming that the function value is not provided). In operation 4.10, the function value 27.5 is calculated by using the derivation method. In operation 4.11, the function value of the new vertex $p_{101}$ is set to 27.5. The value may be subsequently updated.

In operation 4.11, it is determined that the target cell c includes the point p. Then in operation 4.13, the cell c is split into three new cells (FIG. 20B2). This is equivalent to increasing a sampling density in the cell c.

Instance of Adding a Vertex Out of the Boundary of the SC to Implement Expansion of the Knowledge Boundary (as Shown in FIG. 20B):

For example, during online running, a new feasible combination is found by an upper-layer algorithm: a vehicle speed 38 and a curvature 0.8, but the combination is not within the current boundary of the knowledge base. This indicates that a new region is explored.

Correspondingly in the SC, a new point p(380.8) needs to be added out of the boundary of the SC (provided by an upper-layer invoker):

In operation 4.7, a target cell $c(p_1, p_2, p_3)$ corresponding to the point p is calculated (FIG. 20B1).

In operation 4.8, a new vertex $p_{101}$ is added to an array of vertices of the SC, and a coordinate of the new vertex is set to a coordinate (38, 0.8) of p.

In operation 4.9, it is determined that the invoker provides a function value y=31.0 (assuming that the function value is provided) of the new vertex. In operation 4.11, the function value of the new vertex $p_{101}$ is set to 31.0.

In operation 4.12, it is determined that the target cell c does not include the point p. Then in operation 4.14, a new cell $c'(p_1, p_{101}, p_2)$ outside the cell $c(p_1, p_2, p_3)$ is added (FIG. 20B2). This is equivalent to expanding the boundary from the original cell c to the new cell c' and the new vertex $p_{101}$.

Embodiments of the application provide a method, an apparatus, and a system for representing an internet of vehicles knowledge base, internet of vehicle to provide a general basic means applicable to the entire IOV field.

According to one aspect, an embodiment of the application provides a method for representing internet of vehicles (IOV) knowledge based on a simplicial complex (SC), where the method includes:

representing k'-dimensional knowledge in a k-dimensional continuous space by using a k-dimensional SC with k'-dimensional function values, where a coordinate of a vertex of the SC is values $(x_1, \ldots, x_k)$ of k input variables, a function value of the vertex is k' output values $(y_1, \ldots, y_{k'})$ of a function, and a relationship between the coordinate and the function value is $(y_1, \ldots, y_{k'})=f(x_1, \ldots, x_{k'})$, where f is a mapping function based on IOV knowledge, and k and k' are natural numbers; and representing a safe boundary of the IOV knowledge by using a boundary of the SC, where the IOV knowledge includes a steering wheel angle of an ego-vehicle, a road curvature, a speed of the ego-vehicle, and an inter-parameter relationship compliant with an objective law of vehicle dynamics, where the steering wheel angle of the ego-vehicle, the road curvature, and the speed of the ego-vehicle are obtained by using a sensor on the ego-vehicle.

In one embodiment, a vertex array is used to record information of all vertices, where a length of the array is a quantity of the vertices of the SC, and each element in the array stores information of one vertex.

In one embodiment, the information of one vertex includes: a coordinate of the vertex and a function value of the vertex, where the function value of the vertex is a function value of the coordinate of the vertex in the mapping function based on the IOV knowledge.

In one embodiment, a cell array is used to record information of all cells of the SC. Information of one cell includes: a vertex index value of the cell and a corresponding face of each face in the cell.

In one embodiment, the boundary of the SC is formed by faces whose corresponding faces are empty in the SC.

As shown in FIG. 1, according to one aspect, an embodiment of the application provides an apparatus for representing internet of vehicles (IOV) knowledge based on a simplicial complex (SC), where the apparatus includes:
- a knowledge representation unit 110, configured to represent k'-dimensional knowledge in a k-dimensional continuous space by using a k-dimensional SC with k'-dimensional function values, where a coordinate of a vertex of the SC is values $(x_1, \ldots, x_k)$ of k input variables, a function value of the vertex is k' output values $(y_1, \ldots, y_{k'})$ of a function, and a relationship between the coordinate and the function value is $(y_1, \ldots, y_{k'})=f(x_1, \ldots, x_{k'})$, where f is a mapping function based on IOV knowledge, and k and k' are natural numbers; and
- a safe boundary representation unit 120, configured to represent a safe boundary of the IOV knowledge by using a boundary of the SC, where the IOV knowledge includes a steering wheel angle of an ego-vehicle, a road curvature, a speed of the ego-vehicle, and an inter-parameter relationship compliant with an objective law of vehicle dynamics, where the steering wheel angle of the ego-vehicle, the road curvature, and the speed of the ego-vehicle are obtained by using a sensor on the ego-vehicle.

In one embodiment, a vertex array is used to record information of all vertices, where a length of the array is a quantity of the vertices of the SC, and each element in the array stores information of one vertex.

In one embodiment, the information of one vertex includes: a coordinate of the vertex and a function value of the vertex, where the function value of the vertex is a function value of the coordinate of the vertex in the mapping function based on the IOV knowledge.

In one embodiment, a cell array is used to record information of all cells of the SC. Information of one cell includes: a vertex index value of the cell and a corresponding face of each face in the cell.

In one embodiment, the boundary of the SC is formed by faces whose corresponding faces are empty in the SC.

According to one aspect, an embodiment of the application provides a method for importing IOV knowledge based on an SC, where the method includes:
- abstracting knowledge in various forms into a knowledge function F, where the knowledge function includes a mapping function f, a safety determining function g, and a knowledge domain D, where f is a mapping function based on IOV knowledge, the safety determining function g is used to determine, for any group of input values $(x_1, x_2, \ldots, x_k)$ in the knowledge domain D, whether the input values are a safe combination in the IOV knowledge, and the knowledge domain D is used to determine a minimum value and a maximum value that can be selected for each input variable $x_i$, where $i=1, 2, \ldots, k$;
- performing discrete sampling on the knowledge function F, and creating a vertex set P; and
- creating a cell set C, and using each cell to fill in a blank space between vertices in the vertex set P, so that a final knowledge base SC is formed.

In one embodiment, the performing discrete sampling on the knowledge function F, and creating a vertex set P includes:
- initializing the vertex set P to null; and
- for each knowledge function F, performing the following operations to perform discrete sampling on Fi:
  - determining a coordinate of a new candidate sampling point p in D based on the mapping function f and an existing vertex in the vertex set P;
  - determining, by using the safety determining function g, whether p is in a safe region; and if p is not in the safe region, ignoring the candidate sampling point p, and selecting a next candidate sampling point; or
  - if p is in the safe region, calculating, by using the mapping function f, a function value corresponding to the candidate sampling point p; and
  - adding the candidate sampling point p to the vertex set P as a new vertex.

In one embodiment, the creating a cell set C, and using each cell to fill in a blank space between vertices, so that a final knowledge base SC is formed includes:
- splitting the vertex set P into two subsets: P− and P+, where P− includes all vertices on a boundary, and P+ includes all vertices off the boundary;
- creating a (k−1)-dimensional cell set C− by using P− as a vertex set;
- combining the vertex set P− with the cell set C− to form a (k−1)-dimensional closed simplicial complex S− used to indicate the boundary of the knowledge base SC;
- creating a k-dimensional cell set C by using P as a vertex set and S− as a boundary constraint; and
- combining the vertex set P with the cell set C to form the final knowledge base SC.

Figure 3:
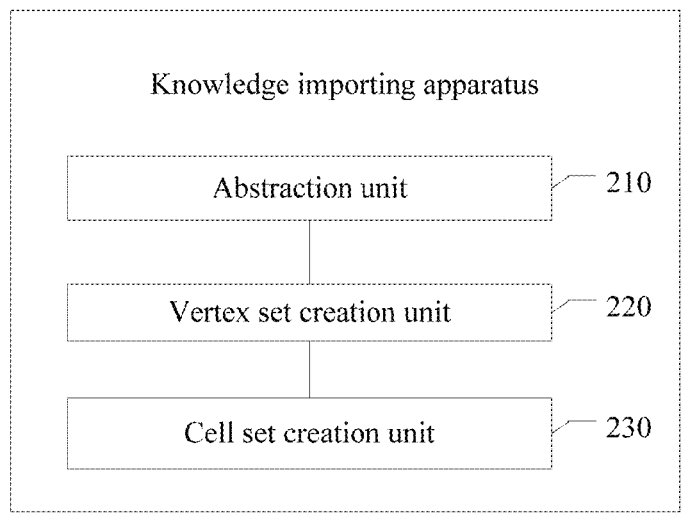
FIG. 3 is a schematic diagram of an apparatus for importing IOV knowledge based on an SC according to an embodiment of the application.

As shown in FIG. 3, according to one aspect, an embodiment of the application provides an apparatus for importing IOV knowledge based on an SC, where the apparatus includes:
- an abstraction unit 210, configured to abstract knowledge in various forms into a knowledge function F, where the knowledge function F includes a mapping function f, a safety determining function g, and a knowledge domain D, where f is a mapping function based on IOV knowledge, the safety determining function g is used to determine, for any group of input values $(x_1, x_2, \ldots, x_k)$ in the knowledge domain D, whether the input values are a safe combination in the IOV knowledge, and the knowledge domain D is used to determine a minimum value and a maximum value that can be selected for each input variable $x_i$, where $i=1, 2, \ldots, k$;
- a vertex set creation unit 220, configured to perform discrete sampling on the knowledge function F generated by the abstraction unit 210 through abstraction, and create a vertex set P; and
- a cell set creation unit 230, configured to create a cell set C, and use each cell to fill in a blank space between vertices in the vertex set P created by the vertex set creation unit 220, so that a final knowledge base SC is formed.

In one embodiment, the vertex set creation unit includes:
- a candidate sampling point determining module 2201, configured to determine a coordinate of a new candidate sampling point p in D based on the mapping function f and an existing vertex in the vertex set P;
- a determining module 2202, configured to determine, by using the safety determining function g, whether p determined by the candidate sampling point determining module 2201 is in a safe region; and if p is not in the safe region, ignore the candidate sampling point p, and select a next candidate sampling point; or if p is in the safe region, calculate, by using the mapping function f, a function value corresponding to the candidate sampling point p; and
- an updating module 2203, configured to add the candidate sampling point p to the vertex set P as a new vertex.

In one embodiment, the cell set creation unit includes:

a splitting module 2301, configured to split the vertex set P into two subsets: P− and P+, where P− includes all vertices on a boundary, and P+ includes all vertices off the boundary;

a first cell set creation module 2401, configured to create a (k−1)-dimensional cell set C− by using P− obtained by the splitting module 2301 through splitting as a vertex set;

a boundary representation module 2402, configured to combine the vertex set P− obtained by the splitting module 2301 through splitting, with the cell set C− created by the first cell set creation module 2401, to form a (k−1)-dimensional closed simplicial complex S− used to indicate the boundary of the knowledge base SC;

a second cell set creation module 2403, configured to create a k-dimensional cell set C by using P as a vertex set and S− formed by the boundary representation module 2402 as a boundary constraint; and a combining module 2404, configured to combine the vertex set P with the cell set C created by the second cell set creation module 2403 to form the final knowledge base SC.

According to one aspect, an embodiment of the application provides a method for quickly locating an IOV knowledge point based on an SC, where the method includes:

obtaining a search start point and a start cell other than an input coordinate of a target point; and finding a next cell through an inter-cell corresponding face along a radial direction between the start point and the target point, starting from the start cell, until a cell including the target point is found.

In this case, the target point is within a boundary. The cell including the target point.

According to one aspect, an embodiment of the application provides a method for quickly locating an IOV knowledge point based on an SC, where the method includes:

obtaining a search start point and a start cell other than an input coordinate of a target point; and finding a next cell through an inter-cell corresponding face along a radial direction between the start point and the target point, starting from the start cell, until a last cell before boundary crossing is found.

In one embodiment, in the process of searching for and finding the next cell, checking whether a current search cell includes the target point q, where yes indicates that the current cell is a target cell; and if no, continuing to search for a next cell, and continuing to check whether the found next cell is empty, where if the next cell is empty, it indicates that the target point is out of a boundary and that the last cell before boundary crossing is the target cell, that is, the cell before the next cell is the target cell.

In one embodiment, in the foregoing operation, the obtaining a search start point and a start cell other than an input coordinate of a target point includes the following two implementations:

Approach 1: Using a previous query result. IOV knowledge is usually queried in real time, a time interval between two queries is quite short, and in many cases, there is good continuity between two consecutive queries, that is, a point in a previous query is usually quite close to a point in a current query. In this case, a target point and a target cell in the previous query may be directly used as a start point and a start cell in the current query.

Approach 2: Defining search regions+Specifying regional proxies. If a point in a previous query does not satisfy a condition, that is, continuity between queries is poor, an entire search space may be divided in advance into some small search regions, and a proxy cell is specified for each region and is recorded. During a query, all target points that fall within this region use the proxy cell of this region as a search start cell by default.

In one embodiment, optionally, the obtaining a search start point and a start cell other than an input coordinate of a target point in the foregoing operation includes:

operation 2.1: checking whether there is a previous search result, that is, a target point q' and a target cell $c_{q'}$ in previous locating;

if yes, going to operation 2.2;

if no, going to operation 2.3;

operation 2.2: checking whether the target point q' in the previous locating and the target point q in the current locating are in a same search region;

if yes, going to operation 2.4;

if no, going to operation 2.3;

operation 2.3: using a default regional proxy as an additional search clue, including:

operation 2.3.1: calculating a search region $U_q$ in which the target point q is located;

operation 2.3.2: setting a start cell $c_p$ to a proxy cell of the search region $U_q$; and operation 2.3.3: setting a start point p to a central point of the start cell $c_p$, and setting a coordinate of the start point p to an average value of coordinates of all vertices in $c_p$; and operation 2.4: using the previous search result as an additional search clue, including:

operation 2.4.1: setting a start cell $c_p$ to the target cell $c_{q'}$ in the previous locating; and operation 2.4.2: setting a start point p to the target point q' in the previous locating.

Figure 21:
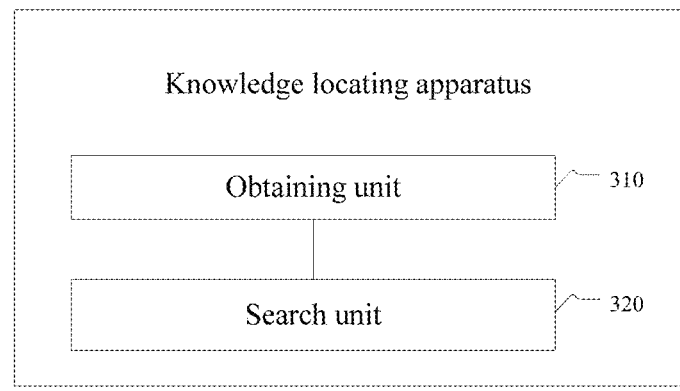
FIG. 21 is a schematic diagram of an apparatus for quickly locating an IOV knowledge point based on an SC according to an embodiment of the application.

As shown in FIG. 21, according to one aspect, an embodiment of the application provides an apparatus for quickly locating an IOV knowledge point based on an SC, where the method includes:

an obtaining unit 310, configured to obtain a search start point and a start cell other than an input coordinate of a target point; and a search unit 320, configured to find a next cell through an inter-cell corresponding face along a radial direction between the start point and the target point, starting from the start cell obtained by the obtaining unit 310, until a cell including the target point is found.

In this case, the target point is within a boundary. The cell including the target point.

According to one aspect, an embodiment of the application provides a method for quickly locating an IOV knowledge point based on an SC, where the method includes:

an obtaining unit 310, configured to obtain a search start point and a start cell other than an input coordinate of a target point; and a search unit 320, configured to find a next cell through an inter-cell corresponding face along a radial direction between the start point and the target point, starting from the start cell obtained by the obtaining unit 310, until a last cell before boundary crossing is found.

In one embodiment, the search unit 320 is configured to check whether a current found cell includes the target point q, where yes indicates that the current cell is a target cell; and if no, continue to search for a next cell, and continue to check whether the found next cell is empty, where if the next cell is empty, it indicates that the target point is out of a boundary and that the last cell before boundary crossing is the target cell, that is, the cell before the next cell is the target cell.

In one embodiment, the obtaining unit 310 is configured to check whether there is a previous search result, that is, a target point q' and a target cell $c_{q'}$ in previous locating; and
- if yes, check whether the target point q' in the previous locating and the target point q in the current locating are in a same search region, and if the target point q' and the target point q are in the same region, use the previous search result as an additional search clue, where optionally, this includes: setting a start cell $c_p$ to the target cell $c_{q'}$ in the previous locating; and setting a start point p to the target point q' in the previous locating; or
- if no, use a default regional proxy as an additional search clue, where optionally, this includes: calculating a search region $U_q$ in which the target point q is located; setting a start cell $c_p$ to a proxy cell of the search region $U_q$; and setting a start point p to a central point of the start cell $c_p$, and setting a coordinate of the start point p to an average value of coordinates of all vertices in $c_p$.

According to one aspect, an embodiment of the application provides a method for deriving IOV knowledge based on an SC, where the method includes:
- finding, based on a coordinate of any given point p, a target cell corresponding to the point p, where
- optionally, if the point p is located within a boundary of an SC, a target cell c including the point p needs to be found, and c is used for subsequent derivation (internal derivation); or if the point c is located out of a boundary of an SC, a target cell c that is on the boundary and does not include p but is relatively close to p needs to be found, and c is used for subsequent derivation (external derivation); a method for finding the target cell corresponding to the point p is described in detail in the foregoing embodiment, and is not described again herein;
- calculating a local coordinate of the point p in the corresponding target cell c; and
- combining the local coordinate of p with a function value of a vertex in c into a local function, and calculating a function value of the point p by using the local function.

Figure 22:
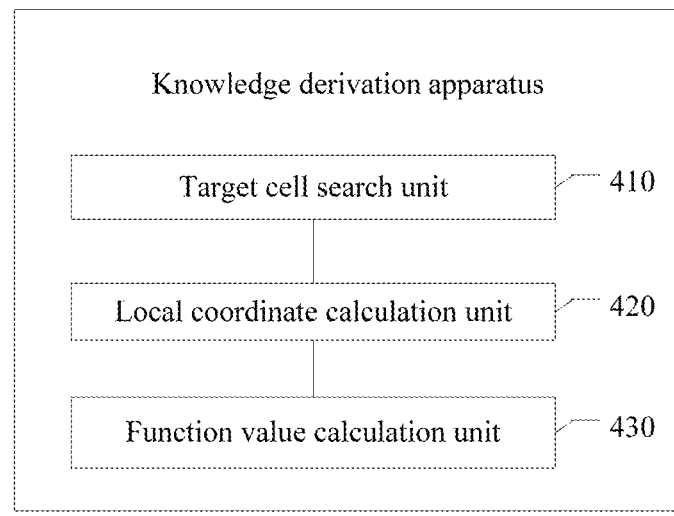
FIG. 22 is a schematic diagram of an apparatus for deriving IOV knowledge based on an SC according to an embodiment of the application.

As shown in FIG. 22, according to one aspect, an embodiment of the application provides an apparatus for deriving IOV knowledge based on an SC, where the apparatus includes:
- a target cell search unit 410, configured to find, based on a coordinate of any given point p, a target cell corresponding to the point p, where
- optionally, if the point p is located within a boundary of an SC, a target cell c including the point p needs to be found, and c is used for subsequent derivation (internal derivation); or if the point c is located out of a boundary of an SC, a target cell c that is on the boundary and does not include p but is relatively close to p needs to be found, and c is used for subsequent derivation (external derivation); a method for finding the target cell corresponding to the point p is described in detail in the foregoing embodiment, and is not described again herein;
- a local coordinate calculation unit 420, configured to calculate a local coordinate of the point p in the corresponding target cell c found by the target cell search unit 410; and
- a function value calculation unit 430, configured to combine the local coordinate of p that is calculated by the local coordinate calculation unit 420 with a function value of a vertex in c into a local function, and calculate a function value of the point p by using the local function.

According to one aspect, an embodiment of the application provides a method for updating IOV knowledge based on an SC, where the method includes:
- local fine adjustment of IOV knowledge, which may be concluded as modifying a function value of a vertex of an SC;
- adjustment of a local sampling rate of the IOV knowledge, which may be concluded as adding or deleting an internal vertex of the SC; and
- expansion and shrinkage of an IOV knowledge boundary, which may be concluded as adding an external vertex of the SC or deleting a boundary vertex of the SC.

In one embodiment, modifying a function value of a vertex of the SC may be: for a given vertex, directly modifying a function value recorded on the vertex.

In one embodiment, shrinkage of a knowledge boundary and reduction of a local sampling rate in a knowledge space can be both implemented by deleting a vertex of the SC.

In one embodiment, assuming that a vertex to be deleted is $p_x$, a operation of deleting the vertex includes:
- operation 1: finding all cells that use $p_x$ as a vertex, where it is assumed that a set of found cells is $C=\{c_1, c_2, \ldots, c_m\}$;
- operation 2: determining whether $p_x$ is on a boundary of the SC; and if yes, which belongs to a case of deleting a boundary vertex, going to operation 3; or if no, which belongs to a case of deleting an internal vertex, going to operation 5;
- operation 3: deleting all the cells that use $p_x$ as a vertex, that is, deleting all the cells in the set C from a cell array of the SC;
- operation 4: deleting the vertex $p_x$, that is, deleting $p_x$ from a vertex array of the SC; and
- operation 5: combining $p_x$ to an adjacent vertex, and deleting a related cell, where this may be implemented in the following operations:
  - operation 5.1: selecting a vertex connected to $p_x$, for example, selecting, from a cell $c_1$, any vertex $p_{x'}$ different from $p_x$;
  - operation 5.2: splitting the cell set C that uses $p_x$ as a vertex into two parts: $C_{x'}$ and $C_{x''}$, where a cell in $C_{x'}$ includes both vertices $p_x$ and $p_{x'}$, but a cell in $C_{x''}$ includes only the vertex $p_x$ and does not include a vertex $p_{x'}$;
  - operation 5.3: for each cell $c_i$ in the cell set $C_{x'}$, replacing the vertex $p_x$ in $c_i$ with the vertex $p_{x'}$; and
  - operation 5.4: directly deleting each cell in the cell set $C_{x''}$.

In one embodiment, expansion of the knowledge boundary and increase of the local sampling rate in the knowledge space can be both implemented by adding a new vertex of the SC.

In one embodiment, a operation of adding a vertex p to a k-dimensional SC includes:
- operation 1: calculating a target cell c corresponding to a point p, where it should be noted that, the point p herein is not a vertex of the SC yet, and only a coordinate of the point p is input herein;
- optionally, the target cell c corresponding to the point p may be obtained by using the foregoing method for quickly locating an IOV knowledge point based on an SC;

operation 2: adding a new vertex $p_x=p$ to a vertex array of the SC, which means that a coordinate of the new vertex is equal to the coordinate of the point p;

operation 3: setting a function value of the new vertex $p_x$ to y, where optionally, y may be directly provided by an invoker, or may be automatically derived based on the foregoing embodiment of the method for deriving IOV knowledge based on an SC;

operation 4: determining whether the target cell includes the point p; and if yes, which belongs to a case of inserting a new vertex in the SC, going to operation 5; or if no, which belongs to a case of inserting a new vertex out of a boundary of the SC, going to operation 6;

operation 5: splitting the target cell c into k+1 new cells by using p as a center; and operation 6: adding a new cell c' outside the target cell c, which is equivalent to expanding the boundary from c to c'.

Figure 23:
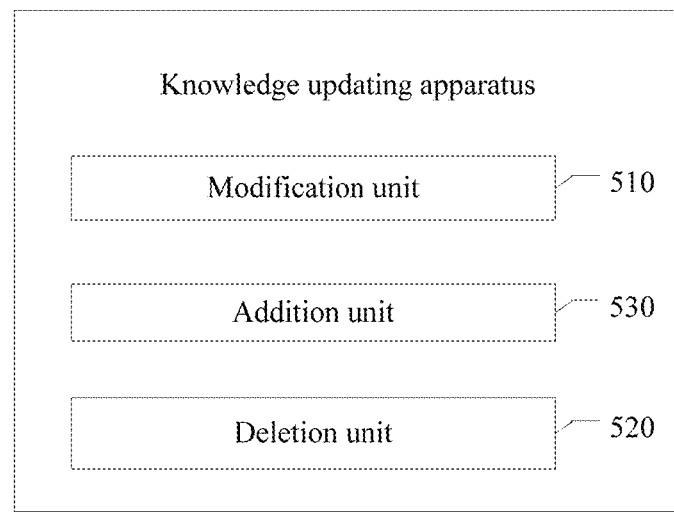
FIG. 23 is a schematic diagram of an apparatus for updating IOV knowledge based on an SC according to an embodiment of the application.

As shown in FIG. 23, according to one aspect, an embodiment of the application provides an apparatus for updating IOV knowledge based on an SC, where the apparatus includes:

a modification unit 510, configured to modify a function value of a vertex of an SC, where optionally, the modification unit is configured to directly modify, for a given vertex, a function value recorded on the vertex;

a deletion unit 520, configured to delete an internal vertex of the SC or delete a boundary vertex of the SC; and an addition unit 530, configured to add an internal vertex of the SC or add an external vertex of the SC.

In one embodiment, assuming that a vertex to be deleted is $p_x$, the deletion unit includes:

a search module 5201, configured to find all cells that use $p_x$ as a vertex, where it is assumed that a set of found cells is $C=\{c_1, c_2, \ldots, c_m\}$;

a boundary determining module 5202, configured to determine whether $p_x$ is on a boundary of the SC; and if yes, which belongs to a case of deleting a boundary vertex, invoke a first deletion module 5303; or if no, which belongs to a case of deleting an internal vertex, invoke a second deletion module 5304;

the first deletion module 5303, configured to delete all the cells that use $p_x$ as a vertex, that is, delete all the cells in the set C from a cell array of the SC; and delete the vertex $p_x$, that is, delete $p_x$ from a vertex array of the SC; and the second deletion module 5304, configured to combine $p_x$ to an adjacent vertex, and delete a related cell, where the second deletion module is configured to:

select a vertex connected to $p_x$, for example, select, from a cell $c_1$, any vertex $p_{x'}$ different from $p_x$;

split the cell set C that uses $p_x$ as a vertex into two parts: $C_x$ and $C_{x'}$, where a cell in $C_{x'}$ includes both vertices $p_x$ and $p_{x'}$, but a cell in $C_x$ includes only the vertex $p_x$ and does not include a vertex $p_{x'}$;

for each cell $c_i$ in the cell set $C_x$, replace the vertex $p_x$ in $c_i$ with the vertex $p_{x'}$; and delete each cell in the cell set $C_{x'}$.

In one embodiment, the addition unit includes:

a target cell calculation module 5301, configured to calculate a target cell c corresponding to a point p, where it should be noted that, the point p herein is not a vertex of the SC yet, and only a coordinate of the point p is input herein;

optionally, the target cell calculation module may obtain, by using the foregoing method for quickly locating an IOV knowledge point based on an SC, the target cell c corresponding to the point p;

an addition module 5302, configured to add a new vertex $p_x=p$ to a vertex array of the SC, which means that a coordinate of the new vertex is equal to the coordinate of the point p, and set a function value of the new vertex $p_x$ to y, where optionally, y may be directly provided by an invoker, or may be automatically derived based on the foregoing embodiment of the method for deriving IOV knowledge based on an SC;

a determining module 5303, configured to determine whether the target cell includes the point p; and if yes, which belongs to a case of inserting a new vertex in the SC, invoke a splitting module 5304; or if no, which belongs to a case of inserting a new vertex out of the boundary of the SC, invoke an expansion module 5305;

the splitting module 5304, configured to split the target cell c into k+1 new cells; and the expansion module 5305, configured to add a new cell c' outside the target cell c, which is equivalent to expanding the boundary from c to c'.

Figure 24:
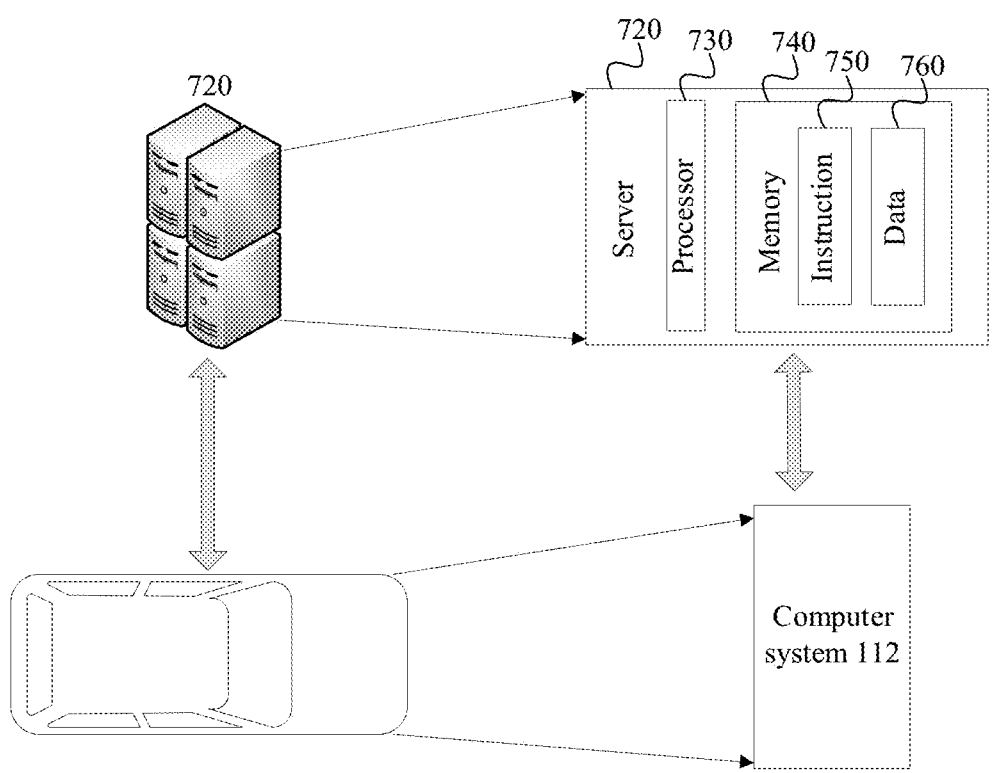
FIG. 24 is a schematic diagram of an application scenario according to an embodiment of the application.

FIG. 24 is a schematic diagram of an application scenario according to an embodiment of the application. A computer 720 may include a server having a plurality of computers, for example, a load balancing server group. The computer 720 exchanges information with other nodes in a network for purposes of receiving data from a computer system 112 and processing and transmitting the data. The server may be configured by the computer system 110. The server has a processor 730, a memory 740, an instruction 750, and data 760.

The instruction 750 is stored in the memory 740. When the instruction is executed by the processor 730, functions or operations in the foregoing Embodiments 1 to 5 are performed. Because Embodiments 1 to 5 are described in detail above, details are not described again herein.

It should be noted that, the computer 720 may be installed on a vehicle 101, or may be placed in a control center on the internet of vehicles. This is not particularly limited herein.

Figure 25:
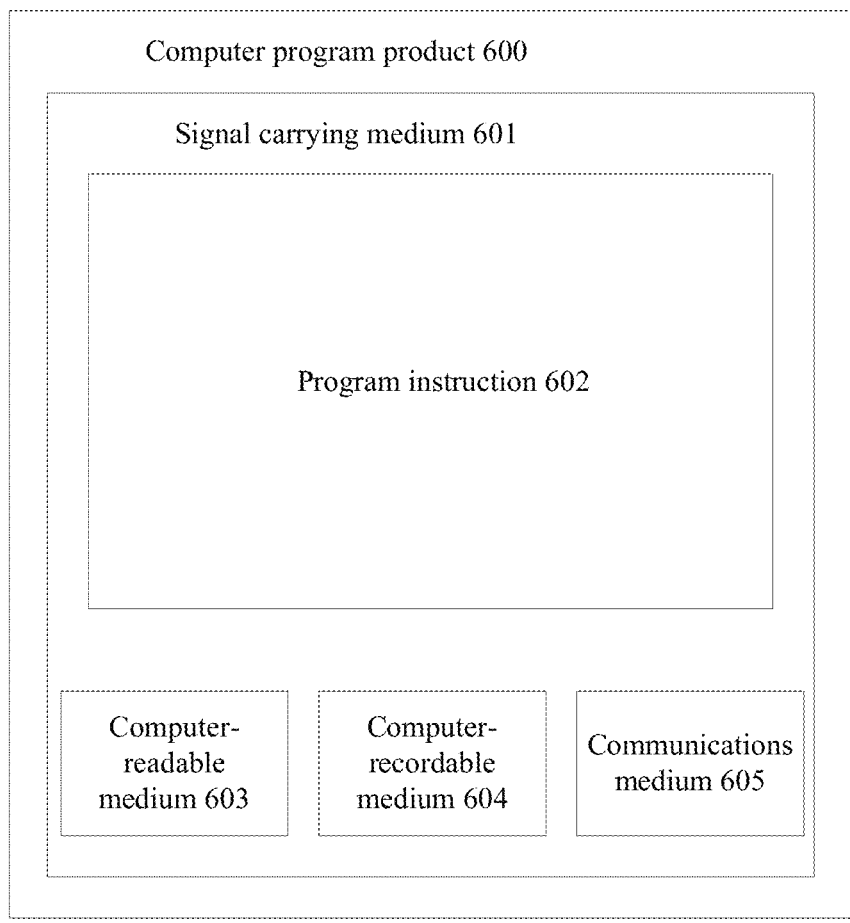
FIG. 25 is a schematic diagram of a computer program product according to an embodiment of the application.

In an example, FIG. 25 schematically shows a conceptual local view of an example computer program product arranged according to at least some embodiments shown herein. The example computer program product includes a computer program used to execute a computer process on a computing device. In an embodiment, an example computer program product 600 is provided by using a signal carrying medium 601. The signal carrying medium 601 may include one or more program instructions 602. When one or more processors run the program instructions, functions or some functions described in the foregoing Embodiments 1 to 5 may be provided.

In some examples, the signal carrying medium 601 may include a computer-readable medium 603, for example, including but not limited to a hard disk drive, a compact disc (CD), a digital video disc (DVD), a digital magnetic tape, a memory, a read-only memory (ROM), or a random access memory (RAM). In some implementations, the signal carrying medium 601 may include a computer-recordable medium 604, for example, including but not limited to a memory, a read/write (R/W) CD, or an R/W DVD. In some implementations, the signal carrying medium 601 may include a communications medium 605, for example, including but not limited to a digital and/or analog communications medium (for example, an optical cable, a waveguide, a wired communications link, or a wireless communications link). Therefore, the signal carrying medium 601 may use the communications medium 605 in a wireless manner (for example, a wireless communications medium complying with the IEEE 802.11 standard or another transmission protocol) for transmission. The one or more program instructions 602 may be computer-executable instructions or logic implementation instructions. In some examples, a computing device such as the computing device described in Embodiments 1 to 5 may be configured to provide various operations, functions, or actions in response to the program instructions 602 that are transmitted to the computing device through one or more of the computer-readable medium 603, the computer-recordable medium 604, and/or the communications medium 605. It should be understood that, the arrangement described herein is used as an example only. Therefore, a person skilled in the art understands that other arrangements or other elements (for example, a machine, an interface, a function, a sequence, and a function group) can be used instead, and that some elements may be omitted based on an expected result. In addition, many of the described elements may be implemented as discrete or distributed components, or may be functional entities implemented in combination with other components in any appropriate combination and position.

Some methods in the embodiments of the application are used to provide hierarchical multi-angle support for an upper-layer self-driving control algorithm, and have the following advantageous effects:

Saving space: This is mainly because an unstructured SC other than a structured table is used. Generally, for a k-dimensional knowledge space, if a new sampling point needs to be added, there is an exponential difference between spaces consumed by using different solutions.

Uniform table (UL): Assuming that there are n sampling points in each dimension, $(2^{k-1})*n^k$ sampling points need to be added.

Non-uniform table (NL): Assuming that there are n sampling points in each dimension, $k*n^{k-1}$ sampling points need to be added.

Knowledge base SC: Regardless of a quantity of existing vertices and cells, only one sampling point and k cells need to be added.

In addition, because there is no need to perform sampling and storage in a region out of a safe boundary in the knowledge base SC, the space can be further saved.

Saving time: This is mainly attributable to the method for quickly locating a knowledge point, and compensates for a shortcoming (excessively slow locating) of an original topological SC. Generally, for a k-dimensional knowledge base SC including $O(m^k)$ cells in an order of magnitude, if there is no acceleration algorithm, a quantity of cells that need to be searched for is $O(m^k)$; however, after acceleration, a search space is only $O(\sqrt{m})$. For example, in an experiment, there is a 3-dimensional knowledge base SC including approximately $10^3$ (1000) cells. We add a 3-dimensional sparse index structure, and divide the space into $3^3$ (=27) search regions. An algorithm for quickly locating a knowledge point is invoked, and a quantity of cells that need to be searched for during locating at each time does not exceed 4.

Automatic derivation: For example, a knowledge base of front wheel angle knowledge stores only driving methods whose speeds are 10, 15, 20, 25, 30, 35, and 40. By using an automatic derivation function of the knowledge base, a driving method whose speed is any one of 10 to 30 and a driving method whose speed is slightly less than 10 or slightly greater than 40 can be automatically performed.

Fully using existing knowledge: This is mainly attributable to importing of existing knowledge (including rules). For example, the knowledge base of the front wheel angle knowledge is initialized by using a rule in a rule-based system. In one embodiment, within an interval of speeds less than 30, a rule based on a Kalman model is imported; and within an interval of speeds greater than 30, a rule based on a kinematic principle is imported. After the rule is imported, during initial running, although no adjustment has been made through learning, a highly reliable self-driving effect can be provided, and driving can be basically performed along a target track. Occasionally a deviation exists, but the deviation will not be excessively large. This is an effect of the imported rule, and provides a good basis for a subsequent learning-based adjustment and improvement. During initial running without an obvious deviation, when learning has not been performed, a front wheel angle is already controlled relatively well (this is an effect of a previously accumulated rule). Obviously, the front wheel angle is controlled more smoothly after automatic running and online learning for a very short time.

Quickly learning based on the existing knowledge: This is mainly attributable to knowledge updating, and in particular, quick local updating. Whatever is inappropriate is adjusted. There is no need to perform slow global optimization in which a slight change may have global impact as in a model-based algorithm. For example, for the knowledge base of the front wheel angle knowledge, after the existing knowledge (rule) is imported, a learning-based method is started, and the knowledge is improved during running. For example, after self-driving on a given road segment for only a few minutes, an obvious improvement of a self-driving effect can be seen: from a slight deviation at the beginning to no obvious deviation.

The embodiments are used to provide hierarchical multi-angle support for an upper-layer self-driving control algorithm. Currently, the embodiments have passed several tests by using a simulator and a real vehicle, and have the following advantageous effects:

Saving space: This is mainly because an unstructured SC other than a structured table is used. Generally, for a k-dimensional knowledge space, if a new sampling point needs to be added, there is an exponential difference between spaces consumed by using different solutions.

Uniform table (UL): Assuming that there are n sampling points in each dimension, $(2^{k-1})*n^k$ sampling points need to be added.

Non-uniform table (NL): Assuming that there are n sampling points in each dimension, $k*n^{k-1}$ sampling points need to be added.

Knowledge base SC: Regardless of a quantity of existing vertices and cells, only one sampling point and k cells need to be added.

In addition, because there is no need to perform sampling and storage in a region out of a safe boundary in the knowledge base SC, the space can be further saved.

Saving time: This is mainly attributable to the method for quickly locating a knowledge point, and compensates for a shortcoming (excessively slow locating) of an original topological SC. Generally, for a k-dimensional knowledge base SC including $O(m^k)$ cells in an order of magnitude, if there is no acceleration algorithm, a quantity of cells that need to be searched for is $O(m^k)$; however, after acceleration, a search space is only $O(\sqrt{m})$. For example, in an experiment, there is a 3-dimensional knowledge base SC including approximately $10^3$ (1000) cells. We add a 3-dimensional sparse index structure, and divide the space into $3^3$ (=27) search regions. An algorithm for quickly locating a knowledge point is invoked, and a quantity of cells that need to be searched for during locating at each time does not exceed 4.

Automatic derivation: For example, a knowledge base of front wheel angle knowledge stores only driving methods whose speeds are 10, 15, 20, 25, 30, 35, and 40. By using an automatic derivation function of the knowledge base, a driving method whose speed is any one of 10 to 30 and a driving method whose speed is slightly less than 10 or slightly greater than 40 can be automatically performed.

Fully using existing knowledge: This is mainly attributable to importing of existing knowledge (including rules). For example, the knowledge base of the front wheel angle knowledge is initialized by using a rule in a rule-based system. In one embodiment, within an interval of speeds less than 30, a rule based on a Kalman model is imported; and within an interval of speeds greater than 30, a rule based on a kinematic principle is imported. After the rule is imported, during initial running, although no adjustment has been made through learning, a highly reliable self-driving effect can be provided, and driving can be basically performed along a target track. Occasionally a deviation exists, but the deviation will not be excessively large. This is an effect of the imported rule, and provides a good basis for a subsequent learning-based adjustment and improvement. During initial running without an obvious deviation, when learning has not been performed, a front wheel angle is already controlled relatively well (this is an effect of a previously accumulated rule). Obviously, the front wheel angle is controlled more smoothly after automatic running and online learning for a very short time.

Quickly learning based on the existing knowledge: This is mainly attributable to knowledge updating, and in particular, quick local updating. Whatever is inappropriate is adjusted. There is no need to perform slow global optimization in which a slight change may have global impact as in a model-based algorithm. For example, for the knowledge base of the front wheel angle knowledge, after the existing knowledge (rule) is imported, a learning-based method is started, and the knowledge is improved during running. For example, after self-driving on a given road segment for only a few minutes, an obvious improvement of a self-driving effect can be seen: from a slight deviation at the beginning to no obvious deviation.

With respect to the technical problems to be resolved, the following provides the advantageous effects of the technical solutions in a form of a table, as shown in Table 1.

TABLE 1

Advantageous effects of the application

| Technical problem to be resolved | Technical solution of the embodiments of the application | Advantageous effect |
| --- | --- | --- |
| Representation of knowledge in an IOV multidimensional space | SC-based knowledge representation mode | A most flexible knowledge sampling mode, where sampling points may be randomly distributed in any positions (this is an advantageous effect of the SC itself); very low spatial complexity (attributable to an advantage of the SC itself); and supporting fast memory operations (attributable to a special SC type, special usage, and a special data structure that are used by us), where a same set of data structures and algorithms (including all methods and algorithms in this patent) is applicable to a knowledge space of any dimension. |
| Derivation of IOV multidimensional knowledge | SC-based knowledge representation mode, SC-based fast random access algorithm, and SC-based knowledge derivation method | Very low time complexity (special SC type and special algorithm, which compensate for a disadvantage of the SC itself); automatic derivation; multi-precision approaching; and capable of both internal derivation (in an explored region with sampling points) and external derivation (in an unexplored region without sampling points). |
| Updating of IOV multidimensional knowledge | SC-based knowledge representation mode, SC-based fast random query algorithm, SC-based knowledge derivation method, and SC-based knowledge updating method | Supporting online knowledge updating and refinement (that is, life-long knowledge accumulation and knowledge updating); supporting automatic operation-by-operation filling of an unknown knowledge space (that is, adaptive to an unknown situation); and implementing hierarchical knowledge updating (from local to global, and from a fine adjustment in a small region to updating within a large range) through hierarchical knowledge decomposition. |
| Safe learning of IOV multidimensional knowledge | SC-based knowledge representation mode | A safe boundary can be specified conveniently and accurately (without using an additional data structure), so that an upper-layer online learning algorithm can confine knowledge space exploration within a safe range. |

It should be noted that, the embodiments of the application are intended to lay a basis and provide guidance. Based on the embodiments of the application, hierarchical expansion can be performed in a plurality of directions. Although the embodiments of the application are targeted at IOV knowledge whose input space is a continuous space, if the input space is hybrid (that is, continuous in some dimensions, but discrete in some dimensions), the embodiments of the application may also be used to manage the continuous part of knowledge. Still further, a knowledge base system for managing discrete knowledge may be designed, integrated with the embodiments of the application, and expanded into a knowledge base system that is applicable to more types of IOV knowledge. If viewed as modules in the system, various knowledge management methods in the embodiments of the application are defined in the SC knowledge representation mode. However, if the knowledge management methods are separated from the system and viewed as independent methods, the knowledge management methods may be defined in another representation mode, as long as this representation mode may support discrete sampling and continuous derivation (for example, a structured or semi-structured representation method). Core ideas are similar, but implementation methods and effects are different. The embodiments of the application focus on relatively underlying basic IOV knowledge management functions. However, many new ideas in the embodiments of the application provide great inspiration for development of an upper-layer algorithm. In addition, technical points in the embodiments of the application may provide underlying support for the upper-layer algorithm. On this basis, upper-layer functions are extended, and further, an upper-layer IOV learning algorithm is developed.

All the technical points in the embodiments of the application are targeted at the IOV. To visually describe the technical points in the embodiments of the application, the application uses the IOV as an application environment for description. Actually, the application is not limited thereto. Actually, as long as any field or any application relates to knowledge in a multidimensional continuous space, the knowledge can be abstracted into a function in the multidimensional space, and the embodiments of the application may be applied thereto. On this basis, the application may be developed at an application layer in combination with actual problems in various fields.

A person of ordinary skill in the art may understand that all or some of the operations of the method embodiments may be implemented by a program instructing related hardware. Operations of the methods disclosed with reference to the embodiments of the application may be directly executed and completed by a combination of hardware in a processor and software modules. When it is implemented by using software, code that implements the foregoing functions may be stored in a computer-readable medium. The computer-readable medium includes a computer storage medium. The storage medium may be any available medium accessible to a computer. The following is used as an example but is not limited: The computer readable medium may be a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. The computer-readable medium may be a compact disc (CD), a laser disc, a digital video disc (DVD), a floppy disk, or a Blu-ray disc.

The foregoing descriptions are merely example embodiments of the application, but are not intended to limit the embodiments of the application. Any modification, equivalent replacement, and improvement made without departing from the spirit and principle of the embodiments of the application shall fall within the protection scope of the embodiments of the application.

What is claimed is:

1. A method for representing internet of vehicles (IOV) knowledge based on a simplicial complex (SC), the method comprising:
representing k'-dimensional knowledge in a k-dimensional continuous space by using a k-dimensional SC with k'-dimensional function values, wherein a coordinate of a vertex of the SC is values $(x_1, \ldots, x_k)$ of k input variables, a function value of the vertex is k' output values $(y_1, \ldots, y_{k'})$ of a function, and a relationship between the coordinate and the function value is $(y_1, \ldots, y_{k'})=f(x_1, \ldots, x_k)$, wherein f is a mapping function based on IOV knowledge, and k and k' are natural numbers; and
representing a safe boundary of the IOV knowledge by using a boundary of the SC, wherein the IOV knowledge comprises a steering wheel angle of an ego-vehicle, a road curvature, a speed of the ego-vehicle, and an inter-parameter relationship compliant with an objective law of vehicle dynamics, wherein the steering wheel angle of the ego-vehicle, the road curvature, and the speed of the ego-vehicle are obtained by using a sensor on the ego-vehicle; and
wherein a IOV knowledge is identified in the SC, the IOV knowledge having a coordinate corresponding to a combination of a road curvature and a speed of an ego-vehicle as input variables;
a steering wheel angle is determined for the ego-vehicle based on the identified IOV knowledge; and
the ego-vehicle is controlled to perform a self-driving or an automatic parking based on the determined steering wheel angle.

2. The method for representing IOV knowledge according to claim 1, wherein a vertex array is used to record information of all vertices, wherein a length of the array is a quantity of the vertices of the SC, and each element in the array stores information of one vertex.

3. The method for representing IOV knowledge according to claim 2, wherein the information of one vertex comprises:
a coordinate of the vertex and a function value of the vertex, wherein the function value of the vertex is a function value of the coordinate of the vertex in the mapping function based on the IOV knowledge.

4. The method for representing IOV knowledge according to claim 1, wherein a cell array is used to record information of all cells of the SC.

5. The method for representing IOV knowledge according to claim 4, wherein information of one cell comprises:
a vertex index value of the cell and a corresponding face of each face in the cell.

6. The method for representing IOV knowledge according to claim 1, wherein the boundary of the SC is formed by faces whose corresponding faces are empty in the SC.

7. An apparatus for representing internet of vehicles (IOV) knowledge based on a simplicial complex (SC), the apparatus comprising:
a processor; and
a memory coupled to the processor to store instructions, which when executed by the processor, cause the apparatus to:
represent k'-dimensional knowledge in a k-dimensional continuous space by using a k-dimensional SC with k'-dimensional function values, wherein a coordinate of a vertex of the SC is values $(x_1, \ldots, x_k)$ of k input variables, a function value of the vertex is k' output values $(y_1, \ldots, y_{k'})$ of a function, and a relationship between the coordinate and the function value is $(y_1, \ldots, y_{k'})=f(x_1, \ldots, x_k)$, wherein f is a mapping function based on IOV knowledge, and k and k' are natural numbers; and
represent a safe boundary of the IOV knowledge by using a boundary of the SC, wherein the IOV knowledge comprises a steering wheel angle of an ego-vehicle, a road curvature, a speed of the ego-vehicle, and an inter-parameter relationship compliant with an objective law of vehicle dynamics, wherein the steering wheel angle of the ego-vehicle, the road curvature, and the speed of the ego-vehicle are obtained by using a sensor on the ego-vehicle; and
wherein a IOV knowledge is identified in the SC, the IOV knowledge having a coordinate corresponding to a combination of a road curvature and a speed of an ego-vehicle as input values;
a steering wheel angle is determined for the ego-vehicle based on the identified IOV knowledge; and
the ego-vehicle is controlled to perform a self-driving or an automatic parking based on the determined steering wheel angle.

8. The apparatus for representing IOV knowledge according to claim 7, wherein a vertex array is used to record information of all vertices, wherein a length of the array is a quantity of the vertices of the SC, and each element in the array stores information of one vertex.

9. The apparatus for representing IOV knowledge according to claim 8, wherein the information of one vertex comprises:
a coordinate of the vertex and a function value of the vertex, wherein the function value of the vertex is a function value of the coordinate of the vertex in the mapping function based on the IOV knowledge.

10. The apparatus for representing IOV knowledge according to claim 7, wherein a cell array is used to record information of all cells of the SC.

11. The apparatus for representing IOV knowledge according to claim 10, wherein information of one cell comprises:
a vertex index value of the cell and a corresponding face of each face in the cell.

12. The apparatus for representing IOV knowledge according to claim 7, wherein the boundary of the SC is formed by faces whose corresponding faces are empty in the SC.

13. A method for importing internet of vehicles (IOV) knowledge based on a simplicial complex (SC), the method comprising:
abstracting knowledge in various forms into a knowledge function F, wherein the knowledge function comprises a mapping function f, a safety determining function g, and a knowledge domain D, wherein f is a mapping function based on IOV knowledge, the safety determining function g is used to determine, for any group of input values $(x_1, x_2, \ldots, x_k)$ in the knowledge domain D, whether the input values are a safe combination in the IOV knowledge, and the knowledge domain D is used to determine a minimum value and a maximum value that can be selected for each input variable $x_i$, wherein $i=1, 2, \ldots, k$;
performing discrete sampling on the knowledge function F, and creating a vertex set P; and
creating a cell set C, and using each cell to fill in a blank space between vertices in the vertex set P, so that a final knowledge base SC is formed; and
wherein a IOV knowledge is identified in the knowledge base SC, the IOV knowledge having a coordinate corresponding to a combination of a road curvature and a speed of an ego-vehicle as input values;
a steering wheel angle is determined for the ego-vehicle based on the identified IOV knowledge; and
the ego-vehicle is controlled to perform a self-driving or an automatic parking based on the steering wheel angle.

14. The importing method according to claim 13, wherein the performing discrete sampling on the knowledge function F, and creating a vertex set P comprises:
initializing the vertex set P to null; and
for each knowledge function F, performing the following operations to perform discrete sampling on Fi:
determining a coordinate of a new candidate sampling point p in D based on the mapping function f and an existing vertex in the vertex set P;
determining, by using the safety determining function g, whether p is in a safe region, and if p is not in the safe region, ignoring the candidate sampling point p, and selecting a next candidate sampling point; or
if p is in the safe region, calculating, by using the mapping function f, a function value corresponding to the candidate sampling point p; and
adding the candidate sampling point p to the vertex set P as a new vertex.

15. The importing method according to claim 13, wherein the creating a cell set C, and using each cell to fill in a blank space between vertices, so that a final knowledge base SC is formed comprises:
splitting the vertex set P into two subsets: P− and P+, wherein P− comprises all vertices on a boundary, and P+ comprises all vertices off the boundary;
creating a (k−1)-dimensional cell set C− by using P− as a vertex set;
combining the vertex set P− with the cell set C− to form a (k−1)-dimensional closed simplicial complex S− used to indicate the boundary of the knowledge base SC;
creating a k-dimensional cell set C by using P as a vertex set and S− as a boundary constraint; and
combining the vertex set P with the cell set C to form the final knowledge base SC.

16. An apparatus for importing internet of vehicles (IOV) knowledge based on a simplicial complex (SC), the apparatus comprising:
a processor; and
a memory coupled to the processor to store instructions, which when executed by the processor, cause the apparatus to:
abstract knowledge in various forms into a knowledge function F, wherein the knowledge function F comprises a mapping function f, a safety determining function g, and a knowledge domain D, wherein f is a mapping function based on IOV knowledge, the safety determining function g is used to determine, for any group of input values $(x_1, x_2, \ldots, x_k)$ in the knowledge domain D, whether the input values are a safe combination in the IOV knowledge, and the knowledge domain D is used to determine a minimum value and a maximum value that can be selected for each input variable $x_i$, wherein $i=1, 2, \ldots, k$; and perform discrete sampling on the knowledge function F, and create a vertex set P;

create a cell set C, and use each cell to fill in a blank space between vertices in the vertex set P, so that a final knowledge base SC is formed; and wherein a IOV knowledge is identified in the knowledge base SC, the IOV knowledge having a coordinate corresponding to a combination of a road curvature and a speed of an ego-vehicle as input values;

a steering wheel angle is determined for the ego-vehicle based on the identified IOV knowledge; and the ego-vehicle is controlled to perform a self-driving or an automatic parking based on the steering wheel angle.

17. The importing apparatus according to claim 16, wherein, to perform discrete sampling on the knowledge function F, and create a vertex set P, the apparatus is caused to:

determine a coordinate of a new candidate sampling point p in D based on the mapping function f and an existing vertex in the vertex set P;

determine, by using the safety determining function g, whether p is in a safe region; and if p is not in the safe region, ignore the candidate sampling point p, and select a next candidate sampling point, or if p is in the safe region, calculate, by using the mapping function f, a function value corresponding to the candidate sampling point p; and add the candidate sampling point p to the vertex set P as a new vertex.

18. The importing apparatus according to claim 16, wherein, to create the cell set C, and use each cell to fill in the blank space, the apparatus is caused to:

split the vertex set P into two subsets: P− and P+, wherein P− comprises all vertices on a boundary, and P+ comprises all vertices off the boundary;

create a (k−1)-dimensional cell set C− by using P− as a vertex set;

combine the vertex set P− with the cell set C− to form a (k−1)-dimensional closed simplicial complex S− used to indicate the boundary of the knowledge base SC;

create a k-dimensional cell set C by using P as a vertex set and S− as a boundary constraint; and combine the vertex set P with the cell set C to form the final knowledge base SC.

* * * * *

UNITED STATES PATENT AND TRADEMARK OFFICE
CERTIFICATE OF CORRECTION

PATENT NO. : 12,271,828 B2
APPLICATION NO. : 17/158969
DATED : April 8, 2025
INVENTOR(S) : Xiaotian Yin, Jian Li and Yongxiang Tao Page 1 of 1

It is certified that error appears in the above-identified patent and that said Letters Patent is hereby corrected as shown below:

In the Claims

In Column 58, Claim 1, Line 22, delete "$(y_1, \ldots, y_k)$" and insert --$(y_1, \ldots, y_{k'})$--.

In Column 58, Claim 1, Line 24, delete "$(y_1, \ldots, y_k) = f(x_1, \ldots, x_k)$" and insert --$(y_1, \ldots, y_{k'}) = f(x_1, \ldots, x_k)$--.

Signed and Sealed this
Tenth Day of June, 2025

Coke Morgan Stewart
*Acting Director of the United States Patent and Trademark Office*